US010547729B2

(12) United States Patent
Choi et al.

(10) Patent No.: US 10,547,729 B2
(45) Date of Patent: Jan. 28, 2020

(54) ELECTRONIC DEVICE AND METHOD OF EXECUTING FUNCTION OF ELECTRONIC DEVICE

(71) Applicant: Samsung Electronics Co., Ltd., Gyeonggi-do (KR)

(72) Inventors: Il-Hwan Choi, Gyeonggi-do (KR); Sang-Wook Kang, Gyeonggi-do (KR); Young-Hoon Kim, Gyeonggi-do (KR); Seung-Hoon Park, Seoul (KR); Hyun-Ju Seo, Gyeonggi-do (KR); Tae-Kwang Um, Suwon-si (KR); Jae-Yong Lee, Seoul (KR); Jin-Ho Choi, Gyeonggi-do (KR); Da-Som Lee, Seoul (KR); Jae-Yung Yeo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/911,329

(22) Filed: Mar. 5, 2018

(65) Prior Publication Data
US 2018/0278740 A1 Sep. 27, 2018

(30) Foreign Application Priority Data

Mar. 27, 2017 (KR) .................. 10-2017-0038722
May 29, 2017 (KR) .................. 10-2017-0066368

(51) Int. Cl.
H04L 29/08 (2006.01)
H04M 1/725 (2006.01)
(Continued)

(52) U.S. Cl.
CPC ...... H04M 1/72519 (2013.01); G06F 3/0488 (2013.01); G06F 3/04817 (2013.01);
(Continued)

(58) Field of Classification Search
None
See application file for complete search history.

(56) References Cited

U.S. PATENT DOCUMENTS 6,185,535 B1 2/2001 Hedin et al.
8,630,852 B2 1/2014 Itoh
(Continued)

FOREIGN PATENT DOCUMENTS

JP 2014-016475 A 1/2014
KR 10-2009-0115599 A 11/2009
KR 10-2013-0068303 A 6/2013

OTHER PUBLICATIONS

International Search Report dated Jun. 19, 2018.

Primary Examiner — Suhail Khan
(74) Attorney, Agent, or Firm — Cha & Reiter, LLC.

(57) ABSTRACT

An artificial intelligence system and method are disclosed herein. The system includes a processor which implements the method, including: receiving by an input unit a first user input including a request to execute a task using at least one of the electronic device or an external device, transmitting by a wireless communication unit first data associated with the first user input to an external server, receiving a first response from the external server including information associated with at least one of the first user input and a sequence of electronic device states for performing at least a portion of the task, receiving a second user input assigning at least one of a voice command and a touch operation received by a touch screen display as the request to perform the task, and transmitting second data associated with the second user input to the external server.

16 Claims, 48 Drawing Sheets

(51) Int. Cl.
*G06F 3/0484* (2013.01)
*G06F 3/0488* (2013.01)
*G06F 3/0481* (2013.01)

(52) U.S. Cl.
CPC ..... *G06F 3/04847* (2013.01); *H04M 2250/22* (2013.01); *H04M 2250/74* (2013.01)

(56) References Cited

U.S. PATENT DOCUMENTS

| | | |
|---|---|---|
| 9,548,050 B2 | 1/2017 | Gruber et al. |
| 2005/0261903 A1 | 11/2005 | Kawazoe et al. |
| 2008/0086306 A1 | 4/2008 | Hirota et al. |
| 2009/0299751 A1 | 12/2009 | Jung |
| 2014/0163995 A1 | 6/2014 | Burns et al. |
| 2016/0259791 A1 | 9/2016 | Vizer et al. |
| 2016/0269524 A1 | 9/2016 | Stottlemyer |
| 2017/0097618 A1 | 4/2017 | Cipollo et al. |
| 2017/0148436 A1 | 5/2017 | Sugiura et al. |
| 2017/0201613 A1* | 7/2017 | Engelke ................. G10L 15/06 |

\* cited by examiner

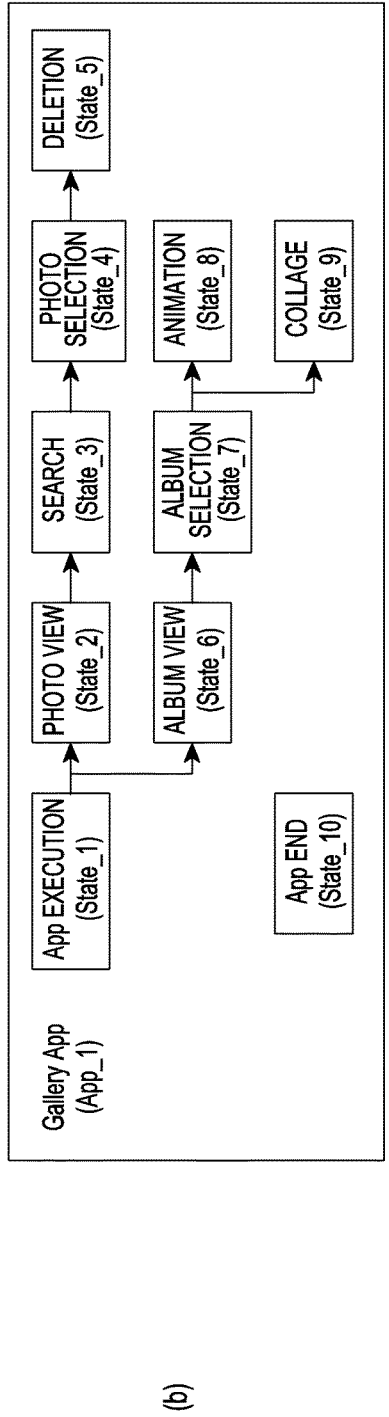
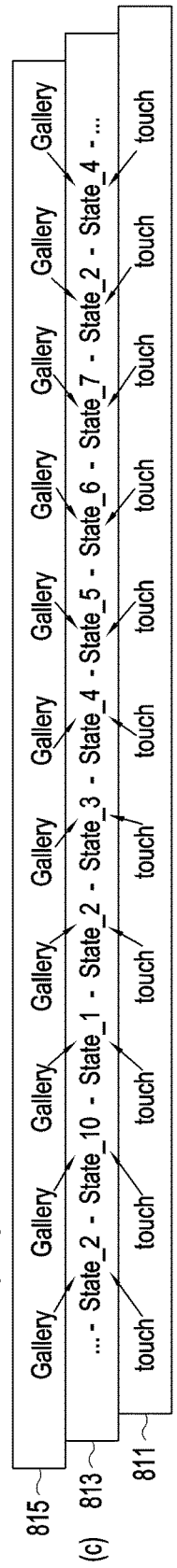
FIG.8

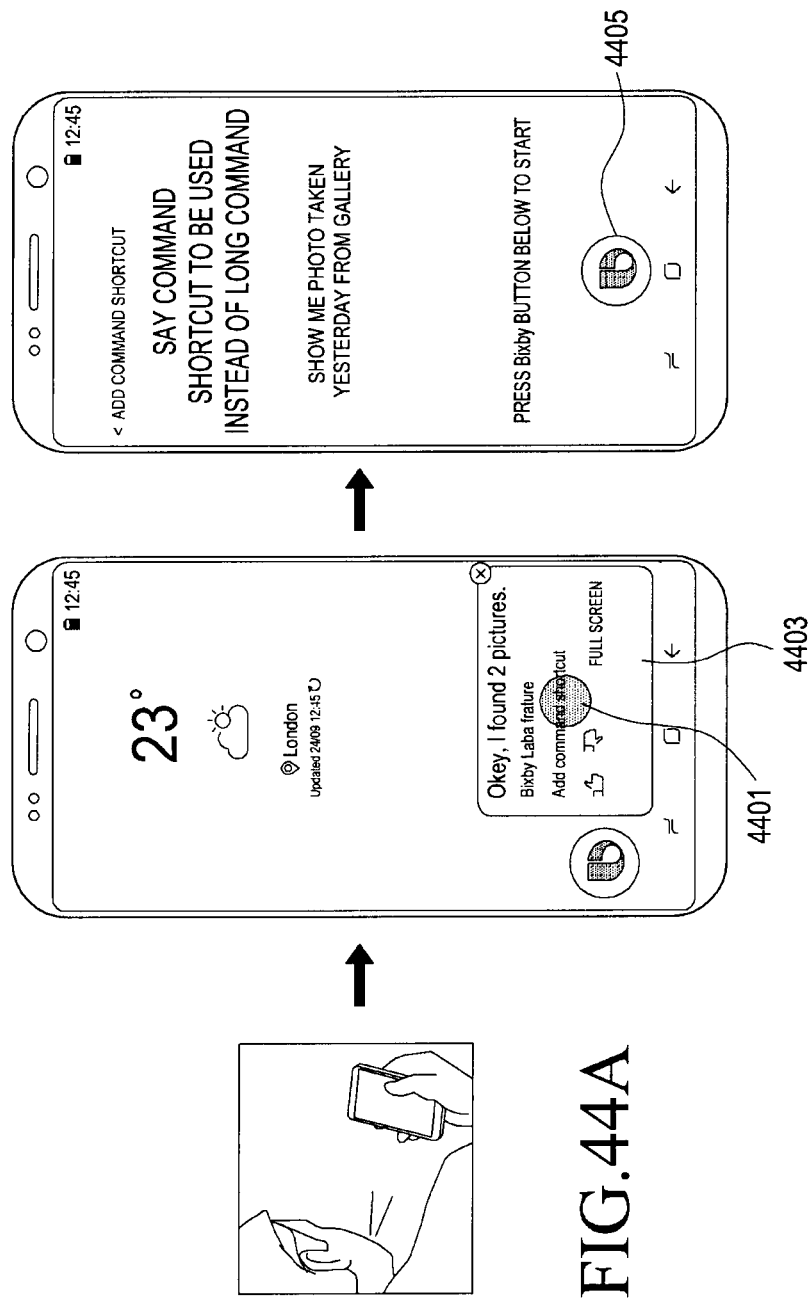

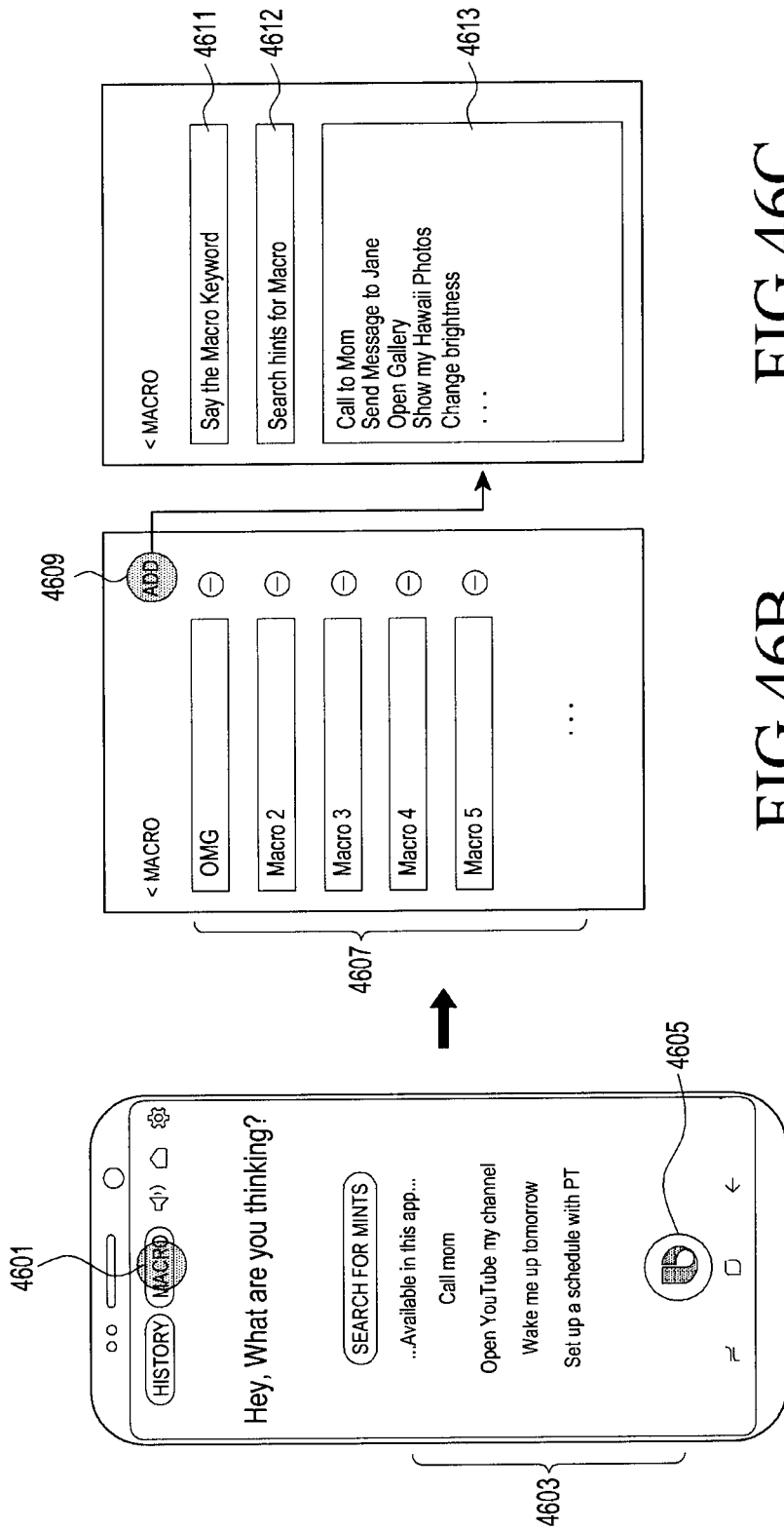

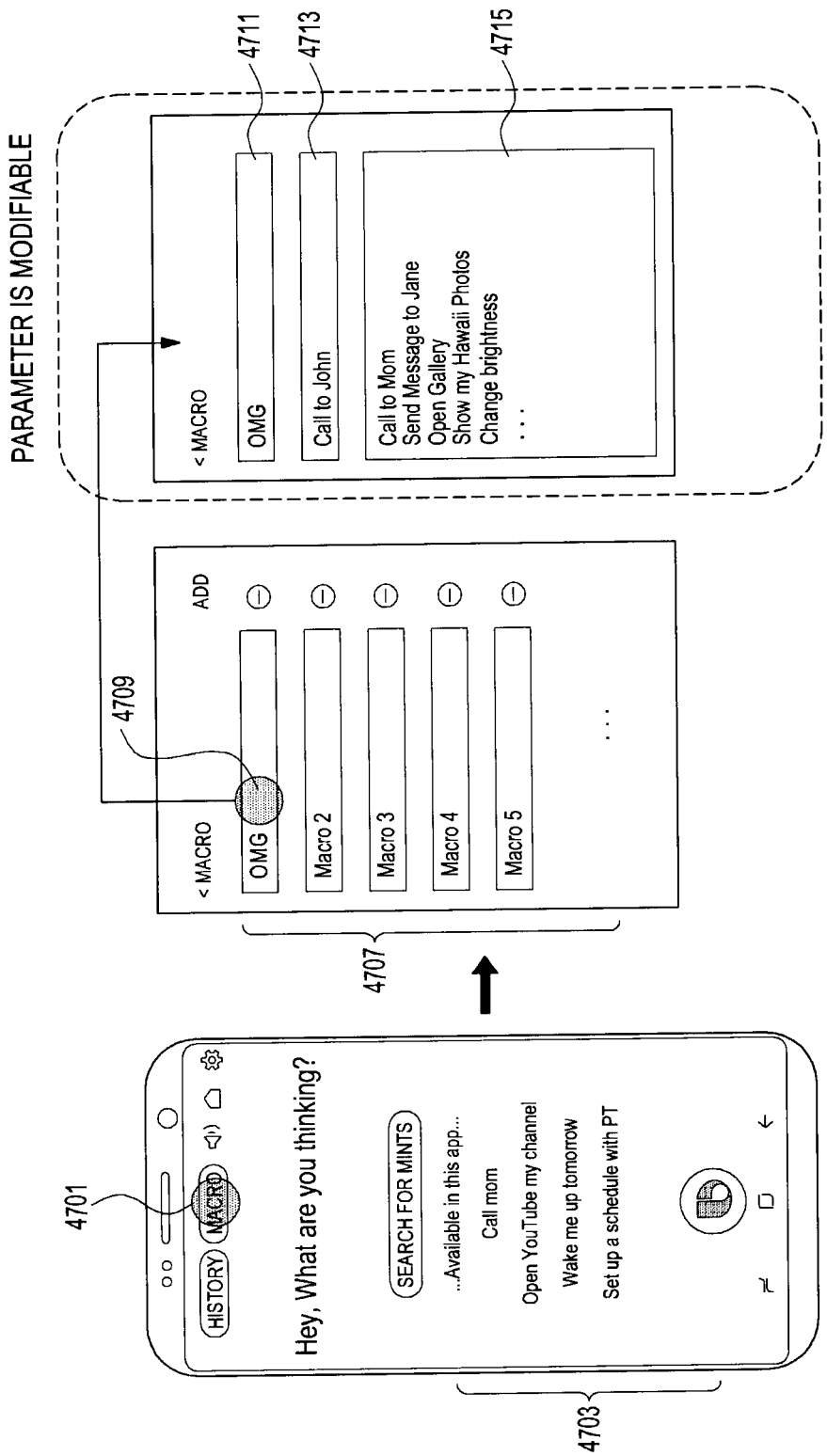

ELECTRONIC DEVICE AND METHOD OF EXECUTING FUNCTION OF ELECTRONIC DEVICE

CLAIM OF PRIORITY

This application claims the priority under 35 U.S.C. § 119(a) to Korean Patent Application Serial No. 10-2017-0038722, which was filed in Korean Intellectual Property Office on Mar. 27, 2017 and Korean Patent Application Serial No. 10-2017-0066368, which was filed in the Korean Intellectual Property Office on May 29, 2017, the entire content of which is hereby incorporated by reference.

TECHNICAL FIELD

The present disclosure relates to an electronic device and a method of executing the function of the electronic device.

BACKGROUND

An artificial intelligence system is a computer system that attempts to implement aspects of human-level intelligence, in which a machine can learn and form judgements to improve a recognition rate for information as it is used.

Artificial intelligence technologies include a machine learning (deep learning) technology that uses an algorithm that classifies/learns the characteristics of input data by itself and an elemental technology that simulates functions such as recognition, judgment, and the like of human brain by utilizing a machine learning algorithm.

The elemental technology may include at least one of, for example, a linguistic comprehension technique for recognizing human languages/characters, a visual comprehension technique for recognizing objects as in human vision, a reasoning/predicting technique for judging and logically reasoning and predicting information, a knowledge expression technique for processing human experience information as knowledge data, and an operation control technique for controlling autonomous driving of the vehicle or the motion of a robot.

For example, the linguistic comprehension technique is a technique that recognizes and applies/processes human languages/characters, and may include natural language processing, machine translation, a dialogue system, query response, speech recognition/synthesis, and the like.

For example, the visual comprehension technique is a technique that recognizes and processes objects as in human vision, and may include object recognition, object tracking, image retrieval, human recognition, scene understanding, spatial understanding, image enhancement, and the like.

For example, the reasoning/predicting technique is a technique that judges and logically reasons and predicts information, and may include knowledge/probability-based reasoning, optimization prediction, preference-based planning, recommendation, and the like.

For example, the knowledge expression technique is a technique that automates the processing of human experience information into knowledge data, and may include knowledge building (data generation/classification), knowledge management (data utilization), and the like.

For example, the operation control technique is a technique that controls autonomous vehicle motion and robot motion, and may include motion control (navigation, impulse, running), operation control (behavior control), and the like.

SUMMARY

When an electronic device provides a virtualized computer-implemented 'intelligent agent,' a user may lack prior knowledge of the function of the intelligent agent and may also have difficulty in explicitly recognizing the intelligent agent. Accordingly, user learning for using the intelligent agent may be desirable, and the electronic device may erroneously recognize a user's question, request, command, or the like, and may perform an operation different from the intention of the user. In addition, in order to easily use the function of the intelligent agent, the user may be provided with a hint to inform the user of a voice that the user can input so that the operation of the electronic device can be performed through a voice input.

A user unfamiliar with the use of the electronic device or unfamiliar with performing the function of the electronic device through a voice command may have difficulty knowing what function to perform or which utterance should be requested to perform the function, even in a situation where the specific function of the electronic device is to be executed. In addition, when a user wishes to execute any one function of the electronic device through the voice command, the user's utterance may be related to the corresponding function to execute the corresponding function.

According to various embodiments, there are provided with an electronic device that provides a hint that informs a user of a voice input that the user can input so that the operation of the electronic device can be performed through the voice input, and a method of operating the electronic device.

According to various embodiments, an electronic device includes: a housing; a touch screen display that is exposed through a portion of the housing; a wireless communication circuit; a microphone; a speaker; at least one processor that is located inside the housing and is electrically connected to the touch screen display, the wireless communication circuit, the microphone, and the speaker; and a memory that is located inside the housing and is electrically coupled to the at least one processor, wherein the memory is configured to at least temporarily store a plurality of reference sequences of states and each of the plurality of reference sequences of states is associated with individual operations of the electronic device or individual combinations of the operations, and when the memory is performed, the at least one processor receives a first sequence of touch inputs from a user via the touch screen display, sequentially changes the states of the electronic device to perform the operations of the electronic device or the combinations of the operations in response to the first sequence of the touch inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, an electronic system includes: a touch screen display; at least one communication circuit; a microphone; a speaker; one or more processors that is operably connected to the touch screen display, the communication circuit, the microphone, and the speaker; and at least one memory that is operably connected to the one or more processors, wherein the memory is configured to at least temporarily store a plurality of reference sequences of states, and each of the plurality of reference sequences of states is associated with individual operations of an electronic device or individual combinations of the operations, and when the memory is performed, the one or more processors acquires a first sequence of touch inputs from a user via the touch screen display, sequentially changes the states of the electronic device to perform the operations of the electronic device or the combinations of the operations in response to the first sequence of the touch inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, an electronic device includes: a housing; a touch screen display that is exposed through a portion of the housing; a wireless communication circuit; a microphone; a speaker; at least one processor that is located inside the housing and is electrically connected to the touch screen display, the wireless communication circuit, the microphone, and the speaker; and a memory that is located inside the housing and is electrically connected to the at least one processor, wherein the memory is configured to at least temporarily store a plurality of reference sequences of states and the plurality of reference sequences of states is associated with individual operations of the electronic device or individual combinations of the operations, and when the memory is performed, the at least one processor receives a first sequence of inputs from a user, sequentially changes the states of the electronic device to perform the operations of the electronic device or the combinations of the operations in response to the first sequence of the inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, an electronic device includes: a housing; a touch screen display that is exposed through a portion of the housing; a wireless communication circuit; a microphone; a speaker; at least one processor that is located inside the housing and is electrically connected to the touch screen display, the wireless communication circuit, the microphone, and the speaker; and a memory that is located inside the housing and is electrically connected to the at least one processor, wherein the memory is configured to at least temporarily store a plurality of reference sequences of states and the plurality of reference sequences of states is associated with individual operations of the electronic device or individual combinations of the operations, and when the memory is performed, the at least one processor receives one or more touch inputs from a user via the touch screen display, sequentially changes the states of the electronic device to perform the operations of the electronic device or the combinations of the operations in response to the one or more touch inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, an electronic device includes: a housing; a touch screen display that is exposed through a portion of the housing; an input device; at least one processor that is located inside the housing and is electrically connected to the touch screen display and the input device; and a memory that is located inside the housing and is electrically connected to the at least one processor, wherein when the memory is performed, the at least one processor receives a first sequence of inputs from a user via the input device, sequentially changes a first sequence of states of the electronic device to perform a first operation of the electronic device in response to the first sequence of the inputs, stores information associated with the first sequence of the states in the memory, provides an indication via the touch screen display at least based on the information associated with the first sequence of the states stored in the memory, the indication indicating availability of the first operation, and stores, when the indication is selected, instructions causing performance of the first operation without a sequential change of the first sequence of the states.

According to various embodiments, in a machine-readable storage medium in which a program for executing a method of generating a hint for executing an operation of an electronic device is recorded, the method includes: receiving a first sequence of inputs from a user; sequentially changing a first sequence of states of the electronic device to perform a first operation of the electronic device in response to the first sequence of the inputs; storing information associated with the first sequence of the states; providing an indication via a touch screen display of the electronic device at least based on the stored information associated with the first sequence of the states, wherein the indication indicates availability of the first operation; and performing the first operation without a sequential change of the first sequence of the states when the indication is selected.

According to various embodiments, an electronic device includes: a housing; a touch screen display that is located inside the housing and is exposed through a first portion of the housing; a microphone that is located inside the housing and is exposed through a second portion of the housing; at least one speaker that is located inside the housing and is exposed through a third portion of the housing; a wireless communication circuit that is located inside the housing; a processor that is located inside the housing and is electrically connected to the touch screen display, the microphone, the speaker, and the wireless communication circuit; and a memory that is located inside the housing and is electrically connected to the processor, wherein when the memory is performed, the processor receives a first user input via at least one of the touch screen display and the microphone, the first user input including a request to perform a task using at least one of the electronic device and an external device, transmits first data associated with the first user input to an external server via the wireless communication circuit, receives a first response from the external server via the wireless communication circuit, the first response including information associated with the first user input and/or sequence information of states of the electronic device for performing at least a portion of the task, receives a second user input for assigning an utterance and/or a user operation via the touch screen display as a request to perform the task, and stores instructions causing to transmit second data associated with the second user input to the external server via the communication circuit.

According to various embodiments, a method of executing an operation of an electronic device includes: receiving a first user input, wherein the first user input includes a request to perform a task using at least one of the electronic device or an external device; transmitting first data associated with the first user input to an external server; receiving a first response from the external server, wherein the first response includes information associated with the first user input and/or sequence information of states of the electronic device for performing at least a portion of the task; receiving a second user input for assigning an utterance and/or a user operation via a touch screen display of the electronic device as the request to perform the task; and transmitting second data associated with the second user input to the external server.

According to various embodiments, a machine-readable storage medium recording a program to perform a method of executing an operation of an electronic device, the method comprising: receiving a first user input, wherein the first user input includes a request to perform a task using at least one of the electronic device or an external device; transmitting first data associated with the first user input to an external server; receiving a first response from the external server, wherein the first response includes information associated with the first user input and/or sequence information of states of the electronic device for performing at least a portion of the task; receiving a second user input for assigning an utterance and/or a user operation via a touch screen display of the electronic device as the request to perform the task; and transmitting second data associated with the second user input to the external server.

According to various embodiments, an electronic device includes: a housing; a touch screen display that is located inside the housing and is exposed through a first portion of the housing; a microphone that is located inside the housing and is exposed through a second portion of the housing; at least one speaker that is located inside the housing and is exposed through a third portion of the housing; a wireless communication circuit that is located inside the housing; a processor that is located inside the housing and is electrically connected to the touch screen display, the microphone, the speaker, and the wireless communication circuit; and a memory that is located inside the housing and is electrically connected to the processor, wherein the memory stores instructions that, when executed, cause the processor to: receive a first user input via at least one of the touch screen display and the microphone, the first user input including a request to perform a task using at least one of the electronic device and an external device, transmit first data associated with the first user input to an external server via the wireless communication circuit, acquire a first response based on the first data associated with the first user input, the first response including information associated with the first user input and/or sequence information of states of the electronic device for performing at least a portion of the task, receive a second user input for assigning an utterance and/or a user operation via the touch screen display as the request to perform the task, and acquire a second response based on second data associated with the second user input via the communication circuit, the second response storing instructions including the sequence information of the states of the electronic device for performing the at least a portion of the task.

As described above, according to various embodiments, the electronic device may integrate user's control histories (control experience) for the electronic device to provide a hint to a user, so that the user may control the electronic device in various ways.

In addition, the electronic device may provide a hint that is highly usable in accordance with an occasion of the user and/or a utilization pattern of a specific function of the user, thereby increasing the hint utilization of the user.

Further, the function of the electronic device may be executed using a personalized dialog for a user.

BRIEF DESCRIPTION OF THE DRAWINGS

The above and other aspects, features, and advantages of the present disclosure will be more apparent from the following detailed description taken in conjunction with the accompanying drawings, in which:

FIG. 8(a), FIG. 8(b), FIG. 8(c) and FIG. 8(d) are diagrams illustrating an operation of determining a path rule of an electronic device depending on a user input according to various embodiments;

FIG. 44A, FIG. 44B, and FIG. 44C are diagrams illustrating the registration of a command shortcut for executing the function of an electronic device according to various embodiments;

FIG. 46A, FIG. 46B and FIG. 46C are diagrams illustrating the registration of a command shortcut for executing the function of an electronic device according to various embodiments;

FIG. 47A, FIG. 47B and FIG. 47C are diagrams illustrating the registration of a command shortcut for executing the function of an electronic device according to various embodiments.

DETAILED DESCRIPTION

Figure 1:
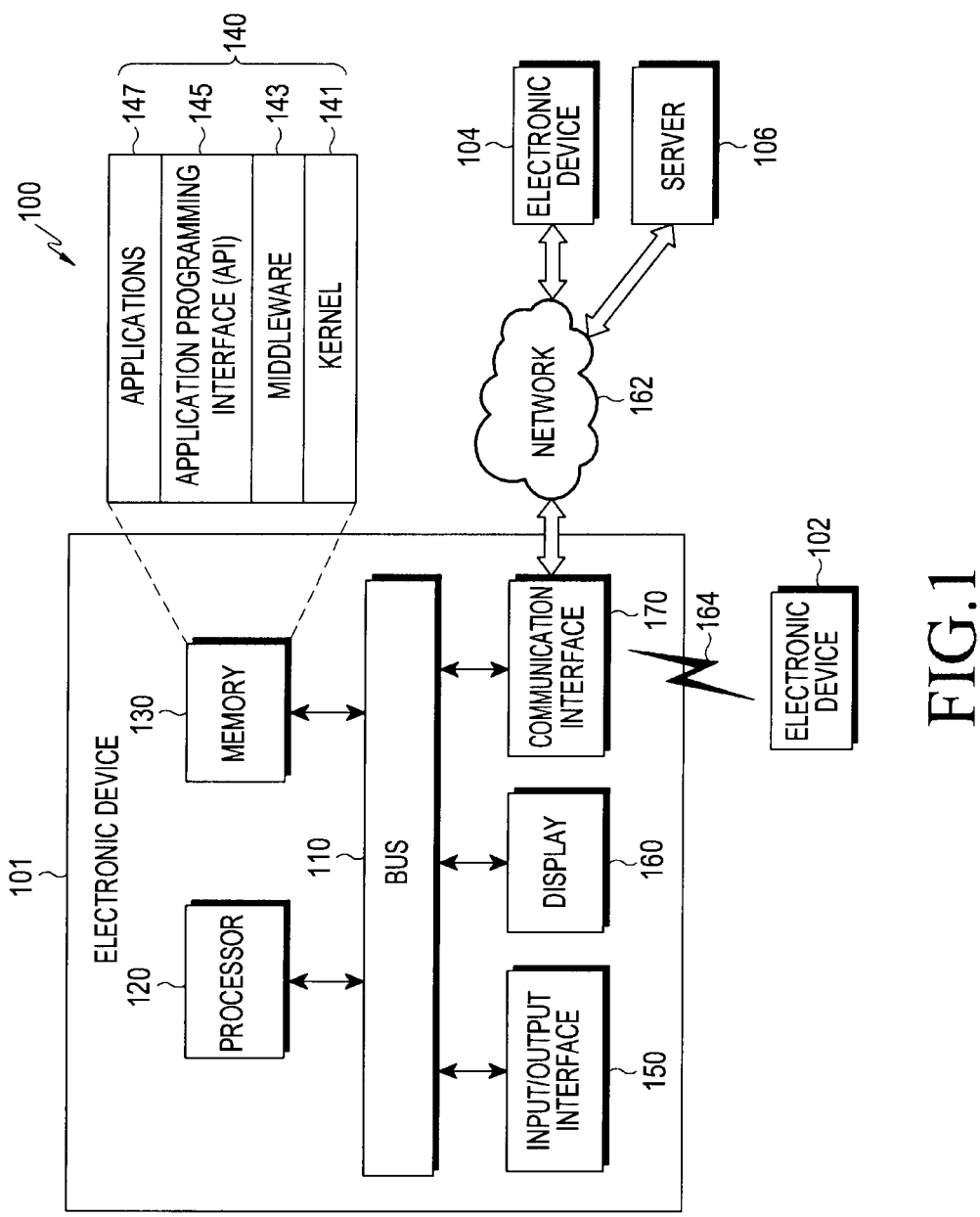
FIG. 1 illustrates a network environment including an electronic device according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head- Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

Referring to FIG. 1, in various embodiments, an electronic device 101 in a network environment 100 is described. The electronic device 101 may include a bus 110, a processor 120, a memory 130, an input/output interface 150, a display 160, and a communication interface 170 implementing a network connection 164. In some embodiments, the electronic device 101 may omit at least one of the components or further include other components. The bus 110 may include a circuit for connecting the components 110 to 170 and transmitting communication between the components (e.g., control messages or data). The processor 120 may include one or more of a central processing unit (CPU), an application processor (AP), and a communication processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other component of the electronic device 101. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS). The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may function as an intermediary for allowing the API 145 or the application programs 147 to communicate with the kernel 141 to exchange data. In addition, the middleware 143 may process one or more task requests received from the application programs 147 according to priorities thereof. For example, the middleware 143 may assign, to at least one of the application programs 147, priorities for using the system resources (e.g., the bus 110, the processor 120, the memory 130, and the like) of the electronic device 101, and may process the one or more task requests. The API 145 is an interface through which the applications 147 control functions provided from the kernel 141 or the middleware 143, and may include, for example, at least one interface or function (e.g., an instruction) for file control, window control, image processing, or text control.

The input/output interface 150 may transfer, for example, instructions or data input from a user or another external device to the other component(s) of the electronic device 101, or may output instructions or data received from the other element(s) of the electronic device 101 to a user or another external device.

Examples of the display 160 may include a liquid crystal display (LCD), a light-emitting diode (LED) display, an organic LED (OLED) display, a microelectromechanical system (MEMS) display, and an electronic paper display. The display 160 may display, for example, various types of contents (e.g., text, images, videos, icons, and/or symbols) to users. The display 160 may include a touch screen, and may receive, for example, a touch, gesture, proximity, or hovering input by using an electronic pen or a part of the user's body. The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may include cellular communication that uses at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). According to an embodiment, the wireless communication may include, for example, at least one of wireless fidelity (Wi-Fi), Bluetooth, Bluetooth low energy (BLE), Zigbee, near field communication (NFC), a magnetic secure transmission, radio frequency (RF), and body area network (BAN). According to an embodiment, the wireless communication may include global navigation satellite system (GNSS). The GNSS may be, for example, a global positioning system (GPS), a global navigation satellite system (GLONASS), a BeiDou Navigation Satellite System (hereinafter referred to as "BeiDou"), or an European global satellite-based navigation system (Galileo). Hereinafter, in this specification, the "GPS" may be interchangeably used with the "GNSS". The wired communication may include at least one of, for example, a universal serial bus (USB), a high definition multimedia interface (HDMI), recommended standard 232 (RS-232), power line communication, and a plain old telephone service (POTS). The network 162 may include at least one of telecommunications networks, for example, a computer network (e.g., LAN or WAN), an Internet, or a telephone network.

Each of the first external electronic device 102 and the second external electronic device 104 may be of a type that is identical to, or different from, that of the electronic device 101. According to various embodiments, all or some of the operations performed in the electronic device 101 may be performed in another electronic device or a plurality of electronic devices (e.g., the first external electronic device 102 or the second external electronic device 104, or the server 106). According to an embodiment, when the electronic device 101 has to perform some functions or services automatically or by request, the electronic device 101 may make a request to perform at least some functions relating thereto to another device (e.g., the first external electronic device 102 or the second external electronic device 104, or the server 106) instead of, or in addition to, performing the functions or services by itself. Another electronic device (e.g., the first external electronic device 102 or the second external electronic device 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technology may be used.

Figure 2:
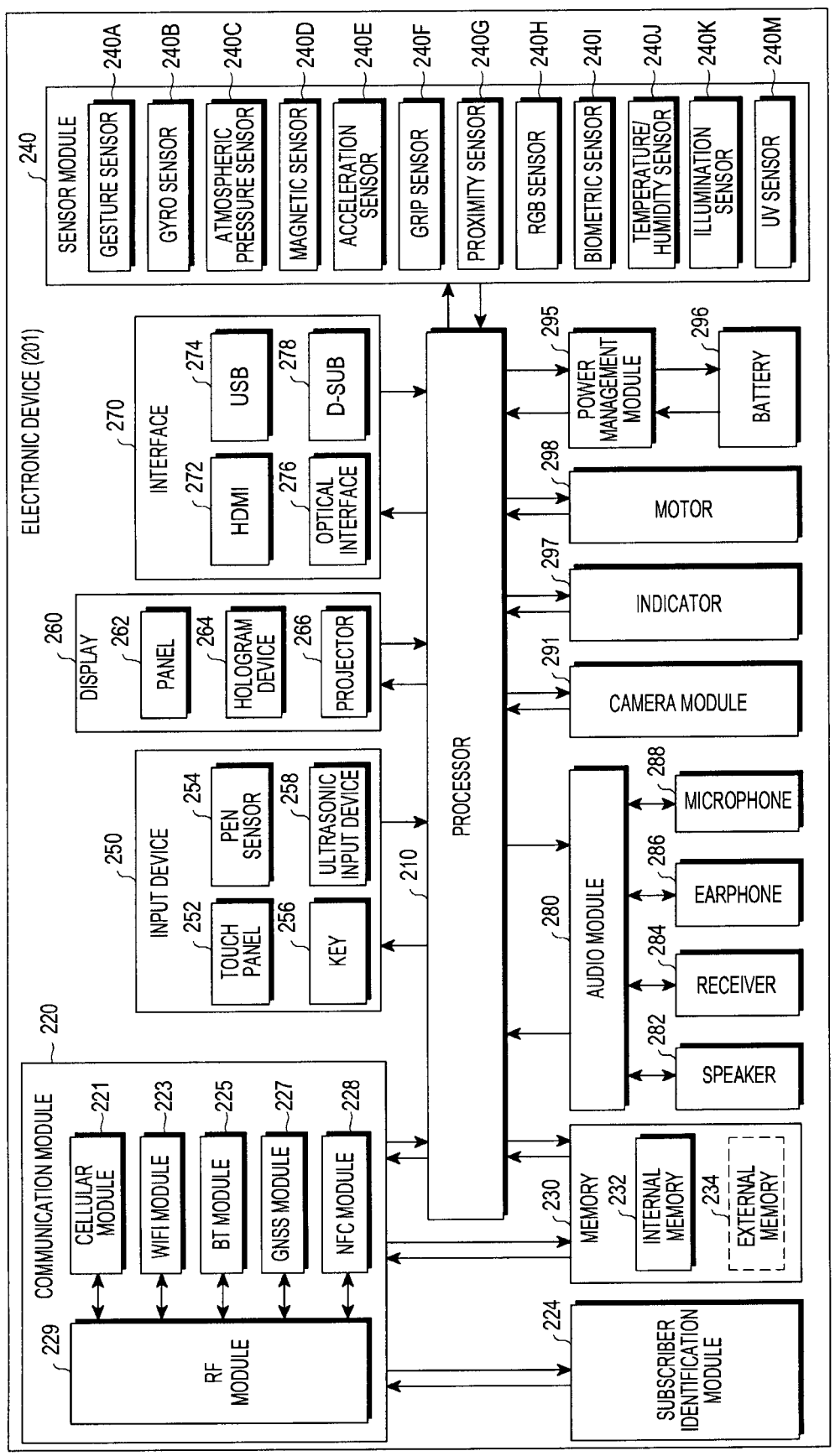
FIG. 2 is a block diagram illustrating an electronic device according to various embodiments.

FIG. 2 is a block diagram illustrating an electronic device 201 according to various embodiments. The electronic device 201 may include, for example, a part or the entirety of the electronic device 101 illustrated in FIG. 1. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software components connected to the processor 210 by driving, for example, an operating system or an application program, and may perform various data processing and calculations. The processor 210 may be embodied as, for example, a system on chip (SoC). According to an embodiment, the processor 210 may further include a graphics processing unit (GPU) and/or an image signal processor. The processor 210 may include at least some (e.g., a cellular module 221) of the components illustrated in FIG. 2. The processor 210 may load, into a volatile memory, instructions or data received from at least one (e.g., a non-volatile memory) of the other components and may process the loaded instructions or data, and may store resultant data in a non-volatile memory.

The communication module 220 may have a configuration that is equal or similar to that of the communication interface 170 of FIG. 1. The communication module 220 may include, for example, the cellular module 221, a Wi-Fi module 223, a Bluetooth module 225, a GNSS module 227, an NFC module 228, and an RF module 229. The cellular module 221 may provide a voice call, a video call, a text message service, or an Internet service through, for example, a communication network. According to an embodiment, the cellular module 221 may distinguish and authenticate the electronic device 201 within a communication network using a SIM (e.g., the SIM card) 224. According to an embodiment, the cellular module 221 may perform at least some of the functions that the processor 210 may provide. According to an embodiment, the cellular module 221 may include a communication processor (CP). According to some embodiments, at least some (e.g., two or more elements) of the cellular module 221, the Wi-Fi module 223, the Bluetooth module 225, the GNSS module 227, and the NFC module 228 may be included within one integrated circuit (IC) or an IC package. The RF module 229 may transmit/receive, for example, a communication signal (e.g., an RF signal). The RF module 229 may include, for example, a transceiver, a power amp module (PAM), a frequency filter, a low noise amplifier (LNA), an antenna, and the like. According to another embodiment, at least one of the cellular module 221, the Wi-Fi module 223, the Bluetooth module 225, the GNSS module 227, and the NFC module 228 may transmit and receive RF signals through a separate RF module. The SIM 224 may include, for example, a card containing a SIM and/or an embedded SIM, and may contain unique identification information (e.g., an integrated circuit card identifier (ICCID)) or subscriber information (e.g., international mobile subscriber identity (IMSI)).

The memory 230 (e.g., the memory 130) may include, for example, an embedded memory 232 or an external memory 234. The embedded memory 232 may include at least one of, for example, a volatile memory (e.g., a dynamic random access memory (DRAM), a static RAM (SRAM), a synchronous DRAM (SDRAM), and the like) and a non-volatile memory (e.g., a one-time programmable read only memory (OTPROM), a PROM, an erasable and programmable ROM (EPROM), an electrically erasable and programmable ROM (EEPROM), a mask ROM, a flash ROM, a flash memory, a hard driver, or a solid state drive (SSD)). The external memory 234 may include a flash drive, for example, a compact flash (CF), a secure digital (SD), a micro-SD, a mini-SD, an extreme digital (xD), a multi-media card (MMC), a memory stick, and the like. The external memory 234 may be functionally and/or physically connected to the electronic device 201 through various interfaces.

The sensor module 240 may, for example, measure a physical quantity or detect an operation state of the electronic device 201, and may convert the measured or detected information into an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to some embodiments, the electronic device 201 may further include a processor that is configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to a user. The (digital) pen sensor 254 may include, for example, a recognition sheet, which is a part of the touch panel or is separated from the touch panel. The key 256 may include, for example, a physical button, an optical key or a keypad. The ultrasonic input device 258 may detect an ultrasonic wave generated by an input tool using a microphone (e.g., a microphone 288) of the electronic device 201, and may determine data corresponding to the detected ultrasonic wave.

The display 260 (e.g., the display 160) may include a panel 262, a hologram device 264, a projector 266, and/or a control circuit for control thereof. The panel 262 may be embodied to be, for example, flexible, transparent, or wearable. The panel 262 and the touch panel 252 may be embodied as one or more modules. According to an embodiment, the panel 262 may include a pressure sensor (or a force sensor) capable of measuring the intensity of the pressure with respect to a user's touch. The pressure sensor may be integrated with the touch panel 252 or may be implemented as one or more sensors separate from the touch panel 252. The hologram 264 may show a three-dimensional image in the air by using an interference of light. The projector 266 may display an image by projecting light onto a screen. The screen may be located, for example, inside or outside the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, an SD card/multi-media card (MMC) interface, or an infrared data association (IrDA) standard interface.

The audio module 280 may bilaterally convert, for example, a sound and an electric signal. At least some components of the audio module 280 may be included in, for example, the input/output interface 150 illustrated in FIG. 1. The audio module 280 may process sound information that is input or output through, for example, a speaker 282, a receiver 284, earphones 286, the microphone 288, and the like. The camera module 291 is a device that may photograph a still image and a dynamic image. According to an embodiment, the camera module 291 may include one or more image sensors (e.g., a front sensor or a back sensor), a lens, an image signal processor (ISP), or a flash (e.g., LED or xenon lamp). The power management module 295 may manage, for example, power of the electronic device 201. According to an embodiment, the power management module 295 may include a power management IC (PMIC), a charger IC, or a battery or a fuel gauge. The PMIC may use a wired and/or wireless charging method. Examples of the wireless charging method may include, for example, a magnetic resonance method, a magnetic induction method, an electromagnetic wave method, and the like, and may further include an additional circuit for wireless charging, for example, a coil loop, a resonance circuit, or a rectifier. The battery gauge may measure, for example, a residual quantity of the battery 296, and a voltage, a current, or a temperature during charging. The battery 296 may include, for example, a rechargeable battery and/or a solar battery.

The indicator 297 may indicate a specific state (e.g., a booting state, a message state, a charging state, and the like) of the electronic device 201 or a part (e.g., the processor 210) of the electronic device 201. The motor 298 may convert an electric signal into mechanical vibrations, and may generate a vibration, a haptic effect, and the like. The electronic device 201 may include a mobile TV supporting device (e.g., GPU) which can process media data according to a certain standard such as digital multimedia broadcasting (DMB), digital video broadcasting (DVB), mediaFLO™, and the like. Each of the above-described component elements according to the present specification may be configured with one or more components, and the names of the corresponding component elements may vary based on the type of electronic device. According to various embodiments, some elements may be omitted or other additional elements may be further included in the electronic device (e.g., the electronic device 201). Alternatively, some of the components may be combined to form a single entity, and thus, may equivalently execute functions of the corresponding elements prior to the combination.

Figure 3:
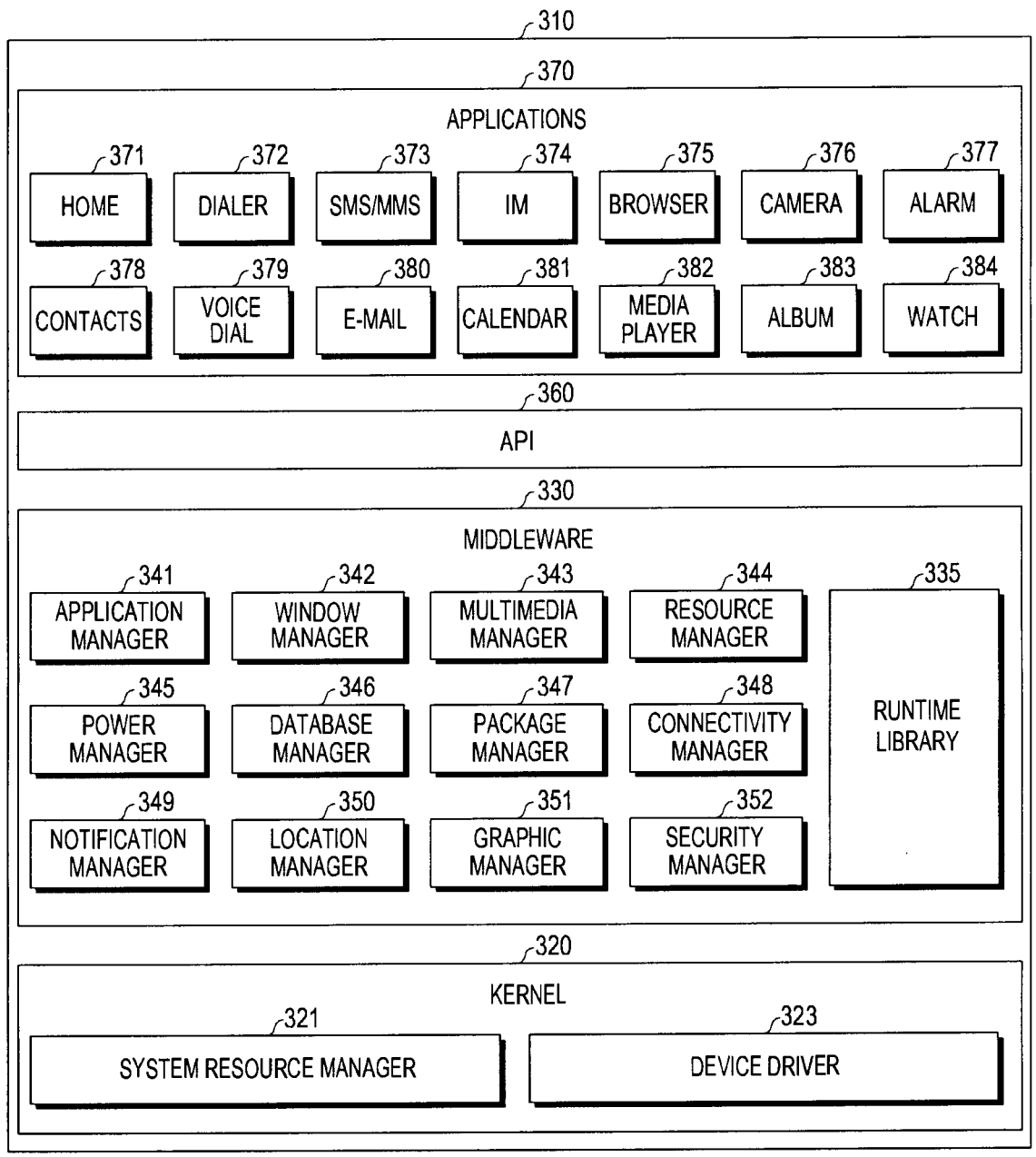
FIG. 3 is a block diagram illustrating a program module according to various embodiments.

FIG. 3 is a block diagram illustrating a program module according to various embodiments. According to an embodiment, a program module 310 (e.g., the program 140) may include an operating system (OS) for controlling resources related to an electronic device (e.g., the electronic device 101) and/or various applications (e.g., the application programs 147) driven in the OS. The OS may include, for example, Android™, iOS™, Windows™, Symbian™, Tizen™, Bada™, or the like. Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least a portion of the program module 310 may be preloaded on the electronic device, or may be downloaded from an external electronic device (e.g., the electronic device 102 or the electronic device 104, or the server 106).

The kernel 320 may include, for example, a system resource manager 321 and/or a device driver 323. The system resource manager 321 may control, assign, or collect system resources. According to an embodiment, the system resource manager 321 may include a process manager, a memory manager, a file system manager, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide a function implemented by the applications 370 in common or may provide various functions to the applications 370 through the API 360 so that the applications 370 may use limited system resources within the electronic device. According to an embodiment, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or arithmetic function processing. The application manager 341 may, for example, manage the life cycle of at least one of the applications 370. The window manager 342 may manage graphical user interface (GUI) resources used on a screen. The multimedia manager 343 may identify formats that are utilized for the reproduction of various media files and encode or decode a media file using a codec suitable for a corresponding format. The resource manager 344 may manage the source code of the applications 370 or the space of a memory. The power manager 345 may, for example, manage the capacity or power of a battery and may provide power information utilized for the operation of the electronic device. According to an embodiment, the power manager 345 may operate together with a basic input/output system (BIOS). The database manager 346 may generate, search for, or change a database to be used, for example, in the applications 370. The package manager 347 may manage the installation or updating of an application distributed in the form of a package file.

The connectivity manager 348 may manage, for example, a wireless connection. The notification manager 349 may provide events such as an arrival message, an appointment, proximity notification, and the like to a user. The location manager 350 may manage, for example, location information of the electronic device. The graphic manager 351 may manage, for example, a graphic effect to be provided to a user and a user interface relating to the graphic effect. The security manager 352 may provide, for example, system security or user authentication. According to an embodiment, the middleware 330 may further include a telephony manager for managing a voice call function or a video call function of the electronic device, or a middleware module that forms combinations of the functions of the above-described components. According to an embodiment, the middleware 330 may provide a module specialized for each type of OS. Furthermore, the middleware 330 may dynamically remove some of the existing components, or may add new components. The API 360 is, for example, a set of API programming functions, and may be provided with a different configuration according to an OS. For example, in the case of Android or iOS, one API set may be provided for each platform, and in the case of Tizen, two or more API sets may be provided for each platform.

The applications 370 may include, for example, a home application 371, a dialer application 372, a short message service (SMS)/multimedia message service (MMS) application 373, an instant message (IM) application 374, a browser application 375, a camera application 376, an alarm application 377, contacts application 378, a voice dial application 379, an e-mail application 380, a calendar application 381, a media player application 382, an album application 383, a watch application 384, a health care application (e.g., measure exercise quantity or blood sugar), and environment information (e.g., atmospheric pressure, humidity, temperature information, and the like). According to an embodiment, the applications 370 may include an information exchange application that supports exchanging information between the electronic device and an external electronic device. The information exchange application may include, for example, a notification relay application for notifying an external electronic device of certain information or a device management application for managing an external electronic device. For example, the notification relay application may transfer, to an external electronic device, notification information generated from other applications of the electronic device, or may receive notification information from an external electronic device and provide the received notification information to a user. The device management application may install, delete, or update the function of an external electronic device communicating with the electronic device (e.g., a function of turning on/off the external electronic device itself (or some components) or a function of adjusting luminance (or a resolution) of the display), applications operating in the external electronic device. According to an embodiment, the applications 370 may include an application (e.g., a health care application of a mobile medical device) designated according to an attribute of the external electronic device. According to an embodiment, the applications 370 may include an application received from the external electronic device. At least a portion of the program module 310 may be implemented (e.g., executed) in software, firmware, hardware (e.g., the processor 210), or a combination of two or more thereof, and may include, for example, a module, a program, a routine, a set of instructions, and/or a process for performing one or more functions.

According to various embodiments, an electronic device (e.g., the electronic device 101) may include a housing; a touch screen display (e.g., the display 160) that is exposed through a portion of the housing; a wireless communication circuit (e.g., the communication interface 170); a microphone (e.g., the microphone 288); a speaker (e.g., the speaker 282); at least one processor (e.g., the processor 120) that is located inside the housing and is electrically connected to the touch screen display, the wireless communication circuit, the microphone, and the speaker; and a memory (e.g., the memory 130) that is located inside the housing and is electrically coupled to the at least one processor, such that the memory is configured to at least temporarily store a plurality of reference sequences of states, each of the plurality of reference sequences of states is associated with individual operations of the electronic device or individual combinations of the operations, and when the memory is performed, the at least one processor receives a first sequence of touch inputs from a user via the touch screen display; sequentially changes the states of the electronic device to perform operations of the electronic device or the combinations of the operations in response to the first sequence of the touch inputs; stores a first sequence of the changed states in the memory; compares the first sequence of the changed states with at least a portion of at least one of the plurality of reference sequences of states; and stores instructions for causing at least one result from the comparison to be stored in the memory.

According to various embodiments, the instructions may cause the at least one processor to receive at least one touch input less than the first sequence of the touch inputs via the touch screen display after the at least one result is stored, to determine that the at least one touch input is associated with the at least one result and/or the at least one of the plurality of reference sequences of states, and to provide an indication via the touch screen display and/or the speaker, and the indication may indicate that at least a portion of the first sequence of the changed states is repeated using the indication without providing the first sequence of the touch inputs by the user.

According to various embodiments, the instructions may cause the at least one processor to collect first context information indicating an internal operation of the electronic device or an external context when the states of the electronic device are sequentially changed, to store the context information in the memory to correspond to the first sequence of the changed states, to collect second context information indicating the internal operation of the electronic device or the external context at the time of the at least one touch input, and to provide the indication via the touch screen display and/or the speaker when the first context information and the second context information correspond to each other.

According to various embodiments, the instructions may cause the at least one processor to update the number of executions of the changed states of the first sequence to store the updated number of executions in the memory, and to provide the indication via the touch screen display and/or the speaker when the updated number of executions corresponds to a designated condition.

According to various embodiments, the instructions may cause the at least one processor to provide the indication via the touch screen display and/or the speaker when a time point when the operation or the operations is applied as functions of the electronic device corresponds to the designated condition.

According to various embodiments, the instructions may cause the at least one processor to begin to sequentially change the states before the first sequence of the touch inputs is completely received.

According to various embodiments, the instructions may cause the at least one processor to receive a voice input via the microphone after the at least one result is stored, to determine that the voice input is associated with the at least one result and/or the at least one of the plurality of reference sequences of states, and to provide an indication via the touch screen display and/or the speaker, and the indication may indicate that at least a portion of the first sequence of the changed states is repeated using the indication without providing the first sequence of the touch inputs by the user.

According to various embodiments, the instructions may cause the at least one processor to provide an indication that suggests designating a macro corresponding to the at least one result and to designate the macro corresponding to the at least one result in accordance with the voice input via the microphone or the touch input via the touch screen display for the indication that suggests designating the macro, and the indication provided via the touch screen display and/or the speaker indicates the macro that is designated to correspond to the at least one result.

According to various embodiments, the instructions may cause the at least one processor to determine a priority of at least one indication to provide based on the designated condition of the electronic device and to provide the at least one indication via the touch screen display and/or the speaker based on the determined priority, and the indication may indicate that at least a portion of the first sequence of the changed states is repeated using the indication without providing the first sequence of the touch inputs.

According to various embodiments, the instructions may cause the at least one processor to determine an application domain that performs the operations of the electronic device or the combinations of the operations based on the number of times the application domain is used, at the time of a voice input via the microphone or the touch input via the touch screen display for performing the operations of the electronic device or the combinations of the operations, to generate at least one indication including information of the application domain, and to provide the at least one indication via the touch screen display and/or the speaker, and the indication may indicate that at least a portion of the first sequence of the changed states is repeated in the application domain by using the indication without providing the first sequence of the touch inputs.

According to various embodiments, an electronic system may include: a touch screen display (e.g., the display 160); at least one communication circuit (e.g., the communication interface 170); a microphone (e.g., the microphone 288); a speaker (e.g., the speaker 282); one or more processors (e.g., the processor 120) that is operably connected to the touch screen display, the communication circuit, the microphone, and the speaker; and at least one memory (e.g., the memory 130) that is operably connected to the one or more processors, such that the memory is configured to at least temporarily store a plurality of reference sequences of states, and each of the plurality of reference sequences of states is associated with individual operations of an electronic device or individual combinations of the operations, and when the memory is performed, the one or more processors acquires a first sequence of touch inputs from a user via the touch screen display, sequentially changes the states of the electronic system to perform the operations of the electronic system or the combinations of the operations in response to the first sequence of the touch inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, the electronic system may further include: a mobile device that includes a first processor; and a server that includes a second processor, such that the instructions cause the first processor to acquire the first sequence of the touch inputs via the touch screen display and the second processor to sequentially change the states of the electronic device to perform the operations of the electronic device or the combinations of the operations in response to the first sequence of the touch inputs.

According to various embodiments, the instructions may cause the second processor to store the first sequence of the changed states in the memory, to compare the first sequence of the changed states with the at least a portion of at least one of the plurality of reference sequences of states, and to store the at least one result from the comparison in the memory.

According to various embodiments, the instructions may cause the one or more processors to receive at least one touch input less than the first sequence of the touch inputs via the touch screen display after the at least one result is stored, to determine that the at least one touch input is associated with the at least one result and/or the at least one of the plurality of reference sequences of states, to provide an indication via the touch screen display and/or the speaker, to receive a selection of the indication via the touch screen display or the speaker, and to at least partially repeat at least a portion of the first sequence of the changed states in at least partially response to the selection. According to various embodiments, the instructions may cause the one or more processors to begin to sequentially change the states before the first sequence of the touch inputs is completely received.

According to various embodiments, an electronic device may include: a housing; a touch screen display (e.g., the display 160) that is exposed through a portion of the housing; a wireless communication circuit (e.g., the communication interface 170); a microphone (e.g., the microphone 288); a speaker (e.g., the speaker 282); at least one processor (e.g., the processor 120) that is located inside the housing and is electrically connected to the touch screen display, the wireless communication circuit, the microphone, and the speaker; and a memory (e.g., the memory 130) that is located inside the housing and is electrically connected to the at least one processor, such that the memory is configured to at least temporarily store a plurality of reference sequences of states and the plurality of reference sequences of states is associated with individual operations of the electronic device or individual combinations of the operations, and when the memory is performed, the at least one processor receives a first sequence of inputs from a user, sequentially changes the states of the electronic device to perform the operations of the electronic device or the combinations of the operations in response to the first sequence of the inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, an electronic device may include: a housing; a touch screen display (e.g., the display 160) that is exposed through a portion of the housing; a wireless communication circuit (e.g., the communication interface 170); a microphone (e.g., the microphone 288); a speaker (e.g., the speaker 282); at least one processor (e.g., the processor 120) that is located inside the housing and is electrically connected to the touch screen display, the wireless communication circuit, the microphone, and the speaker; and a memory (e.g., the memory 130) that is located inside the housing and is electrically connected to the at least one processor, such that the memory is configured to at least temporarily store a plurality of reference sequences of states and the plurality of reference sequences of states is associated with individual operations of the electronic device or individual combinations of the operations, and when the memory is performed, the at least one processor receives one or more touch inputs from a user via the touch screen display, sequentially changes the states of the electronic device to perform the operations of the electronic device or the combinations of the operations in response to the one or more touch inputs, stores a first sequence of the changed states in the memory, compares the first sequence of the changed states with at least a portion of at least one of the plurality of reference sequences of states, and stores instructions for causing at least one result from the comparison to be stored in the memory.

According to various embodiments, an electronic device (e.g., the electronic device 101) may include: a housing; a touch screen display (e.g., the display 160) that is exposed through a portion of the housing; an input device (e.g., the input/output interface 150); at least one processor (e.g., the processor 120) that is located inside the housing and is electrically connected to the touch screen display (e.g., the display 160) and the input device; and a memory (e.g., the memory 130) that is located inside the housing and is electrically connected to the at least one processor, such that when the memory is performed, the at least one processor receives a first sequence of inputs from a user via the input device, sequentially changes a first sequence of states of the electronic device to perform a first operation of the electronic device in response to the first sequence of the inputs, stores information associated with the first sequence of the states in the memory, provides an indication via the touch screen display at least based on the information associated with the first sequence of the states stored in the memory, the indication indicating availability of the first operation, and stores, when the indication is selected, instructions causing performance of the first operation without a sequential change of the first sequence of the states.

According to various embodiments, the instructions may cause the at least one processor to receive at least one input corresponding to the first sequence of the inputs and to perform, when the indication is selected, the first operation by a change in the at least one state of the electronic device, and a first number of the at least one state is less than a second number of the first sequence of the states.

According to various embodiments, the memory may be configured to at least temporarily store a plurality of reference sequences of states and the plurality of reference sequences of states may be associated with individual operations of the electronic device or individual combinations of the operations, and the instructions may cause the at least one processor to compare the first sequence of the states with at least a portion of at least one of the plurality of reference sequences of states and to store at least one result of the comparison in the memory as the information associated with the first sequence.

According to various embodiments, the instructions may cause the at least one processor to provide an indication that suggests designating a macro corresponding to the first sequence of the states based on the information associated with the first sequence, to designate the macro corresponding to the first sequence based on an input for the indication that suggests designating the macro via the input device, and to provide the indication corresponding to the macro via the touch screen display.

According to various embodiments, the instructions may cause the at least one processor to collect, when the first sequence of the states is sequentially changed, first context information indicating an internal operation of the electronic device or an external context to store the collected first context information in the memory, and to determine the indication in accordance with a comparison result between second context information indicating the internal operation of the electronic device or the external context collected at the time of execution of the electronic device or execution of an application thereof and the first context information.

According to various embodiments, the instructions may cause the at least one processor to determine the indication depending on the number of times the first operation stored in the memory is performed.

According to various embodiments, the instructions may cause the at least one processor to determine the indication depending on a time point when the first operation is applied as a function of the electronic device.

According to various embodiments, in a machine-readable storage medium in which a program for executing a method of generating a hint for executing an operation of an electronic device (e.g., the electronic device 101) is recorded, the method may include: receiving a first sequence of inputs from a user; sequentially changing a first sequence of states of the electronic device to perform a first operation of the electronic device in response to the first sequence of the inputs; storing information associated with the first sequence of the states; providing an indication via a touch screen display of the electronic device at least based on the stored information associated with the first sequence of the states, such that the indication indicates availability of the first operation; and performing the first operation without a sequential change of the first sequence of the states when the indication is selected.

Figure 4:
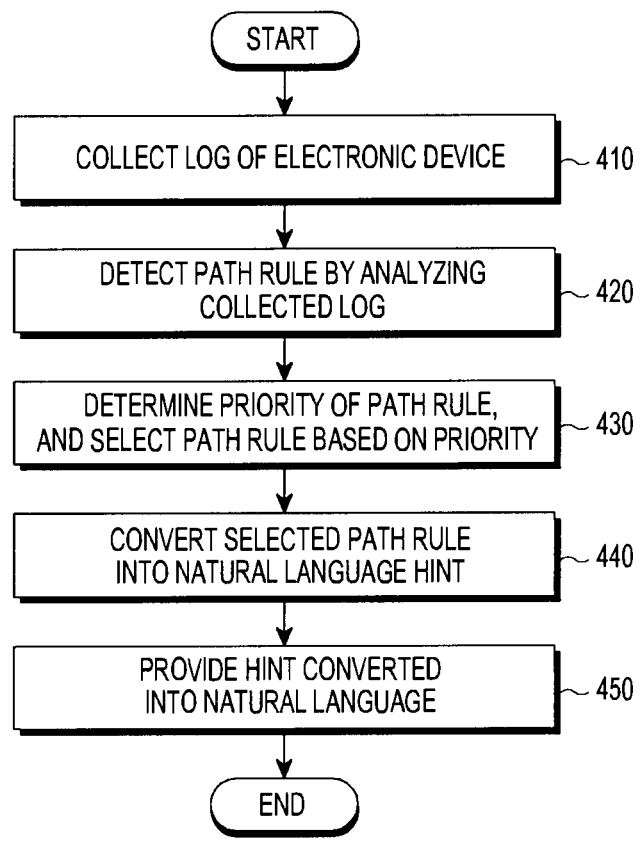
FIG. 4 is a flowchart illustrating a hint generation operation for executing an electronic device according to various embodiments.

FIG. 4 is a flowchart illustrating a hint generation operation for executing an electronic device (e.g., the electronic device 101) according to various embodiments. Referring to FIG. 4, the electronic device may generate and provide a hint (also referred to as an indication) to a user in a processor (e.g., the processor 120) of the electronic device based on a usage pattern of the user. For example, the hint may be a text that informs the user of a voice to be input so that an operation of the electronic device can be executed through a voice input. For example, the operation of the electronic device may be an operation of the electronic device that is expected to be executed by the user.

In operation 410, the electronic device (e.g., the processor 120) may collect logs of the electronic device.

According to an embodiment, the electronic device may collect logs of the electronic device during the operation (e.g., when the user uses the electronic device). For example, when executing at least one operation according to a user input, the electronic device may collect the logs related to the execution of the at least one operation. For example, the electronic device may any collect screen transformation information that is displayed when the user uses the electronic device.

That is, according to an embodiment, the logs may include recording of screens which are sequentially displayed by the electronic device in order for the electronic device to execute a function including the at least one operation according to the user input and/or recording of operations which are sequentially executed by the electronic device (and thus "screen transformation information"). For example, a single screen displayed according to one operation executed by the electronic device or the execution of the one operation may be referred to as a state, and recording of the operations sequentially executed by the electronic device or recording of screens sequentially displayed to correspond to the sequentially executed operations may be referred to as a state sequence log (hereinafter, also referred to as a sequence of states). For example, the state sequence log may be obtained by sequentially arranging the operations executed according to the user input.

According to an embodiment, the logs may further include information on the user input. For example, the user input may be various, such as a voice input using a microphone, a touch input on a touch screen, a user manipulation on buttons (or keys), and/or an input using a remote controller.

According to an embodiment, the logs may further include context information (also referred to as context) when the electronic device receives, from a user, a user input that causes execution of a specific function of the electronic device. For example, the context information may indicate an internal operation of the electronic device or an external situation, and may be various, such as a location, a date, a time, and/or schedule information stored in the electronic device.

In operation 420, the electronic device (e.g., the processor 120) may analyze collected logs and may detect a path rule indicating sequentially changed states of the electronic device. For example, the path rule may be obtained by the electronic device dividing the function of an application into unit operations.

According to an embodiment, the electronic device may select states corresponding to the use intention or purpose of the electronic device in such a manner that the collected logs are wholly or partially matched with a previously stored state sequence log (also referred to as a reference sequence of states), and may find the path rule allowing the selected states to be sequentially executed. For example, the previously stored state sequence log may be updated according to the operation of the electronic device depending on the user input. For example, according to the detection of the path rule, the electronic device may confirm which function of the electronic device is used, in which context the function is used, and/or through which input means the function is used.

According to another embodiment, the electronic device may analyze a state log that is repeatedly used through pattern analysis of the collected state logs to thereby extract a new path rule. For example, when the state log is performed a designated reference number of times or more, the electronic device may confirm that a user has repeatedly performed the above-described function through analysis of the collected state logs, and may newly acquire a path rule including the state sequence.

The above-described path rule will be described later with reference to FIG. 28. In operation 430, the electronic device (e.g., the processor 120) may determine a priority of the path rule and may select the path rule based on the priority.

According to an embodiment, the electronic device may determine and/or change the priority of the path rule corresponding to a hint to be provided to a user based on information included in the log. For example, the information included in the log may include information on a user input and/or context information.

According to an embodiment, the priority of the path rule may be determined so that a hint converted into a natural language corresponding to the path rule can be provided to the user in various ways according to a user occasion. For example, the electronic device may determine the user occasion based on the context information and/or a frequency of use of the path rule.

According to an embodiment, when a plurality of path rules is detected through log analysis, the electronic device may determine the priority of the plurality of path rules in various ways depending on the purpose in which the plurality of path rules provides a hint to the user. For example, when the hint can be provided so that the user can easily process the path rule, which is frequently used via a touch input, in the natural language by the touch input, a high priority may be assigned to the path rule which is used via the touch input but is not utilized well via the voice input. This can increase the utilization of the hint by reducing interface steps of a frequently used function. By way of another example, assuming that a user uses the same path rule mainly via the voice input at home and controls the same path rule via the touch input at the office, when a user's location is the office at the time of providing a hint to the user, the electronic device may exclude the path rule of the hint that suggests the voice input to the user.

In operation 440, the electronic device (e.g., the processor 120) may convert the path rule selected based on the priority into a natural language hint.

According to an embodiment, the electronic device may convert the path rule selected based on the priority into a hint in the form of the natural language through a natural language generation (NLG) technique or mapping with standard utterance matched with the path rule.

In operation 450, the electronic device (e.g., the processor 120) may provide the hint converted into the natural language.

According to an embodiment, the electronic device may automatically provide the hint when the electronic device is activated or when the application of the electronic device is executed.

Figure 5:
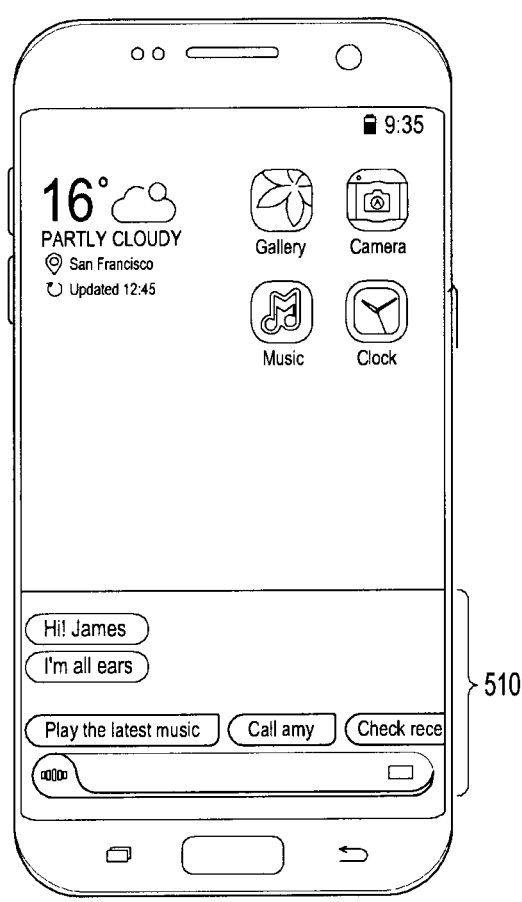
FIG. 5 is a diagram illustrating a screen for providing a hint for the operation of an electronic device according to various embodiments.

According to another embodiment, the electronic device may provide the hint according to a user input such as a touch input, a voice input, a user manipulation on hardware buttons (or keys), and/or an input using a remote controller. According to an embodiment, the electronic device may provide the hint converted into the natural language through a display. For example, when the hint in the form of the converted natural language is "Play the latest music", "call Amy", or the like according to the above-described operations, the electronic device may display the hint such as "Play the latest music", "call Amy", or the like on a predetermined region 510 of the display as shown in FIG. 5.

According to another embodiment, the electronic device may output the hint converted into the natural language as voice through a speaker using a text to speech (TTS) technique.

According to still another embodiment, the electronic device may provide the hint converted into the natural language through the display and the speaker.

According to an embodiment, when a user utters or touches the hint displayed on the display, the electronic device may sequentially and automatically execute the states of the path rule corresponding to the hint. For example, the electronic device may display a final state in which the states are sequentially executed on the touch screen. By way of another example, the electronic device may sequentially display all the sequential executions of the states on the touch screen.

According to an embodiment, the electronic device may automatically execute the above-described operations of FIG. 4 upon the execution of the electronic device or the execution of the application of the electronic device. Alternatively, the electronic device may execute the above-described operations of FIG. 4 according to a user input such as a touch input, a voice input, a user manipulation on buttons (or keys), and/or an input using a remote controller.

Figure 6:
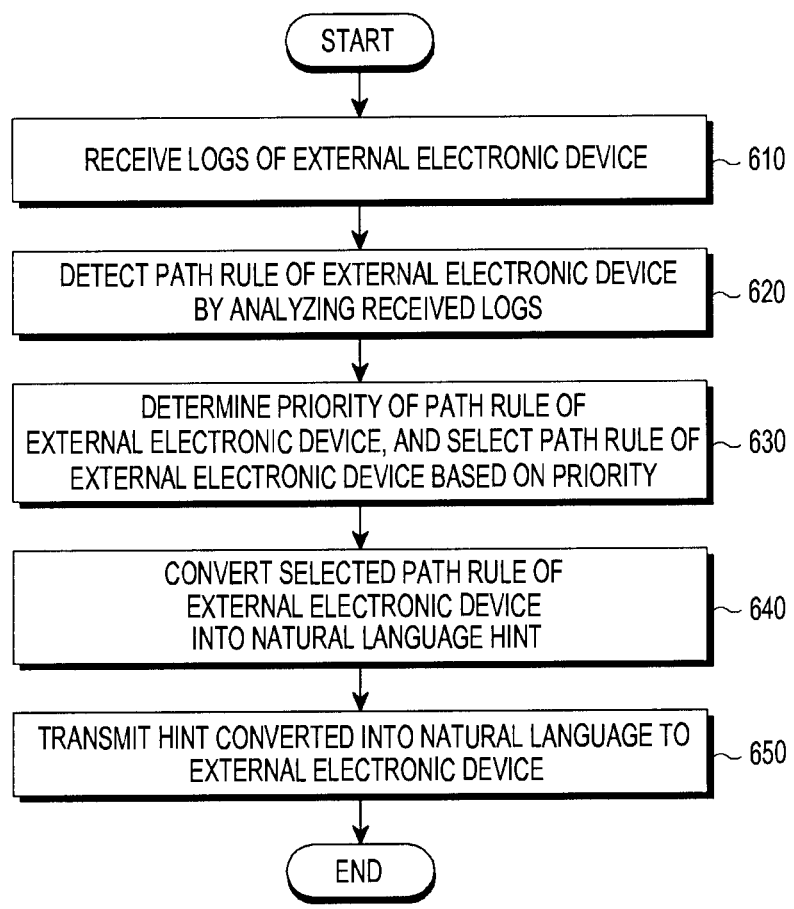
FIG. 6 is a flowchart illustrating a hint generation operation for executing an electronic device according to various embodiments.

FIG. 6 is a flowchart illustrating a hint generation operation for executing the electronic device (e.g., the processor of the server 106) according to various embodiments. Referring to FIG. 6, the electronic device may receive a log from an external electronic device, may generate a hint of the external electronic device based on a usage pattern of a user of the external electronic device, and may transmit the generated hint to the external electronic device.

In operation 610, the electronic device (e.g., the processor of the server 106) may receive a log of the external electronic device from the external electronic device via a wireless communication circuit.

According to an embodiment, the log may include a recording of screens which were sequentially displayed by the external electronic device, in which the external electronic device executed a function including at least one operation according to user input, and/or recording of operations which were sequentially executed by the external electronic device. For example, a single screen displayed according to one operation executed by the external electronic device or execution of the one operation may be referred to as a state, and recording of operations sequentially executed by the external electronic device or recording of screens sequentially displayed to correspond to the sequentially executed operations may be referred to as a state sequence log. For example, the state sequence log may be obtained by sequentially arranging the operations executed according to the user input.

According to an embodiment, the log may further include information on the user input of the external electronic device. For example, the user input of the external electronic device may be various, such as a voice input using a microphone, a touch input on a touch screen, a user manipulation on buttons (or keys), and/or an input using a remote controller.

According to an embodiment, the log may further include context information (also referred to as context) when the external electronic device receives a user input that causes execution of a specific function of the external electronic device, from a user. For example, the context information may be various, such as a location, a date, a time, and/or schedule information stored in the electronic device.

In operation 620, the electronic device (e.g., the processor of the server 106) may analyze the received log and may detect a path rule of the external electronic device, the path rule thereby indicating the sequential change of operation states of the external electronic device. For example, the path rule may be obtained by the electronic device dividing the function of an application into unit operations.

According to an embodiment, the electronic device may predict a usage intention or user-defined purpose of the external electronic device, may select states corresponding to the use intention or purpose of the external electronic device in such a manner that the received log is wholly or partially matched with a previously stored state sequence log, and may find a path rule allowing the selected states to be sequentially executed. For example, the previously stored state sequence log may be updated according to the log of the external electronic device. For example, according to the detection of the path rule, the electronic device may confirm which function of the external electronic device is used, in which context the function is used, and/or through which input means the function is used.

According to another embodiment, the electronic device may analyze a state log that is repeatedly used through pattern analysis of the received state logs of the external electronic device to thereby extract a new path rule. For example, when the state log is performed a designated reference number of times or more, the electronic device may confirm that a user of the external electronic device has repeatedly performed the above-described function through analysis of the received state logs of the external electronic device, and may newly acquire a path rule including the state sequence.

In operation 630, the electronic device (e.g., the processor of the server 106) may determine a priority of the path rule of the external electronic device, and may select the path rule of the external electronic device based on the determined priority.

According to an embodiment, the electronic device may set and/or change the priority of the path rule to correspond to a hint to be provided to the user of the external electronic device, based on information included in the log of the external electronic device.

According to an embodiment, the priority of the path rule may be determined so that a hint converted into a natural language corresponding to the path rule of the external electronic device can be provided to the user in various ways according to a user occasion of the external electronic device. For example, the electronic device may determine the user occasion of the external electronic device based on the context information of the external electronic device and/or a frequency of use of the path rule of the external electronic device.

According to an embodiment, when a plurality of path rules of the external electronic device is detected through log analysis, the electronic device may determine the priority of the plurality of path rules in various ways depending on the purpose in which the plurality of path rules provides the hint to the user of the external electronic device.

In operation 640, the electronic device (e.g., the processor of the server 106) may convert the path rule of the external electronic device selected based on the priority into a natural language hint.

According to an embodiment, the electronic device may convert the path rule of the external electronic device selected based on the priority into a hint in the form of the natural language through a natural language generation technique or mapping with standard utterance matched with the path rule.

In operation 650, the electronic device (e.g., the processor of the server 106) may transmit the hint (e.g., as converted into the natural language) to the external electronic device via a wireless communication circuit.

According to an embodiment, when receiving a request to provide the hint from the external electronic device, the electronic device may transmit the hint to the external electronic device. For example, the external electronic device may automatically make the request to provide the hint from the electronic device when the electronic device is performed or when the application of the electronic device is executed. By way of another example, the external electronic device may make the request to provide the hint from the electronic device according to a user input such as a touch input, a voice input, a user manipulation on hardware buttons (or keys), and/or an input using a remote controller.

Figure 7:
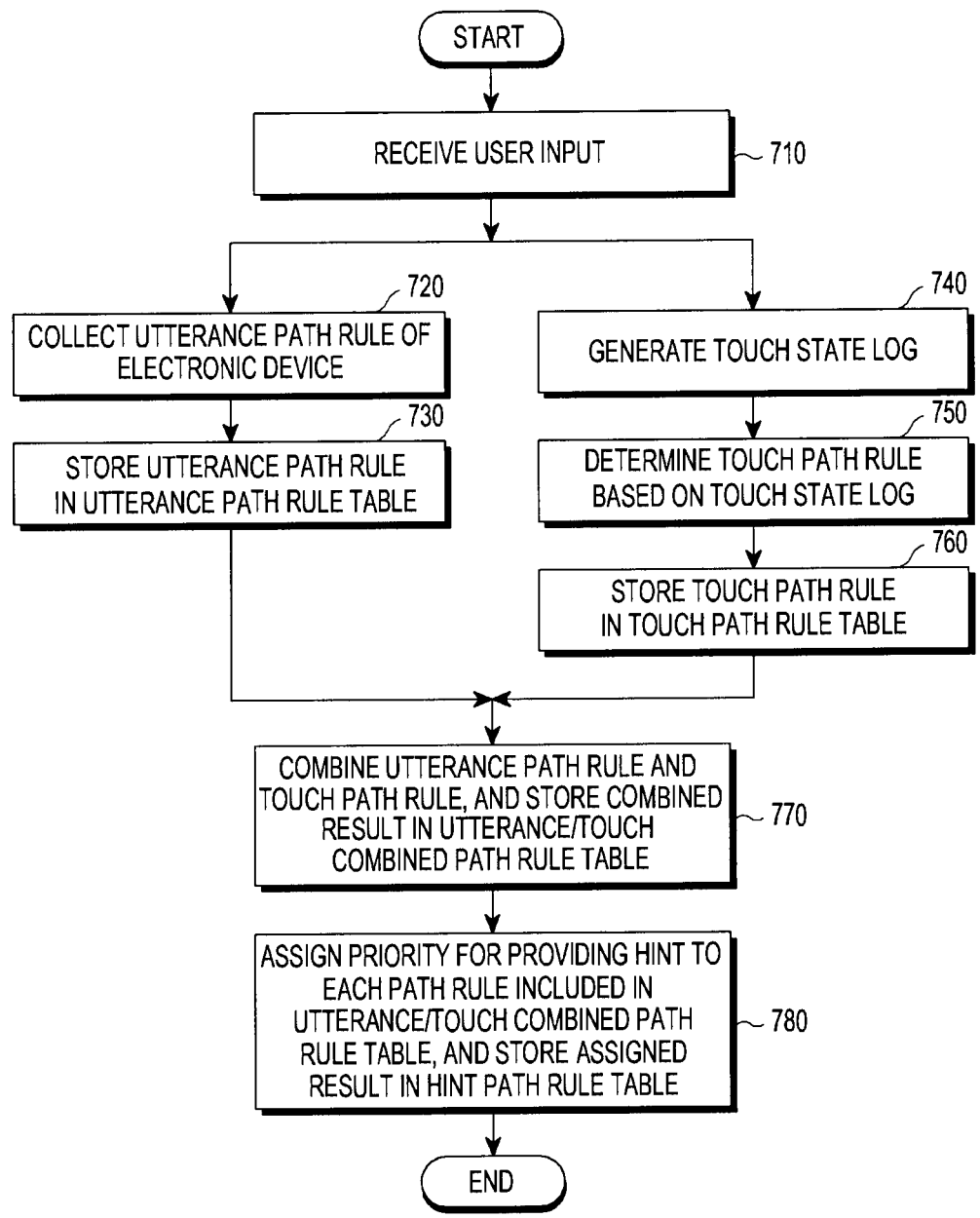
FIG. 7 is a flowchart illustrating the operation of an electronic device that generates a path rule through user log collection of the electronic device according to various embodiments.

FIG. 7 is a flowchart illustrating the operation of the electronic device (e.g., the electronic device 101) that generates a path rule through user log collection of the electronic device according to various embodiments. Referring to FIG. 7, the electronic device may generate and/or determine a path rule for generating a hint to be provided to a user.

In operation 710, the electronic device (e.g., the electronic device 101) may receive a user input.

According to an embodiment, the user input may be various, such as a voice input, a touch input, a user manipulation on buttons (or keys), and/or an input using a remote controller.

According to an embodiment, the user input may be a single input that causes the electronic device to perform one operation, or a plurality of consecutive inputs that causes the electronic device to perform operations consecutively.

According to an embodiment, when the user input includes at least one voice input via a microphone, the electronic device (e.g., the processor 120) may collect utterance path rules of the electronic device based on the voice input in operation 720. For example, the electronic device may determine which utterance path rule is input as a voice in order for the electronic device to perform specific operations sequentially, using natural language understanding (NLU). For example, the utterance path rule may be log data for sequential operations of the electronic device.

In operation 730, the electronic device (e.g., the processor 120) may store the collected utterance path rules in an utterance path rule table. For example, the utterance path rule table may be stored in a memory of the electronic device.

According to an embodiment, when the user input includes at least one touch input on the touch screen, the electronic device (e.g., the processor 120) may generate a touch state log based on the touch input in operation 740. For example, the electronic device may generate the touch state log obtained by sequentially combining operations performed to correspond to each of the touch inputs which are consecutively received.

For example, the electronic device may generate the touch state log obtained by sequentially combining the states of the electronic device which are changed by the touch input.

In operation 750, the electronic device (e.g., the processor 120) may determine a touch path rule based on the touch state log. For example, the electronic device may confirm to which portion a portion corresponding to the state sequence log in which the touch state log is stored corresponds, by comparing the touch state log with a state sequence log stored in an existing rule database (or the memory of the electronic device) through a rule mapper process, and may extract the touch path rule corresponding to the touch state log from the stored state sequence log.

The rule mapper process is a process of finding a previously defined path rule by analyzing the collected logs (e.g., the touch state logs), and will be described in detail with reference to FIG. 8.

FIGS. 8(*a*) to 8(*d*) are diagrams illustrating an operation of determining a path rule of the electronic device (e.g., the electronic device 101) depending on a user input according to various embodiments.

According to an embodiment, the path rule may be stored in the form of a table that defines a path rule including a representative dialog for a final result that can be achieved by a combination of various operations for performing a specific function of the electronic device and including information of a sequence of states for sequentially executing the various operations. For example, the representative dialog may include user intention for performing the specific function.

For example, the path rule may comply with a hierarchy structure of a user interface (UI) through which a user uses a specific function of the electronic device, and the hierarchy structure may be expressed in a state structure according to a screen and/or a function. The path rule may be obtained by defining a state sequence for a path that can be processed in the forward direction in the hierarchical structure of the UI.

For example, as shown in FIG. 8(*a*), the path rule may be defined in the form of a table that includes a representative dialog 801 for the final result that can be achieved by the combination of the various operations (functions) for performing the function of the electronic device, a path rule ID 803 for identifying the path rule, a path rule (name) 805 indicating operations sequentially executed in order for the electronic device to achieve the final result, and a path rule (state) 807 indicating a combination of state IDs corresponding to each of the operations.

According to an embodiment, the electronic device may assign the state ID for each of the operations of the electronic device. For example, the electronic device may assign the state ID for each operation of applications in advance. Referring to FIG. 8(*b*), a gallery application may include execution, photo view, photo search, photo selection, selected photo removal, album view, album selection, execution of animation function to apply an animation effect to photos included in the selected album, and execution of collage function to combine the photos included in the selected album of the gallery application, or may include execution of shutdown function to shut down the gallery application. In addition, for example, a state ID of State_1 may be assigned to the execution of the gallery application, a state ID of State_2 may be assigned to the photo view, a state ID of State_3 may be assigned to the photo search, a state ID of State_4 may be assigned to the photo selection, a state ID of State_5 may be assigned to the selected photo removal, a state ID of State_6 may be assigned to the album view, a state ID of State_7 may be assigned to the album selection, a state ID of State_8 may be assigned to the execution of animation function, a state ID of State_9 may be assigned to the execution of collage function, and a state ID of State 10 may be assigned to the execution of shutdown function.

According to an embodiment, the electronic device may be storing the state sequence log that is sequential operation recording of the electronic device which is pre-set or generated according to a previous user input. In addition, the electronic device may store user input information for allowing each operation to be performed and application information in which each operation is performed.

According to another embodiment, as shown in FIG. 8(c), the electronic device may store the state sequence log as a state ID corresponding to each operation. Referring to FIG. 8(c), the electronic device may associate, with corresponding user inputs 811, the state IDs 813 corresponding to respective operations which have been sequentially executed according to the sequential user inputs 811, and may store the result. In addition, the electronic device may associate even application information 815 through which the operations are executed with the state IDs 813, and may store the result. For example, the electronic device may associate, with the application information 815 corresponding to the respective operations such as " . . . Gallery, Gallery, Gallery, Gallery, Gallery, Gallery, Gallery, Gallery, Gallery, Gallery, Gallery . . . ", the sequential user inputs 811 such as " . . . touch, touch, touch, touch, keyboard, touch, voice, touch, touch, touch, touch . . . " and the state IDs 813 such as " . . . State_2, State_10, State_1, State_2, State_3, State_4, State_5, State_6, State_7, State_2, State_4, . . . " which are combinations of the state IDs corresponding to the respective operations executed according to the user inputs 811.

According to an embodiment, when the state of an application for a user input (e.g., a multi-input) is changed, the state sequence logs may be collected, and may be collected together with the name of the application, the type of the user input, a time context, and the like as well as the state ID. The electronic device may find a pattern matched with the user input from the state sequence log in various ways using the collected state sequence logs to generate a path rule.

According to an embodiment, the electronic device may determine a path rule for processing a dialog of a user based on the previously stored state sequence log described above.

For example, referring to FIG. 8(a), in order to process a first dialog of "delete photo taken yesterday", the electronic device may expect to select this gallery application. For example, the electronic device may predict operations in the order according to a path rule of 'App execution—photo view—search—photo selection—deletion' in order to process the first dialog. For example, the electronic device may find, from the previously stored state sequence log of the gallery application of the electronic device, 'App execution—photo view—search—photo selection—deletion' that is an operation path rule corresponding to Path_Rule_1 that is a path rule ID of the first dialog and/or a part matched with the path rule indicating combinations of the state IDs corresponding to the operation path rule, and may generate the path rule corresponding to the first dialog. For example, the electronic device may find a part 821 completely matched with the path rule of the first dialog from the state sequence log as shown in FIG. 8(d), and may generate the found part 821 as a path rule corresponding to the first dialog.

For example, referring to FIG. 8(a), the electronic device may predict selecting the gallery application in order to process a second dialog of 'Show my Hawaii photos as album animation'. For example, the electronic device may predict operations in the order according to a path rule of 'App execution—album view—album selection—animation' in order to process the second dialog. For example, the electronic device may find, from the previously stored state sequence log of the gallery application of the electronic device, 'App execution—album view—album selection—animation' that is an operation path rule corresponding to Path_Rule_2 that is an ID of the second dialog and/or a part matched with the path rule indicating combinations of the state IDs corresponding to the operation path rule, and may generate a path rule corresponding to the second dialog. For example, when there is no part completely matched with the path rule of the second dialog from the previously stored state sequence log, the electronic device may find a part 823 partially matched therewith and may generate the path rule corresponding to the second dialog.

According to another embodiment, when it is assumed that transmission of a new message to an acquaintance by a user through a short message service (SMS) is performed by the electronic device via a touch input, according to the above-described embodiment, the electronic device may generate a log for an operation state of a message application, and the user may extract a path rule corresponding to a dialog of "transmission of new message by user through SMS" through a rule mapper processor and may store the corresponding path rule in a touch path rule.

In operation 760, the electronic device (e.g., the processor 120) may store the touch path rule in a touch path rule table. For example, the touch path rule table may be stored in the memory of the electronic device.

In operation 770, the electronic device (e.g., the processor 120) may combine an utterance path rule of an utterance path rule table and the touch path rule of the touch path rule table and may store the combined result in an utterance/touch combined path rule table. For example, the utterance/touch combined path rule table may be stored in the memory of the electronic device. For example, when the electronic device executes a first operation according to a first touch input, executes a second operation according to a second touch input, executes a third operation according to a first voice input, and executes a fourth operation according to a third touch input, the electronic device may store the first operation—the second operation—the third operation—the fourth operation as a single path rule. For example, the electronic device may make a database together with the number of times each path rule is performed or the like, and may store the database. For example, the electronic device may also store information indicating whether each path rule has been performed through a touch or a voice input so as to be distinguished.

According to an embodiment, when a plurality of path rules is generated through the above-described operations or when a plurality of path rules is generated according to above-described operations 710 to 770 repeatedly performed, the electronic device (e.g., the processor 120) may assign a priority for providing a hint to each path rule included in the utterance/touch combined path rule table according to a designated condition, and may store the result in a hint path rule table in operation 780. For example, the electronic device may give a hint to a user by assigning a priority to a path rule that the user uses frequently in an existing touch method but does not use via voice utterance, in order to expand user experience to the voice utterance. For example, the electronic device executes a gallery application to perform an operation of collecting photos in a specific place according to a user input into a single album. Here, the user input every time the operation is performed may be a touch input rather than a voice input. In such a case, the electronic device may provide a hint indicating that the operation can be performed via the voice utterance, which can help a user to easily operate a function used through a voice command.

Meanwhile, in the above-described embodiment of FIG. 7, it has been described that the electronic device generates the path rule through user log collection of electronic device. However, according to another embodiment, the electronic device (e.g., the server 106) may receive operations executed by an external electronic device according to a user input or recording of the operations from the external electronic device via a wireless communication circuit, and may be operated in a method similar to the above-described operation (corresponding method). For example, the electronic device may execute operations of collecting utterance path rules of the external electronic device, storing the utterance path rules in the utterance path rule table, generating the touch state log of the external electronic device, determining the touch path rule based on the touch state log, storing the touch path rule in the touch path rule table, combining the utterance path rule and the touch path rule to store the combined result in the utterance/touch combined path rule table, and assigning a priority for providing a hint to each path rule included in the utterance/touch combined path rule table to store the assigned result in the hint path rule table. For example, the electronic device may generate the path rule through log collection for each of a plurality of external devices (users), thereby storing the hint path rule table for each of the plurality of external devices (users).

Figure 9:
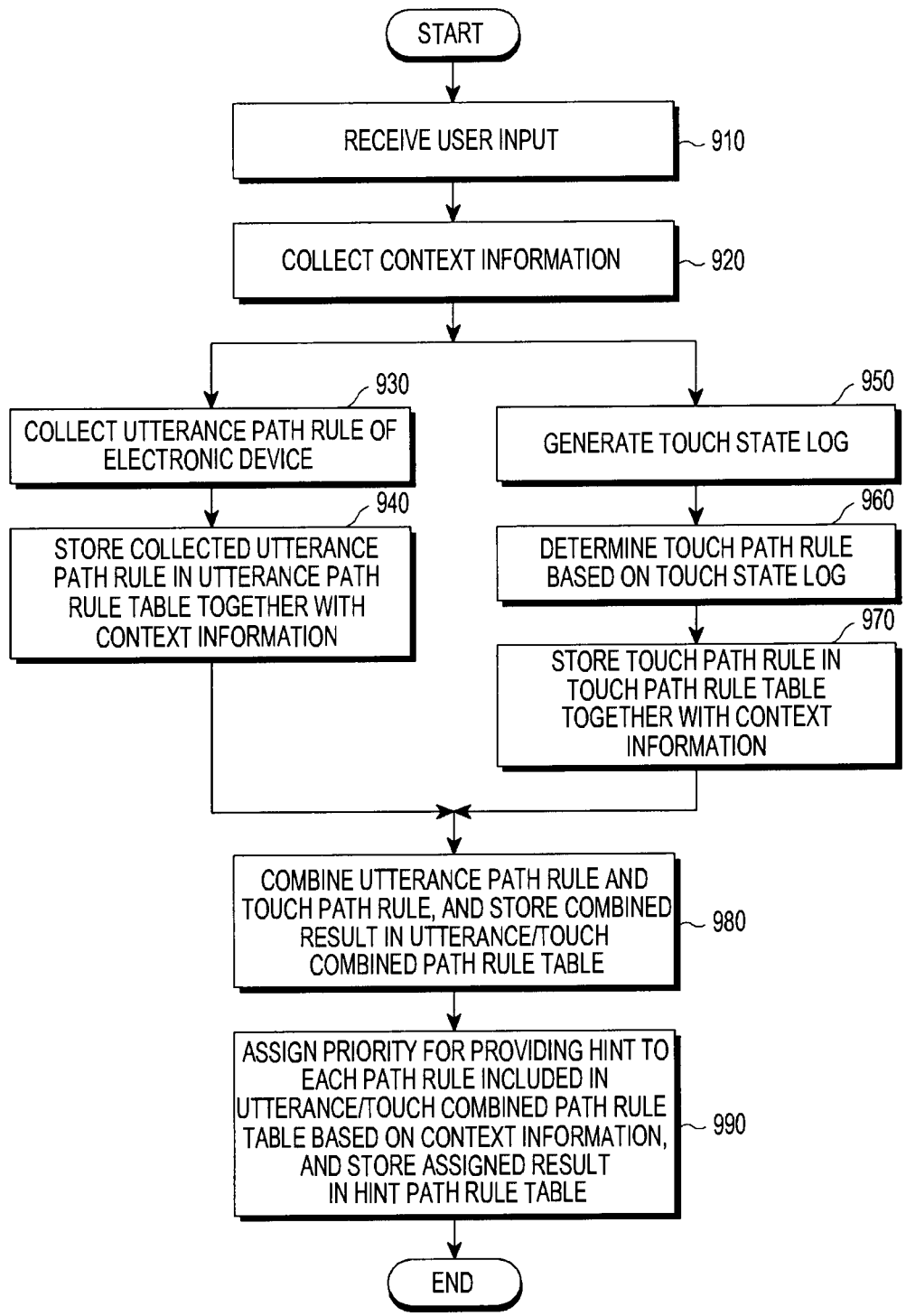
FIG. 9 is a flowchart illustrating the operation of an electronic device that generates a path rule through user log collection of the electronic device according to various embodiments.

FIG. 9 is a flowchart illustrating the operation of an electronic device (e.g., the electronic device 101) that generates a path rule through user log collection of the electronic device according to various embodiments. Referring to FIG. 9, the electronic device may generate and/or determine a path rule according to a user input, and may collect and store context information. The electronic device may assign a priority for providing a hint to each path rule based on the context information so that an appropriate hint may be provided to a user occasion.

In operation 910, the electronic device (e.g., the processor 120) may receive a user input.

According to an embodiment, the user input may be various, such as a voice input, a touch input, a user manipulation on buttons (or keys), and/or an input using a remote controller.

According to an embodiment, the user input may be a single input that causes the electronic device to perform one operation, or a plurality of consecutive inputs that causes the electronic device to perform operations consecutively.

In operation 920, the electronic device (e.g., the processor 120) may collect context information. For example, the context information may be various, such as a current date, a current time, a location where the electronic device is located, and/or schedule information stored in the electronic device.

According to an embodiment, when the user input includes at least one voice input via a microphone, the electronic device (e.g., the processor 120) may collect utterance path rules of the electronic device based on a voice input in operation 930. For example, the electronic device may determine which utterance path rule is input as a voice in order for the electronic device to perform specific operations sequentially, using natural language understanding. For example, the utterance path rule may be log data for sequential operations of the electronic device.

In operation 940, the electronic device (e.g., the processor 120) may store the collected utterance path rules in an utterance path rule table together with the context information.

According to an embodiment, when the user input includes at least one touch input on the touch screen, the electronic device (e.g., the processor 120) may generate a touch state log based on the touch input in operation 950. For example, the electronic device may generate the touch state log obtained by sequentially combining operations performed to correspond to each of the touch inputs which are consecutively received. For example, the electronic device may generate the touch state log obtained by sequentially combining the states of the electronic device which are changed by the touch input.

In operation 960, the electronic device (e.g., the processor 120) may determine a touch path rule based on the touch state log. For example, the electronic device may confirm to which portion a portion corresponding to the state sequence log in which the touch state log is stored corresponds, by comparing the touch state log with a state sequence log stored in an existing rule database through a rule mapper process, and may extract the touch path rule corresponding to the touch state log from the stored state sequence log. The rule mapper process has been described in detail with reference to FIG. 8, and thus further description thereof will be omitted.

In operation 970, the electronic device (e.g., the processor 120) may store the touch path rule in the touch path rule table together with the context information.

For example, when a user has performed an operation of transmitting a new message to an acquaintance using SMS via the touch input in a car in the morning, the electronic device may generate a log for a state of a message application in the message application, that is, generate a path rule, may analyze the path rule to extract the fact that the user has performed a path rule of "transmission of new message using SMS", and may store the corresponding path rule in the touch path rule table. The electronic device may also store context information indicating that the above-described operation has been performed in the car in the morning while storing the path rule.

In operation 980, the electronic device (e.g., the processor 120) may generate a path rule by combining the utterance path rule of the utterance path rule table and the touch path rule of the touch path rule table, and may store the generated path rule in an utterance/touch combined path rule table together with the context information. For example, when the electronic device executes a first operation according to a first touch input, executes a second operation according to a second touch input, executes a third operation according to a first voice input, and executes a fourth operation according to a third touch input, the electronic device may store the first operation—the second operation—the third operation—the fourth operation as a single path rule. For example, the electronic device may make a database together with the number of times each path rule is performed or the like, and may store the database. For example, the electronic device may also store information indicating whether each path rule has been performed through a touch or a voice input so as to be distinguished.

According to an embodiment, when a plurality of path rules is generated through the above-described operations or when a plurality of path rules is generated according to above-described operations 910 to 980 repeatedly performed, the electronic device (e.g., the processor 120) may assign a priority for providing a hint to each path rule included in the utterance/touch combined path rule table based on the context information according to a designated condition, and may store the result in a hint path rule table in operation 990.

According to an embodiment, the electronic device may give a hint to a user by assigning a priority to a path rule that the user uses frequently in an existing touch method but does not use via voice utterance, in order to expand user experience to the voice utterance. For example, a user frequently performs an operation of collecting photos stored in a specific area in a gallery application to make them into albums. Here, when the user mainly performs the operation of collecting photos through a touch and does not try to utter the same through a voice, the electronic device may provide the fact that the corresponding function can be performed via the voice utterance to the user as a hint, thereby helping to use frequently used functions through a voice command.

According to an embodiment, the electronic device may assign the priority by classifying user input methods into touch input method and voice input method according to the context information. For example, assuming that a user tries to execute a media content such as a movie, for example, when the user tries to execute the media content mainly via a voice in a specific place such as a user's house other than a user's company and to execute the same via a touch in a place such as the user's company, when the user is located in the company at the time of determining a priority of a hint for inducing the voice utterance, a path rule for executing the media content may be set to have a lower priority in the hint, thereby reducing a probability of providing the hint.

Meanwhile, in the embodiment of FIG. 9, it has been described that the electronic device generates the path rule through user log collection of the electronic device. However, according to another embodiment, the electronic device (e.g., the server 106) may receive operations executed by an external electronic device according to a user input or recording of the operations from the external electronic device via a wireless communication circuit, and may be operated in a method similar to the above-described operation (corresponding method). For example, the electronic device may execute operations of collecting utterance path rules of the external electronic device, storing the utterance path rules in the utterance path rule table together with the context information of the external electronic device, generating the touch state log of the external electronic device, determining the touch path rule based on the touch state log, storing the touch path rule in the touch path rule table together with the context information of the external electronic device, combining the utterance path rule and the touch path rule to store the combined result in the utterance/touch combined path rule table, and assigning a priority for providing a hint to each path rule included in the utterance/touch combined path rule table based on the context information of the external electronic device, and may store the assigned result in the hint path rule table. For example, the electronic device may generate the path rule through log collection for each of a plurality of external devices (users), thereby having the hint path rule table for each of the plurality of external devices (users).

Figure 10:
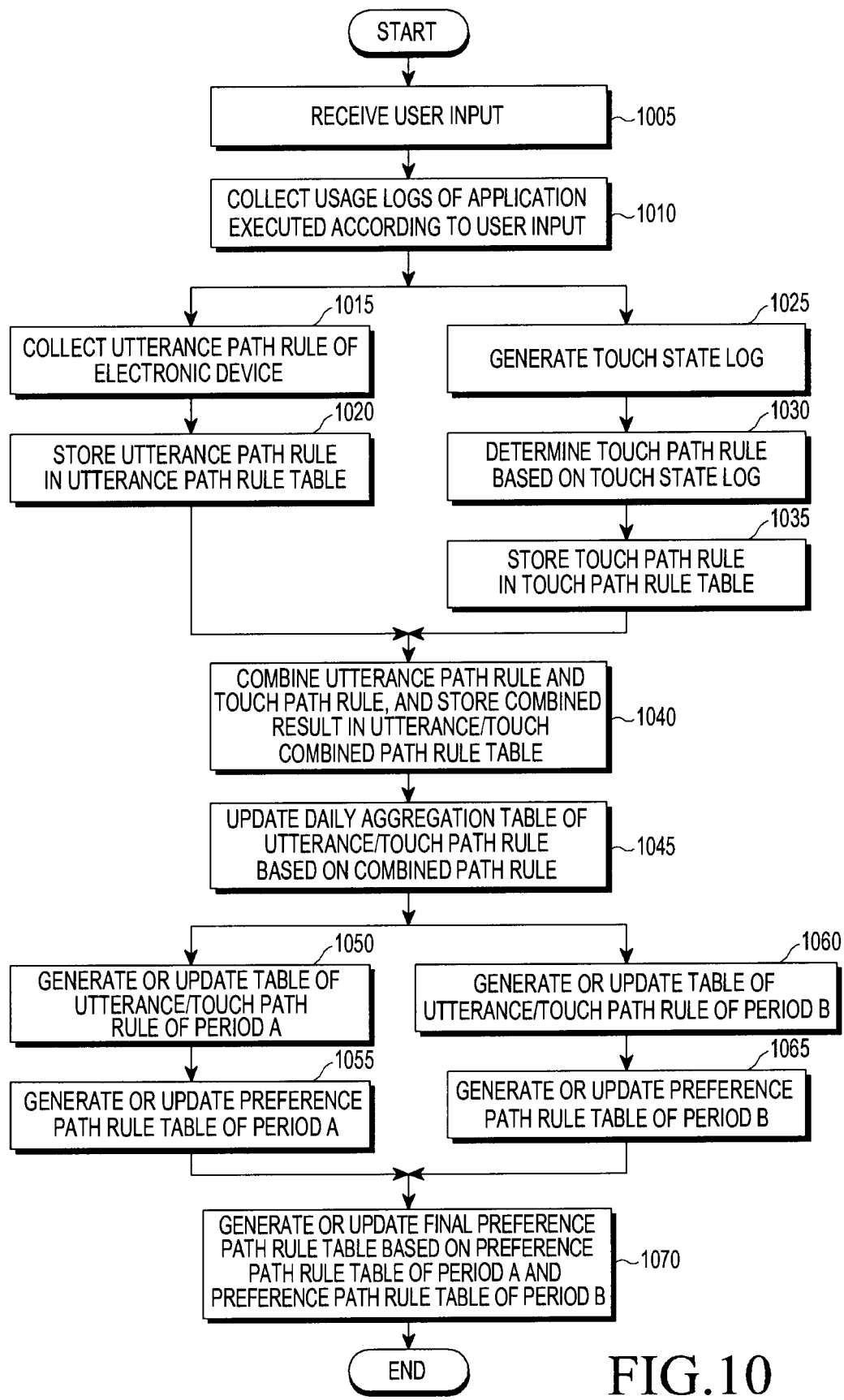
FIG. 10 is a flowchart illustrating the operation of an electronic device that generates a path rule through user log collection of the electronic device according to various embodiments.

FIG. 10 is a flowchart illustrating the operation of an electronic device (e.g., the electronic device 101) that generates a path rule through user log collection of the electronic device according to various embodiments. Referring to FIG. 10, the electronic device may generate and/or determine a path rule according to a user input, and may collect usage logs of any one application executed according to the user input. The electronic device may assign a priority for providing a hint to each path rule based on the usage logs of the application so that the hint of the application may be appropriately provided.

In operation 1005, the electronic device (e.g., the processor 120) may receive a user input.

According to an embodiment, the user input may be various, such as a voice input, a touch input, a user manipulation on buttons (or keys), and/or an input using a remote controller.

According to an embodiment, the user input may be a single input that causes the electronic device to perform one operation, or a plurality of consecutive inputs that causes the electronic device to perform operations consecutively.

In operation 1010, the electronic device (e.g., the processor 120) may collect the usage logs of the application executed according to the user input.

According to an embodiment, the usage logs of the application may include context information. For example, the usage logs of the application may include information such as at which time the application is used, at which place the application is used, in which context the application is used, and/or with which application the application is used together.

According to an embodiment, the electronic device may aggregate the collected usage logs of each of the applications for a specific period. For example, the electronic device may aggregate the usage logs of each of the applications in various units, such as daily, monthly, hourly, or seasonal units. By way of another example, the electronic device may manage user characteristic data as a result of the aggregation of the usage logs of each of the applications for the specific period by defining the specific period. For example, when a user uses a first application during the weekday morning for the specific period but does not use the first application during the weekend, the electronic device may manage the user characteristic data as the fact that the user mainly uses the first operation during the weekday morning, based on the result of the aggregation of the usage logs of the first application for the specific period. By way of still another example, the electronic device may manage the use logs of the first application by dividing a plurality of periods into a period A, a period B, and the like. For example, the electronic device may manage the usage logs of the first application by dividing the database into the aggregation for a week and the aggregation for a day, and may utilize the managed usage logs for hint generation.

According to an embodiment, when the user input includes at least one voice input via a microphone, the electronic device (e.g., the processor 120) may collect utterance path rules of the electronic device based on the voice input in operation 1015. For example, the electronic device may determine which utterance path rule is input as a voice in order for the electronic device to perform specific operations sequentially, using a natural language understanding technique. For example, the utterance path rule may be log data for sequential operations of the electronic device.

In operation 1020, the electronic device (e.g., the processor 120) may store the collected utterance path rules in an utterance path rule table.

According to an embodiment, when the user input includes at least one touch input on the touch screen, the electronic device (e.g., the processor 120) may generate a touch state log based on the touch input in operation 1025. For example, the electronic device may generate the touch state log obtained by sequentially combining operations performed to correspond to each of the touch inputs which are consecutively received. For example, the electronic device may generate the touch state log obtained by sequentially combining the states of the electronic device which are changed by the touch input.

In operation 1030, the electronic device (e.g., the processor 120) may determine a touch path rule of an application based on the touch state log. For example, the electronic device may confirm to which portion a portion corresponding to the state sequence log in which the touch state log is stored corresponds, by comparing the touch state log with a state sequence log stored in an existing rule database through a rule mapper process, and may extract the touch path rule corresponding to the touch state log from the stored state sequence log. The rule mapper process has been described in detail with reference to FIG. 8, and thus further description thereof will be omitted.

In operation 1035, the electronic device (e.g., the processor 120) may store the touch path rule in the touch path rule table of the application.

In operation 1040, the electronic device (e.g., the processor 120) may combine the utterance path rule of the utterance path rule table and the touch path rule of the touch path rule table, and may store the combined result in an utterance/touch combined path rule table. For example, the electronic device executes a first operation according to a first touch input, executes a second operation according to a second touch input, executes a third operation according to a first voice input, and executes a fourth operation according to a third touch input, the electronic device may store the first operation—the second operation—the third operation—the fourth operation as a single path rule. For example, the electronic device may make a database together with the number of times each path rule is performed or the like, and may store the database. For example, the electronic device may also store information indicating whether each path rule has been performed through a touch or a voice input so as to be distinguished.

In operation 1045, the electronic device (e.g., the processor 120) may update a daily aggregate table of the utterance/touch path rule based on the combined path rule. For example, the electronic device may aggregate daily generated path rules and may store the aggregated path rules in the daily aggregate table.

In operation 1050, the electronic device (e.g., the processor 120) may generate a table of the utterance/touch path rule of the period A based on the daily aggregation table, or may update the previously generated table of the utterance/touch path rule of the period A. For example, the electronic device may generate the table of the utterance/touch path rule of the period A by collecting the path rules stored in the daily aggregation tables corresponding to the period A, in order to manage the path rules during the period A. By way of another example, the electronic device may update the previously generated table of utterance/touch path rule of the period A using the path rules stored in the daily aggregation tables corresponding to the period A.

In operation 1055, the electronic device (e.g., the processor 120) may generate a user's preference path rule to which a priority score is assigned based on the usage logs of the application and a table of the preference path rule of the period A including time, place, occasion, application (TPOA) information corresponding to the user's preference path rule, or may update a previously generated preference path rule table of the period A. For example, the electronic device may assign the priority score to each path rule included in the table of the utterance/touch path rule of the period A based on the usage logs (referred to as user's profile information) of the first application. For example, the TPOA information may be usage-based information, and may be a generation time of the path rule, a generation location of the path rule, a context when the path rule is generated, and/or application information of the path rule.

In operation 1060, the electronic device (e.g., the processor 120) may generate a table of an utterance/touch path rule of the period B based on the daily aggregation table, or may update a previously generated table of an utterance/touch path rule of the period B. For example, the electronic device may generate the table of the utterance/touch path rule of the period B by collecting the path rules stored in the daily aggregation tables corresponding to the period B, in order to manage the path rules during the period B.

In operation 1065, the electronic device (e.g., the processor 120) may generate a user's preference path rule to which a priority score is assigned based on the usage logs of the application and a table of the preference path rule of the period B including TPOA information corresponding to the user's preference path rule, or may update a previously generated preference path rule table of the period B. For example, the electronic device may assign the priority score to each path rule included in the table of the utterance/touch path rule of the period B based on the usage logs (referred to as user's profile information) of the first application. For example, the TPOA information may be usage-based information, and may be a generation time of the path rule, a generation location of the path rule, a context when the path rule is generated, and/or application information of the path rule.

According to an embodiment, when the period A is set as six months, the period B is set as one week, and a larger priority score is assigned to the period A rather than the period B, path rules preferred by a user, that is, path rules corresponding to a hint to be provided to the user may be path rules that are used frequently for the six months. According to another embodiment, when the period A is set as six months, the period B is set as one week, and a larger priority score is assigned to the period B rather than the period A, path rules preferred by a user may be path rules that are frequently used recently, and the path rules included in the period A may be included in an upper recommended path rule with a higher priority score in a user preference rule list. In operation 1070, the electronic device (e.g., the processor 120) may generate a final preference path rule table based on the preference path rule table of the period A and the preference path rule table of the period B, or may update a previously generated final preference path rule table. For example, the electronic device may generate the final preference path rule table including the preference path rule table of the period A, the path rules included in the period B, and the TPOA information. For example, the electronic device may manage the path rules included in the final preference path rule table together with the TPOA information to provide a hint according to a user occasion.

For example, the electronic device may recommend a hint about a function that is frequently used in the user occasion using the TPOA information, and when the user has difficulty in inputting the voice input, the function may be executed according to the touch input of the user with respect to the provided hint.

Meanwhile, according to the above-described embodiment, it has been described that the electronic device aggregates the generated path rules in daily units in operation 1045, but according to another embodiment, the electronic device may aggregate and store the path rules generated during various unit periods such as monthly, hourly, seasonal units, and the like.

In the above-described embodiment of FIG. 10, in regard to the collection of the usage logs of the application, it has been described that the electronic device collects the usage logs of the application executed according to the user input in operation 1010, but according to another embodiment, the electronic device may collect the usage logs of the application during the execution of the operation of the electronic device and/or the execution of the application.

In the above-described embodiment of FIG. 10, it has been described that the electronic device generates the path rule through the user log collection of the electronic device. However, according to another embodiment, the electronic device (e.g., the server 106) may receive, from an external electronic device via a wireless communication circuit, operations executed by the external electronic device according to the user input or recording of the operations and the usage log of the first application, and may be operated in a method similar to the above-described operation (corresponding method). For example, the electronic device may execute operations of collecting utterance path rules of the external electronic device, storing the utterance path rules in the utterance path rule table, generating a touch state log of the external electronic device, determining a touch path rule based on the touch state log, storing the touch path rule in the touch path rule table, combining the utterance path rule and the touch path rule to store the combined result in the utterance/touch combined path rule table, updating the daily aggregation table of the utterance/touch path rule based on the combined touch path rule, generating the table of the utterance/touch path rule of the period A, generating the preference path rule table of the period A, generating the table of the utterance/touch path rule of the period B, generating the preference path rule table of the period B, and generating the final preference path rule table based on the preference path rule table of the period A and the preference path rule table of the period B. For example, the electronic device may generate the path rule through log collection for each of a plurality of external devices (users), thereby having the final preference path rule table for each of the plurality of external devices (users).

Figure 11:
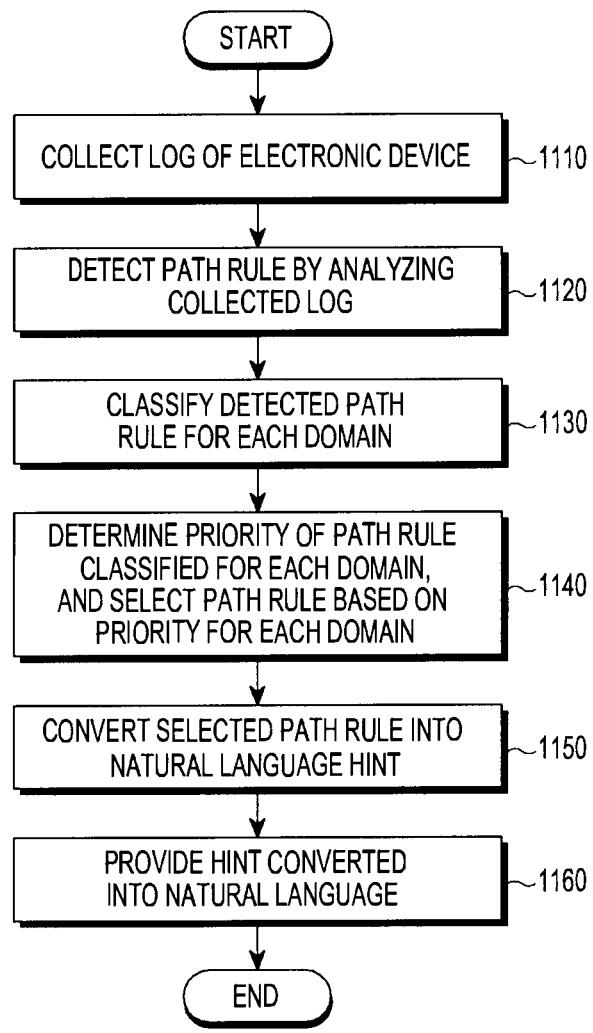
FIG. 11 is a flowchart illustrating a hint generation operation for execution of an electronic device according to various embodiments.

FIG. 11 is a flowchart illustrating a hint generation operation for execution of an electronic device (e.g., the electronic device 101) according to various embodiments. Referring to FIG. 11, the electronic device may generate a domain-specific hint that is effective for the use of the electronic device in the processor (e.g., the processor 120) of the electronic device based on a usage pattern of a user, and may provide the generated hint to the user.

In operation 1110, the electronic device (e.g., the processor 120) may collect logs of the electronic device.

According to an embodiment, the electronic device may collect the logs of the electronic device. For example, when executing at least one operation according to a user input, the electronic device may collect logs according to the execution of the at least one operation. For example, the electronic device may collect screen transformation information displayed when a user uses the electronic device.

According to an embodiment, the logs may include recording of screens which are sequentially displayed by the electronic device in order for the electronic device to execute a function including the at least one operation according to the user input and/or recording of operations which are sequentially executed by the electronic device. For example, a single screen displayed according to one operation executed by the electronic device or the execution of the one operation may be referred to as a state, and recording of the operations sequentially executed by the electronic device or recording of screens sequentially displayed to correspond to the sequentially executed operations may be referred to as a state sequence log (hereinafter, also referred to as a sequence of states).

According to an embodiment, the logs may further include information on the user input. For example, the user input may be various, such as a voice input using a microphone, a touch input on a touch screen, a user manipulation on buttons (or keys), and/or an input using a remote controller.

According to an embodiment, the logs may further include context information (also referred to as context) when the electronic device receives, from a user, a user input that causes execution of any one function of the electronic device. For example, the context information may be various, such as a location, a date, a time, and/or schedule information stored in the electronic device.

In operation 1120, the electronic device (e.g., the processor 120) may analyze collected logs and may detect at least one path rule indicating sequentially changed states.

According to an embodiment, the electronic device may select states corresponding to the use intention or purpose of the electronic device in such a manner that the collected logs are wholly or partially matched with a previously stored state sequence log (also referred to as a reference sequence of states), and may find the path rule allowing the selected states to be sequentially executed. For example, the previously stored state sequence log may be updated according to the operation of the electronic device depending on the user input. For example, according to the detection of the path rule, the electronic device may confirm which function of the electronic device is used, in which context the function is used, and/or through which input means the function is used.

According to another embodiment, the electronic device may analyze a state log that is repeatedly used through pattern analysis of the collected state logs to thereby extract a new path rule. For example, when the state log is performed a designated reference number of times or more, the electronic device may confirm that a user has repeatedly performed the above-described function through analysis of the collected state logs, and may newly acquire a path rule including the state sequence.

In operation 1130, the electronic device (e.g., the processor 120) may classify the detected path rules for each domain. For example, the electronic device may classify to which domain the detected path rule belongs.

According to an embodiment, the electronic device may classify the domains in functional units. For example, the domains may be classified into messenger domains, game domains, and Internet banking domains, and the like. For example, the messenger domain may include path rules performed in KakaoTalk, Line Messenger, Allo, Facebook Messenger, and the like.

According to another embodiment, the electronic device may classify the domains in application units. For example, the electronic device may determine whether the corresponding path rule belongs to KakaoTalk, Line, or the like.

In operation 1140, the electronic device (e.g., the processor 120) may determine a priority of the path rules which are classified for each domain and may select the path rule based on the priority for each domain.

According to an embodiment, the electronic device may change the priority of the path rules classified for each domain corresponding to a hint to be provided to a user based on information included in the logs.

According to an embodiment, the priority may be determined so that a hint converted into the natural language corresponding to the path rule classified for each domain can be provided to a user according to a user occasion in various ways. For example, the electronic device may determine the user occasion based on the context information.

According to an embodiment, when the path rules classified for each of a plurality of domains are detected through the log analysis, the electronic device may determine the priority of the plurality of path rules in various ways depending on the purpose in which the plurality of path rules provides the hint to the user. For example, when there is the purpose to provide the hint so that the user may easily process the path rule, which is frequently used via a touch input, in the natural language, a high priority may be assigned to the path rule which is used via the touch input but is not utilized well via the voice input. This can increase the utilization of the hint by reducing interface steps of a frequently used function. By way of another example, assuming that a user uses the same path rule mainly through the voice input at home and controls the same path rule via the touch input at the office, when a user's location is the office at the time of providing a hint to the user, the electronic device may exclude the path rule of the hint that suggests the voice input to the user.

In operation 1150, the electronic device (e.g., the processor 120) may convert the path rule selected based on the priority for each domain into a natural language hint. According to an embodiment, the electronic device may convert the path rule selected based on the priority for each domain into a hint in the form of the natural language through a natural language generation technique or mapping with standard utterance matched with the path rule.

In operation 1160, the electronic device (e.g., the processor 120) may provide the hint converted into the natural language.

According to an embodiment, the electronic device may provide the hint converted into the natural language via a display.

According to another embodiment, the electronic device may output the hint converted into the natural language as a voice via a speaker, using a character-to-speech conversion technique.

According to still another embodiment, the electronic device may provide the hint converted into the natural language via the display and the speaker.

According to an embodiment, when a user utters or touches the hint displayed on the display, the electronic device may sequentially execute the states of the path rule corresponding to the hint. For example, the electronic device may display a final state in which the states are sequentially executed on the touch screen. By way of another example, the electronic device may sequentially display all the sequential executions of the states on the touch screen.

According to an embodiment, the electronic device may automatically execute the above-described operations of FIG. 11 upon the execution of the electronic device, or may execute the above-described operations of FIG. 11 according to the user input such as a touch input, a voice input, and/or a user manipulation on buttons (or keys) which may cause the above-described operations of FIG. 11 to be executed.

Meanwhile, in the above-described embodiment of FIG. 11, it has been described that the electronic device executes all of operations of providing the hint converted into the natural language through log collection of the electronic device. However, according to another embodiment, the electronic device (e.g., the server 106) may receive operations executed by an external electronic device according to the user input or recording of the operations from the external electronic device via a wireless communication circuit, and may be operated in a method similar to the above-described operation (corresponding method). For example, the electronic device may execute operations of collecting logs of the external electronic device, analyzing the collected logs of the external electronic device to detect the path rule, classifying the detected path rules for each domain, determining a priority of the path rules classified for each domain, selecting the path rule based on the priority for each domain, and converting the selected path rule into the natural language hint. In addition, the electronic device may transmit the hint converted into the natural language to the external electronic device via a wireless communication circuit.

Figure 12:
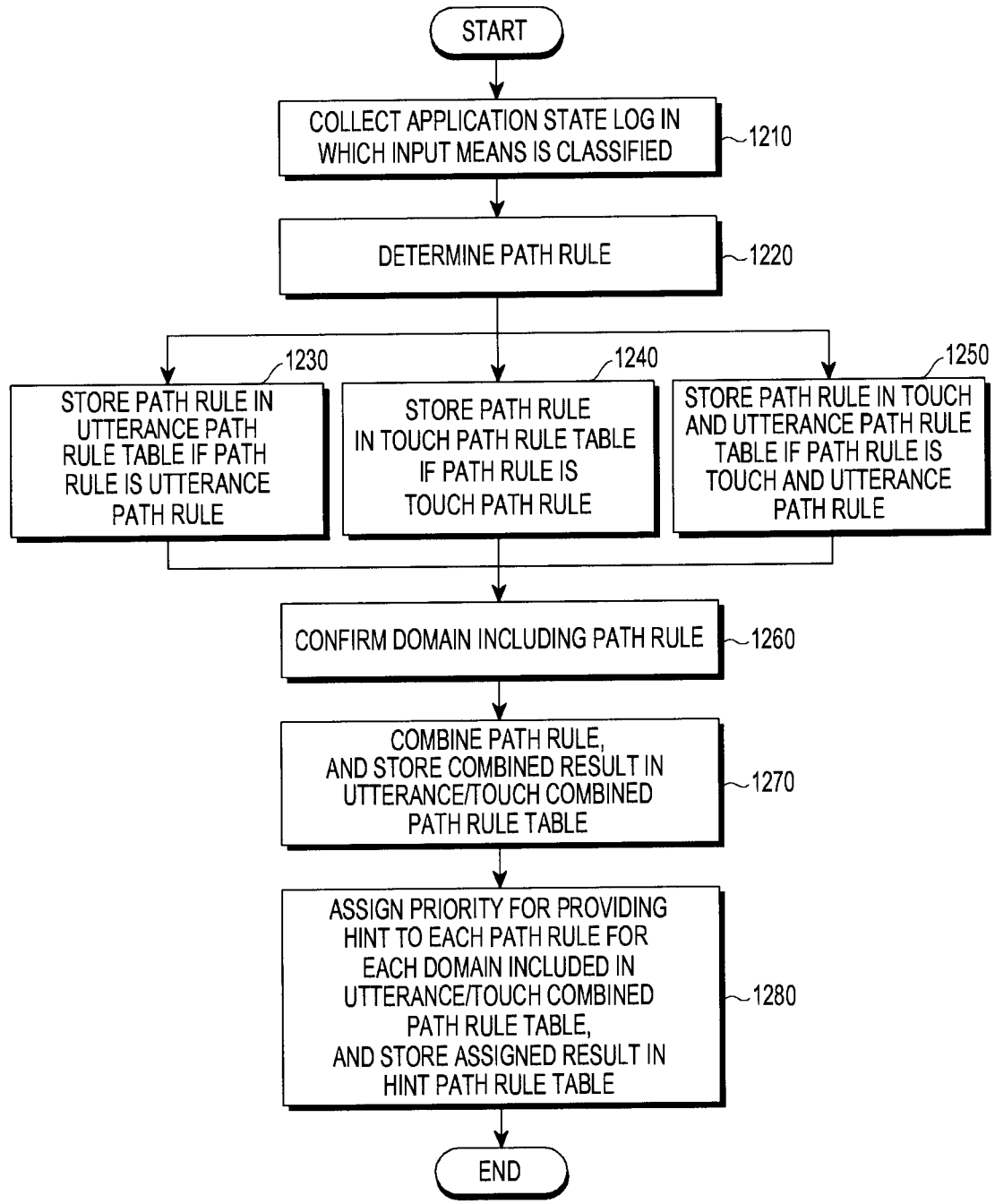
FIG. 12 is a flowchart illustrating the operation of an electronic device that generates a path rule through user log collection of the electronic device according to various embodiments.

FIG. 12 is a flowchart illustrating the operation of an electronic device (e.g., the electronic device 101) that generates a path rule through user log collection of the electronic device according to various embodiments.

In operation 1210, the electronic device (e.g., the processor 120) may collect application state logs in which an input means is classified.

According to an embodiment, when the electronic device executes at least one operation of an application via a user's voice input using a microphone, via a user's touch input using a touch screen, or via a mixed input of user's voice and touch, the electronic device may classify the corresponding input means.

According to an embodiment, a single screen displayed according to one operation executed by the electronic device or the execution of the one operation may be referred to as a state, and recording of operations executed by the electronic device or recording of screens displayed to correspond to the executed operations may be referred to as a state log.

In operation 1220, the electronic device (e.g., the processor 120) may determine a path rule according to the application state log through the rule mapper process.

According to an embodiment, the electronic device may confirm to which portion a portion where the application state log corresponds to the state sequence log corresponds, by comparing the application state log with a state sequence log stored in an existing rule database through the rule mapper process, and may determine the touch path rule corresponding to the application state log from the state sequence log.

According to an embodiment, the path rule may include information of the input means so that it can be known through which interface a user performs an input.

According to an embodiment, when the path rule is an utterance path rule, the electronic device (e.g., the processor 120) may store the path rule in an utterance path rule table in operation 1230. For example, when the information of the input means included in the path rule is a voice input using a microphone, the electronic device may determine that the path rule is the utterance path rule.

According to an embodiment, when the path rule is a touch path rule, the electronic device (e.g., the processor 120) may store the path rule in a touch path rule table in operation 1240. For example, when the information of the input means included in the path rule is a touch input using a touch screen, the electronic device may determine that the path rule is the touch path rule.

According to an embodiment, when the path rule is a touch and utterance path rule, the electronic device (e.g., the processor 120) may store the path rule in a touch and utterance path rule table in operation 1250. For example, when the information of the input means included in the path rule is the voice input using the microphone and the touch input using the touch screen, the electronic device may determine that the path rule is the touch and utterance path rule.

In operation 1260, the electronic device (e.g., the processor 120) may confirm a domain including the path rule.

According to an embodiment, the electronic device may classify to which domain the path rule belongs. For example, the domains may be classified into messenger domains, game domains, and Internet banking domains, and the like. For example, the messenger domain may include path rules performed in KakaoTalk, Line Messenger, Allo, Facebook Messenger, and the like.

According to another embodiment, the electronic device may classify the domains in application units. For example, the electronic device may determine whether the corresponding path rule belongs to KakaoTalk or Line.

In operation 1270, the electronic device (e.g., the processor 120) may combine the path rule of the utterance path rule table, the path rule of the touch path rule table, and the touch and utterance path rule of the touch and utterance path rule table, and may store the combined result in an utterance/touch combined path rule table. In addition, the electronic device may also store to which at least one domain the combined path rule belongs in the utterance/touch path rule table.

According to an embodiment, when a plurality of path rules is generated through the above-described operations or when a plurality of path rules is generated according to above-described operations 1210 to 1270 repeatedly performed, the electronic device (e.g., the processor 120) may assign a priority for providing a hint to each path rule for each domain which is included in the utterance/touch combined path rule table according to a designated condition, and may store the result in a hint path rule table in operation 1280. For example, the designated condition may be a frequency of use of each path rule for each domain.

According to an embodiment, it may be assumed that there are an application used by a user in the electronic device and a system that provides a function frequently used in the corresponding application as a hint. The electronic device may determine a domain of an application of a context in which a call is made, and may provide the determined domain as a hint corresponding to the path rule which is actually used most frequently by a user in the domain of the corresponding application included in the path rule table (e.g., the utterance/touch combined path rule table). For example, assuming that the path rule which is most frequently used by the user in a gallery application domain is "deletion of the most recent photo" or "album creation", when the electronic device executes a gallery application according to a user input and calls an artificial intelligent agent for allowing the electronic device to provide a hint, the electronic device may provide "Do you want to delete the most recent photo?" or "Do you want to create a recent album?" each corresponding to the path rule as the hint. By way of another example, the path rules which have been used most frequently in the corresponding domain may be provided to the user as hints in another domain.

Meanwhile, in the above-described embodiment of FIG. 12, it has been described that the electronic device generates the path rule through user log collection of the electronic device. However, according to another embodiment, the electronic device (e.g., the server 106) may receive operations executed by the external electronic device according to the user input or recording of the operations from the external electrode device via the wireless communication circuit, and may be operated in a method similar to the above-described operation (corresponding method). For example, the electronic device may execute operations of collecting the application state log in which input means of the external electronic device is classified, determining the path rule, storing the path rule in the utterance path rule table, the touch path rule table, and/or the touch and utterance path rule table, confirming the domain including the path rule, combining the path rules to store the combined result in the utterance/touch combined path rule table, and assigning the priority for providing the hint to each path rule for each domain included in the utterance/touch combined path rule table to store the result in the hint path rule table.

Figure 13:
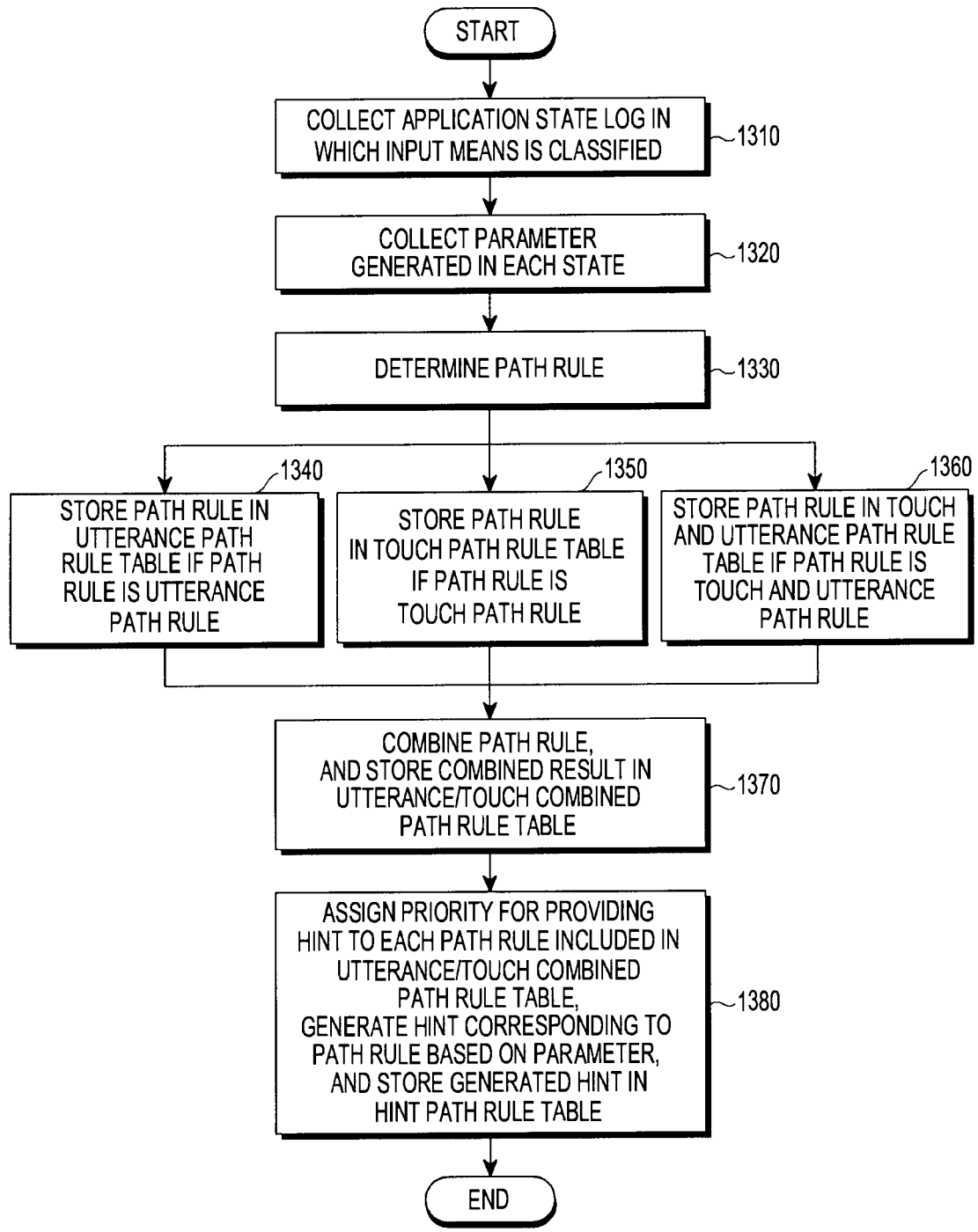
FIG. 13 is a flowchart illustrating the operation of an electronic device that generates a path rule through user log collection of the electronic device according to various embodiments.

FIG. 13 is a flowchart illustrating the operation of an electronic device (e.g., the electronic device 101) that generates a path rule through user log collection of the electronic device according to various embodiments. Referring to FIG. 13, the electronic device may store frequencies and types of parameters generated by at least one operation and may use the stored frequencies and types thereof in generating a hint corresponding to a path rule. For example, the parameters may be information on the operation of the electronic device and information for executing the operation, and may be an input value of a user reflecting the intention of the user. For example, the parameter in the message application may be a message content or a recipient. As another example, the parameter may be a search target in a specific application.

In operation 1310, the electronic device (e.g., the processor 120) may collect application state logs in which an input means is classified.

According to an embodiment, when the electronic device executes at least one operation of an application via a user's voice input using a microphone, via a user's touch input using a touch screen, or via a mixed input of user's voice and touch, the electronic device may classify the corresponding input means.

According to an embodiment, a single screen displayed according to one operation executed by the electronic device or the execution of the one operation may be referred to as a state, and recording of operations executed by the electronic device or recording of screens displayed to correspond to the executed operations may be referred to as a state log.

In operation 1320, the electronic device (e.g., the processor 120) may collect parameters generated in each state. For example, the electronic device may collect the parameters according to the user input which are generated according to a change in the states together with collection of the state log, and may store the collected parameters.

In operation 1330, the electronic device (e.g., the processor 120) may determine a path rule according to the application state log through a rule mapper process.

According to an embodiment, the electronic device may confirm to which portion a portion where the application state log corresponds to the state sequence log corresponds, by comparing the application state log with a state sequence log stored in an existing rule database through the rule mapper process, and may determine the path rule corresponding to the application state log from the state sequence log.

According to an embodiment, the path rule may include information of the input means so that it can be known through which interface a user performs an input.

According to an embodiment, the path rule of the electronic device may include the collected parameters.

According to an embodiment, when the path rule is an utterance path rule, the electronic device (e.g., the processor 120) may store the path rule in an utterance path rule table in operation 1340. In addition, when storing the path rule, the electronic device may also store the collected parameters. For example, when information of the input means included in the path rule is a voice input using a microphone, the electronic device may determine that the path rule is the utterance path rule.

According to an embodiment, when the path rule is a touch path rule, the electronic device (e.g., the processor 120) may store the path rule in a touch path rule table in operation 1350. In addition, when storing the path rule, the electronic device may also store the collected parameters. For example, when the information of the input means included in the path rule is a touch input using a touch screen, the electronic device may determine that the path rule is the touch path rule.

According to an embodiment, when the path rule is a touch and utterance path rule, the electronic device (e.g., the processor 120) may store the path rule in a touch and utterance path rule table in operation 1360. In addition, when storing the path rule, the electronic device may also store the collected parameters. For example, when the information of the input means included in the path rule is the voice input using the microphone and the touch input using the touch screen, the electronic device may determine that the path rule is the touch and utterance path rule.

In operation 1370, the electronic device (e.g., the processor 120) may combine the path rule of the utterance path rule table, the path rule of the touch path rule table, and the touch and utterance path rule of the touch and utterance path rule table, and may store the combined result in an utterance/touch combined path rule table. In addition, when storing the path rule, the electronic device may also store the collected parameters. According to an embodiment, when a plurality of path rules is generated through the above-described operations or when a plurality of path rules is generated according to above-described operations 1310 to 1370 repeatedly performed, the electronic device may assign a priority for providing a hint to each path rule which is included in the utterance/touch combined path rule table according to a designated condition, and may store the result in a hint path rule table in operation 1380.

For example, when a user speaks "Send message saying that I am late today to J" as a voice utterance, the electronic device may ask further questions in order to acquire a parameter from a user while performing a path rule for sending a message, or may receive an application that is a means for sending a message through an input field from a user. For example, when a user uses "Kakao Talk" as the means for sending a message and "Kakao Talk" is repeatedly used as the means for sending a message, the electronic device may allow the parameter to be included in the path rule, and may generate a hint such as "Would you like to send a message saying that I am late today to J using Kakao Talk?".

The following Table 1 is an example of the parameters that can be used representatively in applications according to various embodiments.

TABLE 1

| Applications | Parameter targets | Parameter names | Utilized hint examples |
| --- | --- | --- | --- |
| Galley application | search | gallery_search_keyword | Find travel photo |
| Message application | search | messages_search_keyword | Find character including coupon |
|  | Message transmission target | Messages_contack_name[name] | Send photo taken yesterday to |
|  |  | Messages_contact_id (messages_phone_number [phone number]) | Hong-gil-dong |
| Calendar application | Search | Calendar_search_keyword | Find meeting schedule |
| Time application | Timer time | Clock_timer | Start timer for two minutes |
| Camera application | Usage mode | Camera_change_mode | Take picture in food mode |
| E-mail application | Search | Email_search_username[Sender] | Show me message from A |

In the above-described embodiment of FIG. 13, in regard to the collection of the parameters, it has been described that the electronic device collects the parameters generated in each state in operation 1320. However, according to another embodiment, the electronic device may collect the parameters during the operation of the electronic device.

In the above-described embodiment of FIG. 13, it has been described that the electronic device generates the path rule through the collection of the user logs of the electronic device. However, according to another embodiment, the electronic device (e.g., the server 106) may receive, from an external electronic device via a wireless communication circuit, operations executed by the external electronic device according to the user input or recording of the operations and parameter information, and may be operated in a method similar to the above-described operation (corresponding method). For example, the electronic device may execute operations of collecting the state logs of the application in which an input means of the external electronic device is classified, collecting the parameters generated in each state, determining the path rule of the external electronic device, storing the path rules in the utterance path rule table, the touch path rule table, and/or the touch and utterance path rule table, combining the path rules to store the combined result in the utterance/touch combined path rule table, assigning the priority for providing the hint to each path rule included in the utterance/touch combined path rule table, and generating the hint corresponding to the path rule based on the parameter to store the generated hint in the hint path rule table. For example, the electronic device may generate the path rules through the collection of the state logs of the application for each of the plurality of external devices (users), thereby having the hint path rule table for each of the plurality of external devices (users).

Figure 14:
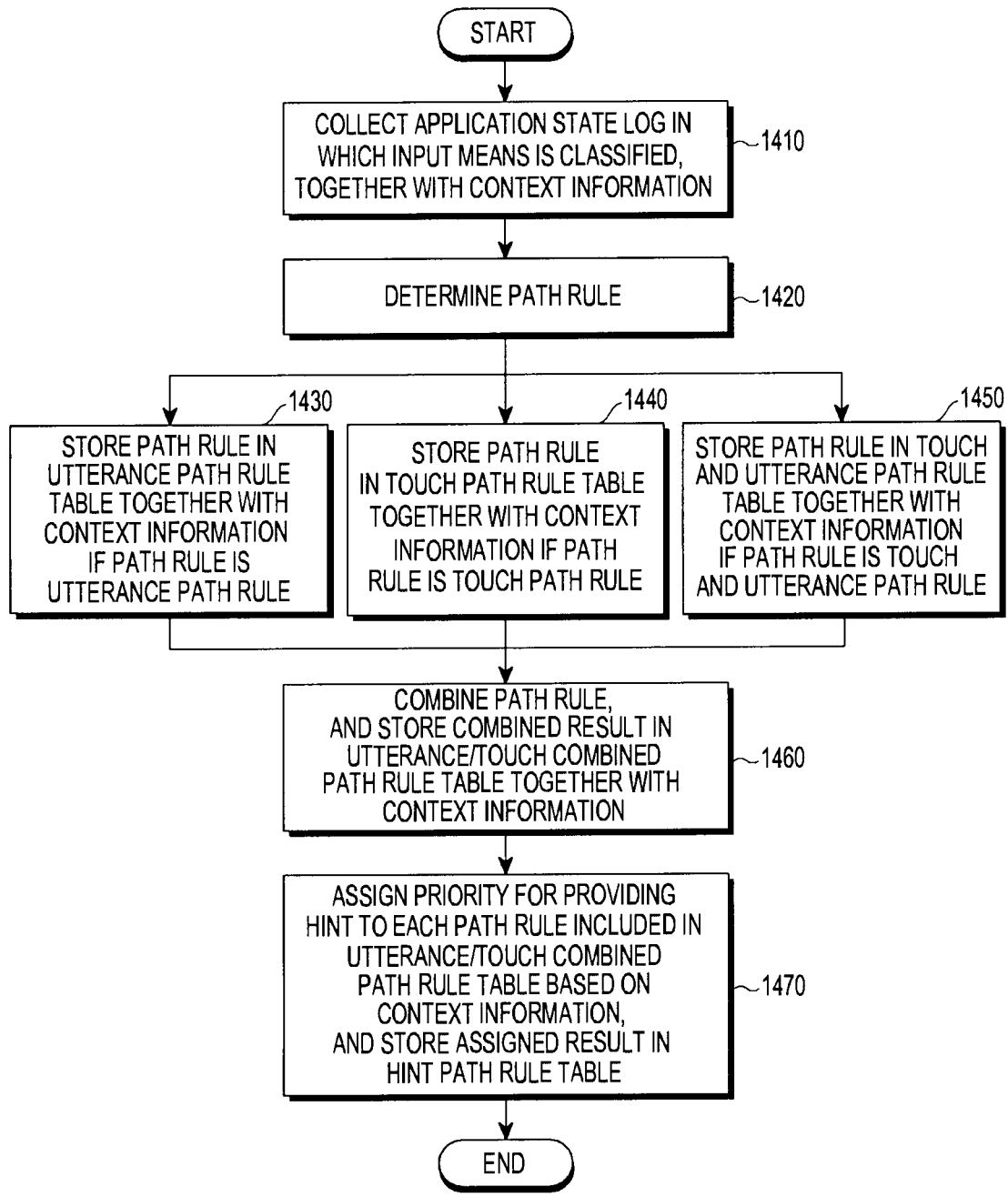
FIG. 14 is a flowchart illustrating the operation of an electronic device that generates a path rule through user log collection of the electronic device according to various embodiments.

FIG. 14 is a flowchart illustrating the operation of an electronic device (e.g., the electronic device 101) that generates a path rule through user log collection of the electronic device according to various embodiments. Referring to FIG. 14, the electronic device may generate and/or determine a path rule according to a user input, and may collect and store context information. The electronic device may assign a priority for providing a hint to each path rule based on the context information and may provide a hint suitable for a user occasion.

In operation 1410, the electronic device (e.g., the processor 120) may collect application state logs in which an input means is classified, together with the context information.

According to an embodiment, the context information may be various, such as a current date, a current time, a location where the electronic device is located, and/or schedule information stored in the electronic device.

According to an embodiment, when the electronic device executes at least one operation of an application via a user's voice input using a microphone, via a user's touch input using a touch screen, or via a mixed input of user's voice and touch, the electronic device may classify the corresponding input means.

According to an embodiment, a single screen displayed according to one operation executed by the electronic device or the execution of the one operation may be referred to as a state, and recording of operations executed by the electronic device or recording of screens displayed to correspond to the executed operations may be referred to as a state log.

In operation 1420, the electronic device (e.g., the processor 120) may determine a path rule according to the application state log through a rule mapper process. According to an embodiment, the electronic device may confirm to which portion a portion where the application state log corresponds to the state sequence log corresponds, by comparing the application state log with a state sequence log stored in an existing rule database through the rule mapper process, and may determine the path rule corresponding to the application state log from the state sequence log.

According to an embodiment, the path rule may include information of the input means so that it can be known through which interface a user performs an input.

According to an embodiment, when the path rule is an utterance path rule, the electronic device (e.g., the processor 120) may store the path rule in an utterance path rule table together with the context information in operation 1430. For example, when information of the input means included in the path rule is a voice input using a microphone, the electronic device may determine that the path rule is the utterance path rule.

According to an embodiment, when the path rule is a touch path rule, the electronic device (e.g., the processor 120) may store the path rule in a touch path rule table together with the context information in operation 1440. For example, when the information of the input means included in the path rule is a touch input using a touch screen, the electronic device may determine that the path rule is the touch path rule.

According to an embodiment, when the path rule is a touch and utterance path rule, the electronic device (e.g., the processor 120) may store the path rule in a touch and utterance path rule table together with the context information in operation 1450. For example, when the information of the input means included in the path rule is the voice input using the microphone and the touch input using the touch screen, the electronic device may determine that the path rule is the touch and utterance path rule.

According to an embodiment, assuming that a user inputs a new message to be transmitted to an acquaintance via SMS in the company, when the user first starts with voice utterance and composes the contents of the message through the touch input, the electronic device may collect state logs in a message application, may determine that a path rule of "transmission of new message via SMS" has been performed according to the above-described operations, and may store the determined path rule in the touch and utterance path rule table. In addition, the electronic device may also store context information of a place such as the company in the touch and utterance path rule table. In operation 1460, the electronic device (e.g., the processor 120) may combine the path rule of the utterance path rule table, the path rule of the touch path rule table, and the touch and utterance path rule of the touch and utterance path rule table, and may store the combined result in an utterance/touch combined path rule table together with the context information. For example, the electronic device may also make a database together with the number of times (frequency) the path rule is performed by a user, and may store the database. For example, the electronic device may also store information indicating whether the path rule has been performed through the touch input or the voice input, or whether the path rule have been performed through a combination of the two inputs. For example, the electronic device may also store information indicating which user input (referred to as input means or interface) has been applied in each state of the path rule so as to be distinguished.

According to an embodiment, when a plurality of path rules is generated through the above-described operations or when a plurality of path rules is generated according to above-described operations 1410 to 1460 repeatedly performed, the electronic device (e.g., the processor 120) may assign a priority for providing a hint to each path rule included in the utterance/touch combined path rule table based on the context information according to a designated condition, and may store the result in a hint path rule table in operation 1470.

Meanwhile, in the above-described embodiment of FIG. 14, it has been described that the electronic device generates the path rule through user log collection of the electronic device. However, according to another embodiment, the electronic device (e.g., the server 106) may receive, from the external electronic device via a wireless communication circuit, operations executed by an external electronic device or recording of the operations according to the user input and the context information, and may be operated in a method similar to the above-described operation (corresponding method). For example, the electronic device may execute operations of collecting the state logs of the application in which an input means of the external electronic device is classified, together with the context information of the external electronic device, determining the path rule of the external electronic device, storing the path rules in the utterance path rule table, the touch path rule table and/or the touch and utterance path rule table, combining the path rules to store the combined result in the utterance/touch combined path rule table, and assigning the priority for providing the hint to each path rule included in the utterance/touch combined path rule table based on the context information to store the result in the hint path rule table. For example, the electronic device may generate the path rules through the collection of the state logs of the application for each of the plurality of external devices (users), thereby having the hint path rule table for each of the plurality of external devices (users).

Figure 15:
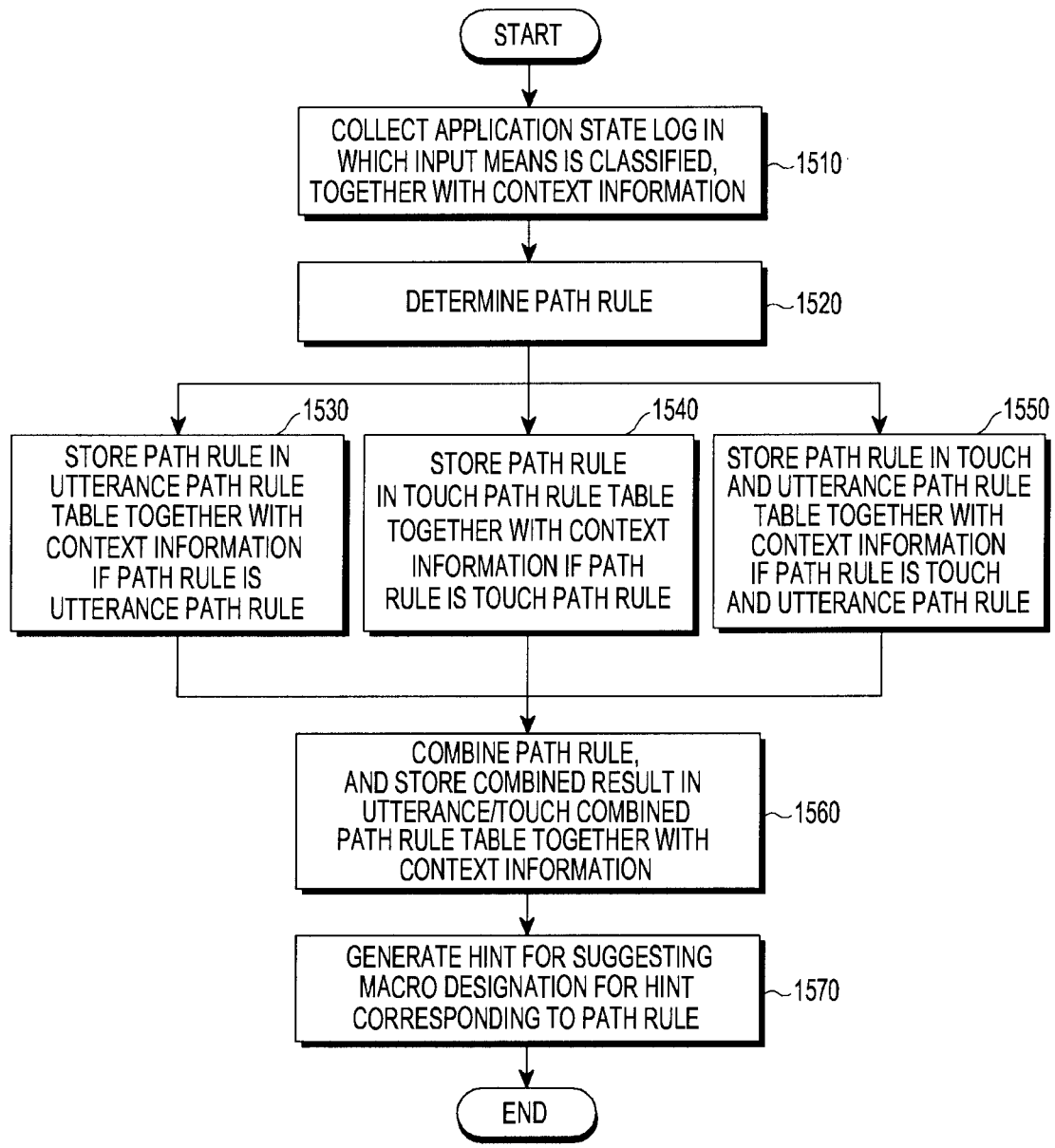
FIG. 15 is a flowchart illustrating the operation of an electronic device that generates a path rule through user log collection of the electronic device according to various embodiments.

FIG. 15 is a flowchart illustrating the operation of an electronic device (e.g., the electronic device 101) that generates a path rule through user log collection of the electronic device according to various embodiments. Referring to FIG. 15, the electronic device may generate and/or determine a path rule according to a user input, and may generate a macro designation suggestion hint for a hint corresponding to the path rule.

In operation 1510, the electronic device (e.g., the processor 120) may collect application state logs in which an input means is classified.

According to an embodiment, when the electronic device executes at least one operation of an application via a user's voice input using a microphone, via a user's touch input using a touch screen, or via a mixed input of user's voice and touch, the electronic device may classify the corresponding input means.

According to an embodiment, a single screen displayed according to one operation executed by the electronic device or the execution of the one operation may be referred to as a state, and recording of operations executed by the electronic device or recording of screens displayed to correspond to the executed operations may be referred to as a state log.

According to an embodiment, the electronic device may collect context information together with the state logs. For example, the context information may be various, such as a current date, a current time, a location where the electronic device is located, and/or schedule information stored in the electronic device.

In operation 1520, the electronic device (e.g., the processor 120) may determine a path rule according to the application state log through the rule mapper process.

According to an embodiment, the electronic device may confirm to which portion a portion where the application state log corresponds to the state sequence log corresponds, by comparing the application state log with a state sequence log stored in an existing rule database through the rule mapper process, and may determine the path rule corresponding to the application state log from the state sequence log.

According to an embodiment, the path rule may include information of the input means so that it can be known through which interface a user performs an input.

According to an embodiment, when the path rule is an utterance path rule, the electronic device (e.g., the processor 120) may store the path rule in an utterance path rule table in operation 1530. For example, when the information of the input means included in the path rule is a voice input using a microphone, the electronic device may determine that the path rule is the utterance path rule. For example, the electronic device may store the context information in the utterance path rule table together with the path rule.

According to an embodiment, when the path rule is a touch path rule, the electronic device (e.g., the processor 120) may store the path rule in a touch path rule table in operation 1540. For example, when the information of the input means included in the path rule is a touch input using a touch screen, the electronic device may determine that the path rule is the touch path rule. For example, the electronic device may store the context information in the touch path rule table together with the path rule. According to an embodiment, when the path rule is a touch and utterance path rule, the electronic device (e.g., the processor 120) may store the path rule in a touch and utterance path rule table in operation 1550. For example, when the information of the input means included in the path rule is the voice input using the microphone and the touch input using the touch screen, the electronic device may determine that the path rule is the touch and utterance path rule. For example, the electronic device may store the context information in the touch and utterance path rule table together with the path rule.

In operation 1560, the electronic device (e.g., the processor 120) may combine the path rule of the utterance path rule table, the path rule of the touch path rule table, and the touch and utterance path rule of the touch and utterance path rule table, and may store the combined result in an utterance/touch combined path rule table. For example, the electronic device may further store the context information together. For example, the electronic device may make a database together with the number of times (frequency) the path rule is performed by a user, and may store the database. For example, the electronic device may also store information indicating whether the path rule has been performed via the touch input or the voice input, or whether the path rule has been performed via a combination of the two inputs. For example, the electronic device may also store information indicating which the user input (referred to as input means or interface) has been applied in each state of the path rule so as to be distinguished.

In operation 1570, the electronic device (e.g., the processor 120) may generate a macro designation suggestion hint for a hint corresponding to the path rule.

According to an embodiment, the electronic device may provide a macro function that can replace the hint corresponding to the path rule with a personalized short sentence. For example, assuming that there is a hint capable of executing a path rule of "Make photos taken yesterday with J into an album and store the album in a cloud", when the hint is designated as a macro such as "J album" through setting and a user utters the macro, the electronic device may perform the corresponding function even if the user does not utter the hint corresponding to the entire path rule.

According to an embodiment, the electronic device or the processor (e.g., the processor 120) of the electronic device may include a macro suggestion hint generator (not shown). The macro suggestion hint generator may generate a hint that helps the user to easily set the macro corresponding to the hint of the path rule. For example, the macro suggestion hint generator may recommend, to the user, a path capable of designating a macro with a designated criterion. For example, the designated criterion may be various, such as the number of times the path rule is performed and/or complexity of the path rule.

For example, when the path rule indicating that a user makes the photos taken yesterday with J into an album and stores the album in a cloud is used a designated reference number of times or more, the electronic device may convert the corresponding path rule into a sentence form through a natural language generation technique or the like, and may provide the result as a hint. In addition, the electronic device may generate a macro designation suggestion hint such as "a function of making the photos taken yesterday with J into an album and storing the album in a cloud can be macro-stored and quickly performed" which suggests designating a macro for the hint, and may allow the user to easily designate the macro for the hint.

Meanwhile, in the above-described embodiment of FIG. 15, it has been described that the electronic device generates the path rule through user log collection of the electronic device. However, according to another embodiment, the electronic device (e.g., the server 106) may receive, from an external electronic device via a wireless communication circuit, operations executed by the external electronic device according to the user input or recording of the operations, and may be operated in a method similar to the above-described operation (corresponding method). For example, the electronic device may execute operations of collecting the state logs of the application in which an input means of the external electronic device is classified, determining the path rule of the external electronic device, storing the path rules in the utterance path rule table, the touch path rule table, and/or the touch and utterance path rule table, combining the path rules to store the combined result in the utterance/touch combined path rule table, and generating the hint for suggesting the macro designation for the hint corresponding to the path rule.

Figure 16:
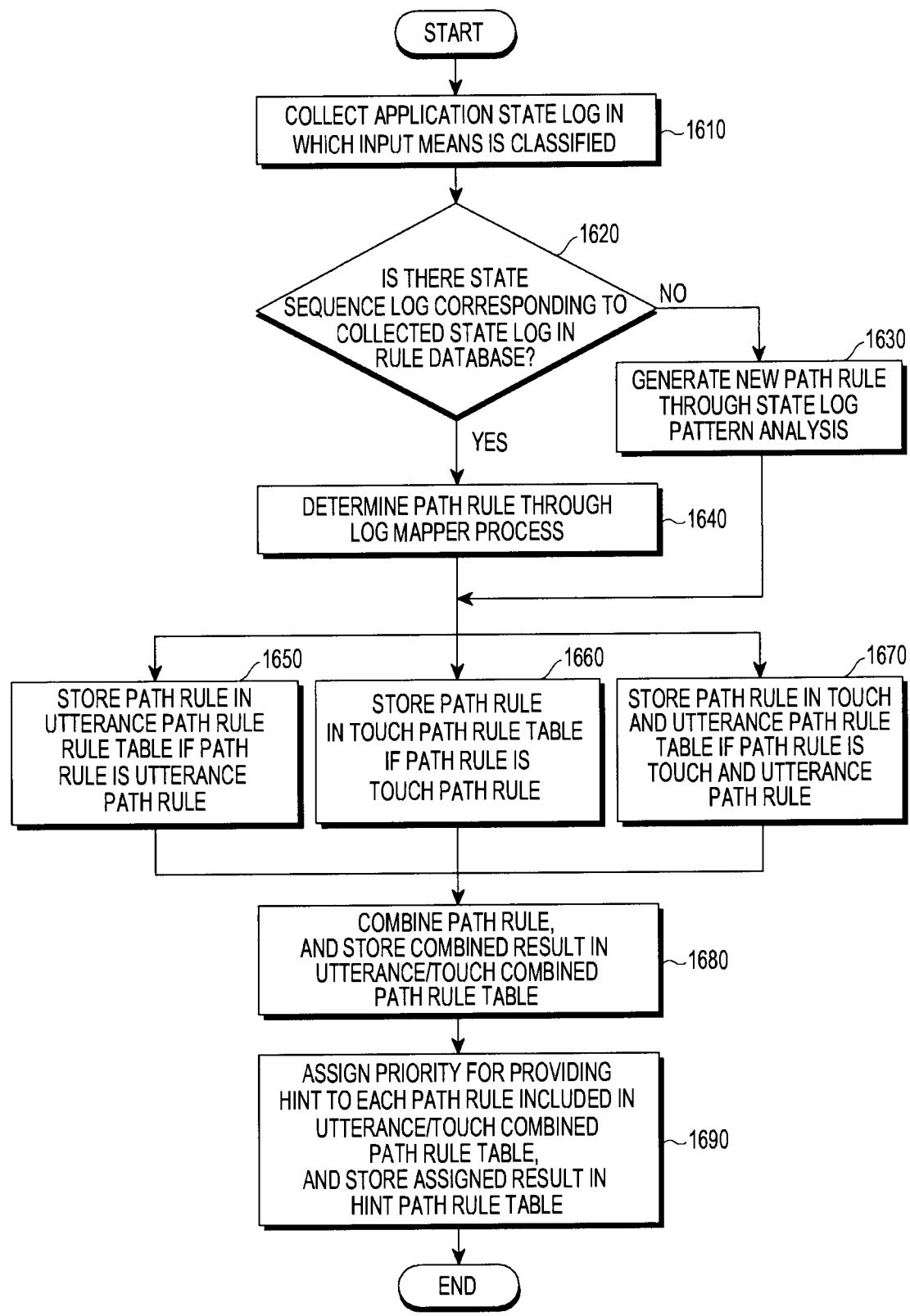
FIG. 16 is a flowchart illustrating the operation of an electronic device that generates a path rule through user log collection of the electronic device according to various embodiments.

FIG. 16 is a flowchart illustrating the operation of an electronic device (e.g., the electronic device 101) that generates a path rule through user log collection of the electronic device according to various embodiments. Referring to FIG. 16, the electronic device may generate a path rule that does not exist in an existing rule database by pattern analysis.

In operation 1610, the electronic device (e.g., the processor 120) may collect application state logs in which an input means is classified.

According to an embodiment, when the electronic device executes at least one operation of an application via a user's voice input using a microphone, via a user's touch input using a touch screen, or via a mixed input of user's voice and touch, the electronic device may classify the corresponding input means.

According to an embodiment, a single screen displayed according to one operation executed by the electronic device or the execution of the one operation may be referred to as a state, and recording of operations executed by the electronic device or recording of screens displayed to correspond to the executed operations may be referred to as a state log.

According to an embodiment, the electronic device may collect context information together with the state logs. For example, the context information may be various, such as a current date, a current time, a location where the electronic device is located, and/or schedule information stored in the electronic device.

In operation 1620, the electronic device (e.g., the processor 120) may determine whether there is a state sequence log corresponding to the collected state logs in a rule database. In operation 1620, when it is determined that there is the state sequence log corresponding to the collected state logs in the rule database, the electronic device may perform operation 1640, and otherwise, may perform operation 1630.

According to an embodiment, the electronic device may determine whether there is a portion where the application state log corresponds to the state sequence log, by comparing the application state log with the state sequence log stored in the existing rule database through the rule mapper process. For example, when there is the portion where the application state log corresponds to the state sequence log, the electronic device may perform operation 1640, and otherwise, may perform operation 1630.

In operation 1630, the electronic device (e.g., processor 120) may generate a new path rule through pattern analysis of the collected state logs.

According to an embodiment, the electronic device or the processor (e.g., the processor 120) of the electronic device may include a rule pattern finder (not shown), and the rule pattern finder may analyze the repeatedly used state log through pattern analysis of the collected state logs to extract a new path rule.

For example, when the electronic device executes a gallery application according to a user's touch input or the like and a state sequence log of attaching photos to a note application does not exist in the existing path rule database, or when the rule pattern finder analyzes the state logs collected according to the operation of the electronic device and the state log is performed a designated reference number of times or more, it may be confirmed that a user has performed the above-described function repeatedly, and the path rule including the state sequence may be newly acquired. For example, the electronic device may store the newly acquired path rule in the rule database and may update the rule database. For example, the electronic device may execute a confirmation process for the newly acquired path rule, and then may store the result in the rule database.

In operation 1640, the electronic device (e.g., the processor 120) may determine the path rule according to the application state log through the rule mapper processor. According to an embodiment, the electronic device may confirm to which portion the portion where the application state log corresponds to the state sequence log corresponds, by comparing the application state log with the state sequence log stored in the existing rule database through the rule mapper process, and may determine the path rule corresponding to the application state log from the state sequence log.

According to an embodiment, the path rule may include information of the input means so that it can be known through which interface a user performs an input.

According to an embodiment, when the path rule is an utterance path rule, the electronic device (e.g., the processor 120) may store the path rule in an utterance path rule table in operation 1650. For example, when the information of the input means included in the path rule is a voice input using a microphone, the electronic device may determine that the path rule is the utterance path rule. For example, the electronic device may store the context information in the utterance path rule table together with the path rule.

According to an embodiment, when the path rule is a touch path rule, the electronic device (e.g., the processor 120) may store the path rule in a touch path rule table in operation 1660. For example, when the information of the input means included in the path rule is a touch input using a touch screen, the electronic device may determine that the path rule is the touch path rule. For example, the electronic device may store the context information in the touch path rule table together with the path rule.

According to an embodiment, when the path rule is a touch and utterance path rule, the electronic device (e.g., the processor 120) may store the path rule in a touch and utterance path rule table in operation 1670. For example, when the information of the input means included in the path rule is the voice input using the microphone and the touch input using the touch screen, the electronic device may determine that the path rule is the touch and utterance path rule. For example, the electronic device may store the context information in the touch path rule table together with the path rule. In operation 1680, the electronic device (e.g., the processor 120) may combine the path rule of the utterance path rule table, the path rule of the touch path rule table, and the touch and utterance path rule of the touch and utterance path rule table, and may store the combined result in an utterance/touch combined path rule table. For example, the electronic device may further store the context information together. For example, the electronic device may make a database together with the number of times (frequency) the path rule is performed by a user, and may store the database. For example, the electronic device may also store information indicating whether the path rule has been performed via the touch input or the voice input, or whether the path rule has been performed via a combination of the two inputs. For example, the electronic device may also store information indicating which the user input (referred to as input means or interface) has been applied in each state of the path rule so as to be distinguished.

In operation 1690, the electronic device (e.g., the processor 120) may assign a priority for providing a hint to each path rule included in the utterance/touch combined path rule table according to a designated condition, and may store the result in a hint path rule table in operation 1690. For example, the designated condition may be a frequency of use of each path rule.

Meanwhile, in the above-described embodiment of FIG. 16, it has been described that the electronic device generates the path rule through user log collection of the electronic device. However, according to another embodiment, the electronic device (e.g., the server 106) may receive operations executed by an external electronic device according to the user input or recording of the operations from the external electronic device via a wireless communication circuit, and may be operated in a method similar to the above-described operation (corresponding method). For example, the electronic device may execute operations of collecting the state logs of the application in which an input means of the external electronic device is classified, determining whether there is the state sequence log corresponding to the collected state logs in the rule database, generating a new path through state log pattern analysis, determining the path rule through the log mapper processor, storing the path rules in the utterance path rule table, the touch path rule table, and/or the touch and utterance path rule table, combining the path rules to store the combined result in the utterance/touch combined path rule table, and assigning the priority for providing the hint to each path rule included in the utterance/touch combined path rule table to store the result in the hint path rule table. For example, the electronic device may generate the path rule through state log collection of the application for each of a plurality of external devices (users), thereby having the hint path rule table for each of the plurality of external devices (users).

According to still another embodiment, when the electronic device (e.g., the server 106) receives operations executed by the external electronic device according to the user input or recording of the operations from the external electronic device via the wireless communication circuit and is operated in a method similar to the above-described operation (corresponding method), an operation of detecting a new path rule through the above-described state log pattern analysis of the external electronic device may not be limited to the corresponding single external electronic device of the received operation or operations. For example, through the state log pattern analysis, the new path rule may be generated through the state log patterns of all external electronic devices associated with the electronic device. For example, the electronic device may anonymize and store the application state logs of the external electronic devices, and may acquire the new path rule that is not included in the existing state sequence log in the anonymized state logs through pattern analysis. The new path rule thus acquired in this manner may be newly added to the rule database of the electronic device or the external electronic device and may managed.

Figure 17:
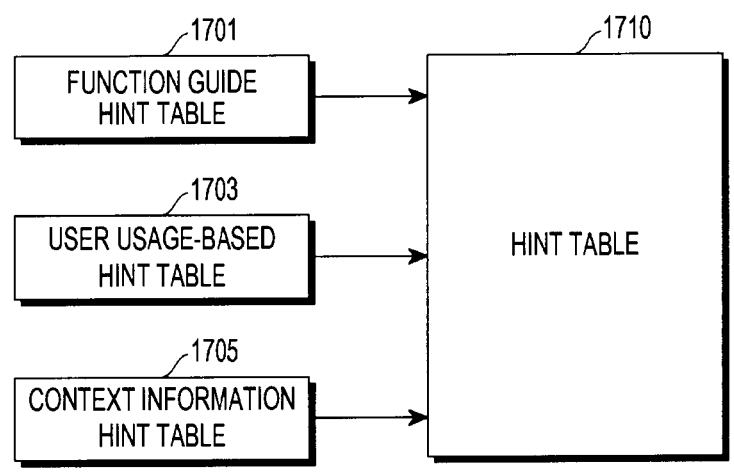
FIG. 17 is a diagram illustrating a hint table corresponding to a path rule of an electronic device according to various embodiments.
Figure 18:
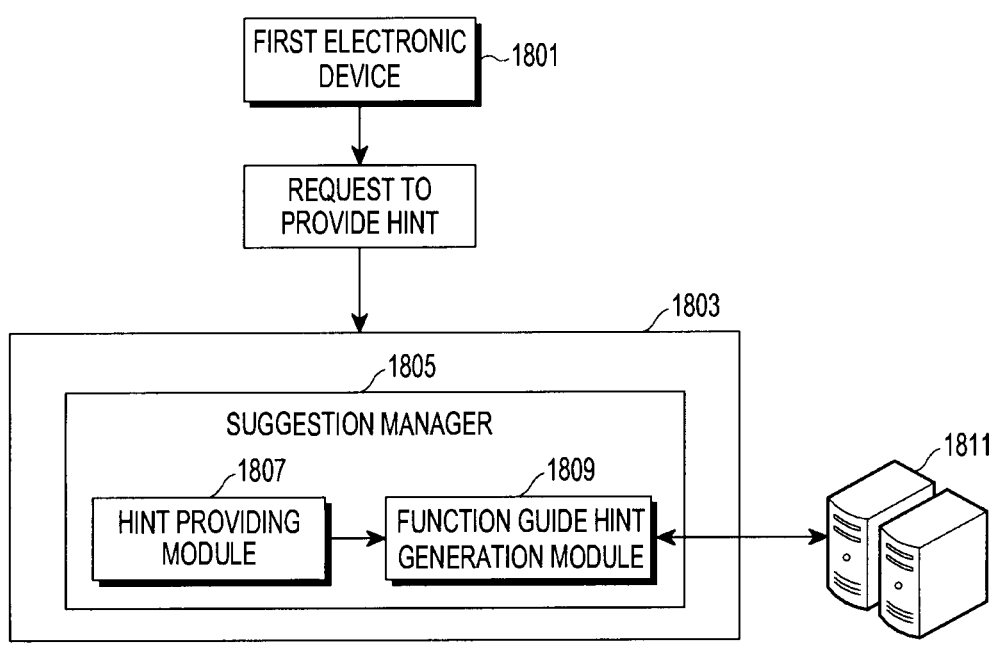
FIG. 18, FIG. 19 and FIG. 20 are block diagrams illustrating a system for providing a hint.
Figure 19:
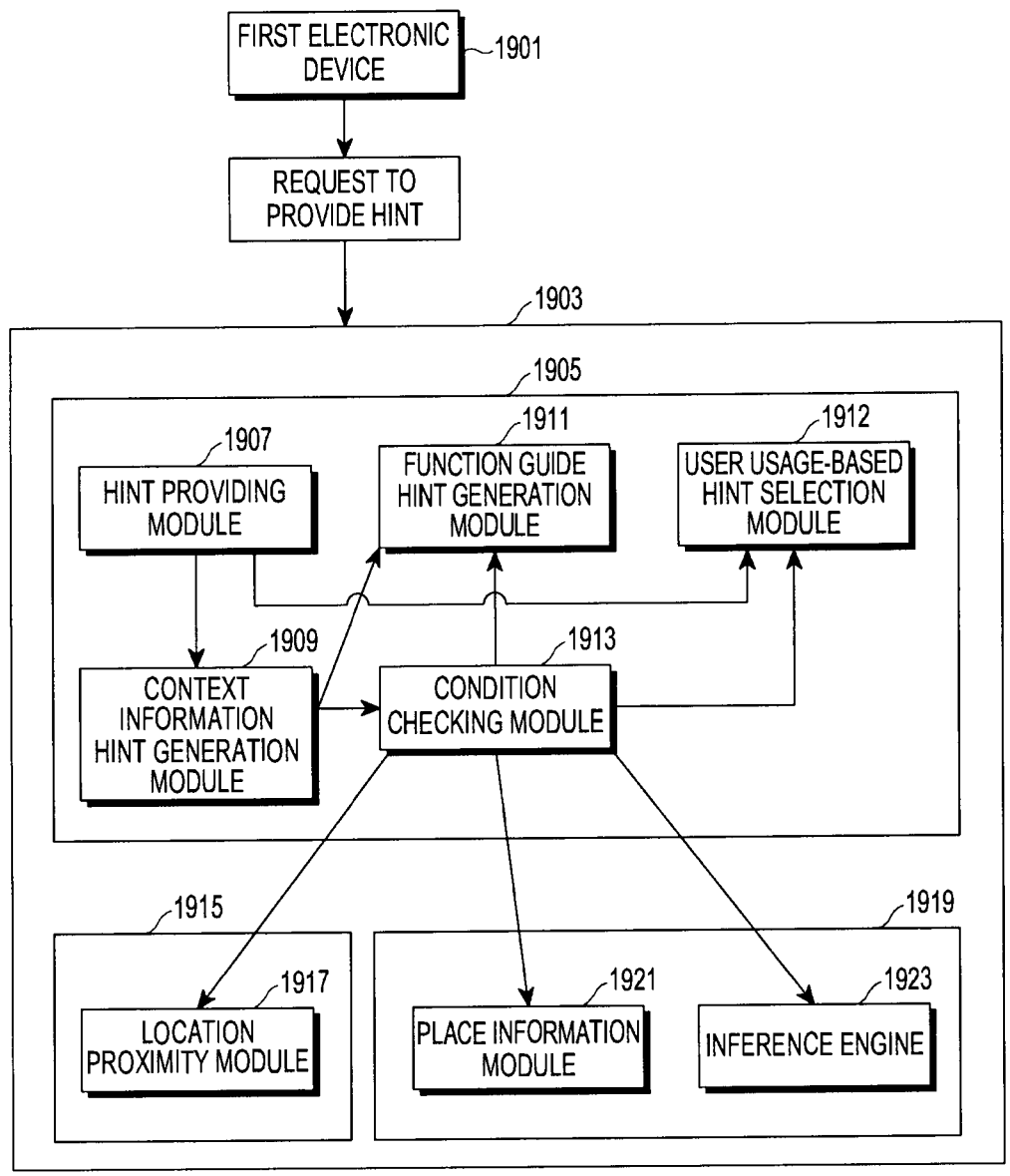
Figure 20:
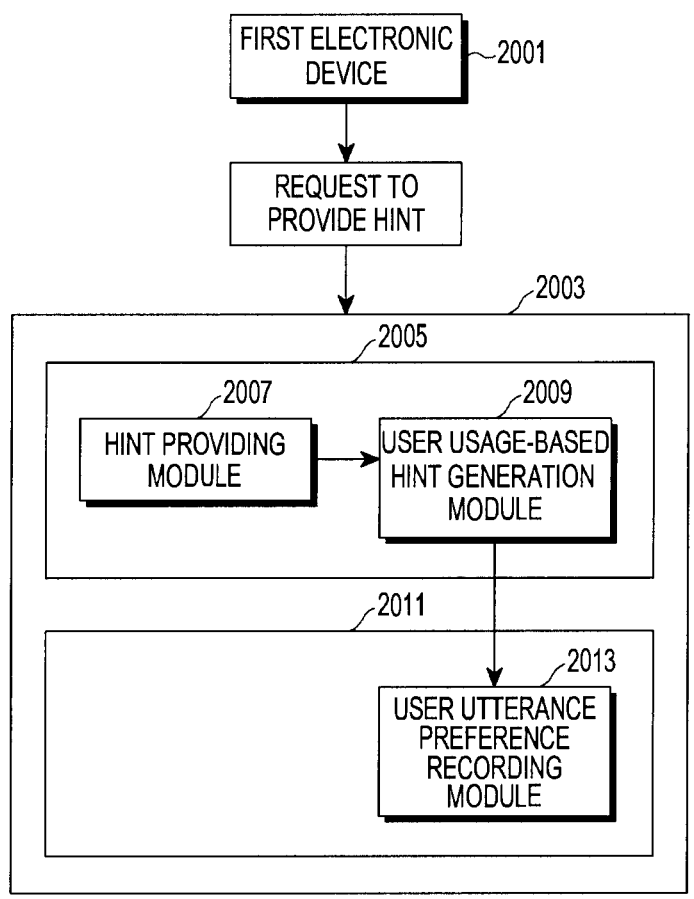

FIG. 17 is a diagram illustrating a hint table corresponding to a path rule of an electronic device (e.g., the electronic device 101) according to various embodiments. FIGS. 18 to 20 are block diagrams illustrating a system for providing a hint.

According to an embodiment, the electronic device may classify at least one hint corresponding to path rules generated according to any one embodiment of the above-described embodiments into a function guide hint table 1701, a user usage-based hint table 1703, or a context information hint table 1705 to store the result, and may allow hints included in the function guide hint table 1701, the user usage-based hint table 1703, and the context information hint table 1705 to be included in a hint table 1710.

According to an embodiment, when the generated path rule is a path rule of a new function of the electronic device and/or a function that is frequently used in the electronic device by other people, the electronic device may store the hint corresponding to the generated path rule in the function guide hint table 1701. Thus, the hints included in the function guide hint table 1701 may serve to introduce the new function of the electronic device to the user or to introduce the function which is frequently used in the electronic device by other people, and the user may provide a function that is expected to be used among not used functions in the functions of the electronic device, as a hint or a hint list. For example, the electronic device may prevent a hint that has been used by a user even once or a hint corresponding to the function in use among the hints stored in the function guide hint table 1701 from being provided.

For example, the hints (referred to as function guide hints) stored in the function guide hint table 1701 may be as shown in Table 2 below.

TABLE 2

| Applications | Hint examples |
| --- | --- |
| Gallery application | Make a collage |
| Secure folder application | Keep important data in a secure folder |
| Theme application | Would you like to switch it to a new theme? |
| Telephone application | You can record calls automatically |
| Message application | Would you like to set message background screen? |
| Internet application | You can change basic search engine |
| S note application | Take notes easily with S note |
| Camera application | You can store location information together in photos/videos |
| S health application | Measure your heart rate with S Health |

For example, the function guide hint is intended to encourage a user to use the function, so it may be effective to initially expose short and simple hints.

According to the above-described embodiment, although it has been described that the hints of Table 2 are the function guide hints stored in the function guide hint table 1701, according to another embodiment, at least some of the function guide hints of Table 2 may be hints included in the user usage-based hint table 1703 and/or the context information hint table 1705. For example, the hints such as "Make a collage", "Keep important data in a secure folder", and/or "Would you like to switch it to a new theme?" may be hints included in the function guide hint table 1701, the user usage-based hint table 1703, and/or the context information hint table 1705.

Referring to FIG. 18, when a first electronic device 1801 (e.g., the electronic device 101 makes a request to provide a hint, a hint providing module 1807 in a suggestion manager 1805 of a second electronic device (e.g., a server) 1803 may receive the corresponding request, and may make a request to generate and/or provide a hint from a function guide hint generation module 1809. The function guide hint generation module 1809 may be synchronized with a third electronic device (e.g., an external hint suggestion server) 1811 every predetermined period to update the hint list. For example, the function guide hint generation module 1809 may generate the hint list in the form of the function guide hint table 1701. When the function guide hint generation module 1809 returns the generated hint to the hint providing module 1807, the hint providing module 1807 may array the hints to be displayed to the user according to a designated condition and may provide the arrayed hints to the first electronic device 1801. The designated condition may be a priority determined based on the context information of the electronic device and/or a frequency of use of the hint.

In FIG. 18 described above, it has been described that the hint list is generated in the form of the function guide hint table according to the mutual operation of the first electronic device 1801, the second electronic device 1803, and the third electronic device 1811 and the hints to be displayed to the user are arrayed and provided. However, according to another embodiment, the first electronic device 1801 may generate the hint list in the form of the function guide hint table, and may arrayed and provide hints to be displayed to the user.

According to an embodiment, when the generated path rule is a path rule corresponding to a hint exposed in a user's specific context, the electronic device may store the hint corresponding to the generated path rule in the context information hint table 1705. For example, the context information hint table 1705 may include the hints corresponding to the path rules generated in consideration of time, place, and/or context information. For example, when a predefined condition is satisfied based on time, place, occasion (TPO) information, the electronic device may provide a recommended hint or hint list in consideration of the TOP information, that is, a time during which the electronic device is used, a place where the electronic device is use, and/or context information when the electronic device is used. For example, the electronic device may select at least one hint suitable for the predefined condition based on TPOA information in a preset hint pool, and may provide the selected hint to the user.

For example, the hints (referred to as context information hints) stored in the context information hint table 1705 may be as shown in Table 3 below.

Table 3

| Conditions | Context information hint examples |
|---|---|
| Next event within 2 hours | Let me know the next schedule |
| Next event location and (1 hour before or on board) | Give me directions to the next appointment place |
| Next event location and (if not 1 hour before or during boarding) | Call taxi to the next appointment place |
| Next event location and (event schedule is before quitting time, that is, not during daily work) | Search near the next appointment place |
| Quitting time and on board | Give me directions to home |
| Not quitting time and on board | Call taxi to home |
| Attendance time and on board | Give me directions to company |
| Not attendance time and on board | Call taxi to company |
| After wake-up | What about the weather today? |
| After wake-up | Show me today's schedule |
| alarm after wake-up, during the morning (to 12 o'clock), and within one hour | Turn off all alarms |
| Before bedtime | Set obstruction prohibition |
| Before bedtime | What about the weather tomorrow? |
| Before bedtime | Show me tomorrow's schedule |
| No alarm before bedtime and during the morning (to 12 o'clock) | Set alarm |
| Before bedtime and Sunday | What about the weather next week? |
| unread e-mail from VIP | Show me mail from VIP |
| New e-mail | Show me new mail |
| multiple missed calls | Show me missed call |
| missed calls | Call {missed phone number} |
| New message | Show me new message |
| Voice mail | Show me voice mail |

For example, house recognition, company recognition, whether to board a vehicle, wake-up time, bedtime, attendance time, and quitting time of Table 3 may use values obtained through a personal manager 1919 of FIG. 19 to be described later, and initial values shown in Table 4 may be used for the time.

TABLE 4

| Wake-up time | Bedtime | Attendance time | Quitting time |
|---|---|---|---|
| 7:00 | 22:00 | 08:00~09:00 | 18:00~19:00 |

For example, when providing the context information hint, the electronic device may designate a priority of the context information of the user while providing an appropriate command hint according to current context information, and may provide preferentially provide the hints having a higher priority. For example, the electronic device may assign a priority to each context information as shown in Table 5 below.

TABLE 5

| Context information types | Examples | Priorities |
|---|---|---|
| User occasion | Event or the like predicted by user's schedule and user's behavior | 1 |
| Occasion | Wake-up, before bed, attendance time, end time, travel, overseas etc. | 2 |
| Place | In house, outside house, inside company, outside company, inside car, outside car, overseas | 3 |
| Time | Morning (6 to 11), lunch (11 to 13), afternoon (13 to 18), evening (18 to 23), night (23 to 6) etc. | 4 |
| In application | View contents, selected plurality of items | 5 |

Referring to FIG. 19, when a first electronic device 1901 (e.g., the electronic device 101) makes a request to provide a hint, a hint providing module 1907 in a suggestion manager 1905 of a second electronic device 1903 may receive the request, and may make a request to generate and/or provide a hint from a context information hint generation module 1909. The context information hint generation module 1909 may receive TPO information using a module in a context information manager 1915 or a personal manager 1919 using a condition checking module 1913. For example, the context information manager 1915 may include a location proximity module 1917 that determines the proximity of a place, and the personal manager 1919 may include a place information module 1921 that stores location information of the place and an inference engine 1923 that infers the location information and context information related to the place. For example, the place information module 1921 may store an address of a house and/or a company input by the user. For example, the inference engine 1923 may infer a location of a user's home and/or company or location-related context information (e.g., during commuting, traveling, driving, etc.) from the information input by the user and/or the information collected using one or more sensors of the electronic device.

According to an embodiment, the context information hint generation module 1909 may set a function guide hint generation module 1911 in the suggestion manager 1905 using the received TPO information and the condition checking module 1913 may check the function guide hint generation module 1911, so that the context information hint generation module 1909 may generate the hint suitable for the occasion.

According to another embodiment, the context information hint generation module 1909 may set a user usage-based hint selection module 1912 in the suggestion manager 1905 using the received TPO information and the condition checking module 1913 may check the user use-base hint selection module 1912, so that the user usage-base hint selection module 1912 may select the usage-based hint of the user. For example, assuming that a user of the first electronic device 1901 frequently uses a voice command of "Play music" at home, when it is determined that the location of the electronic device is home, the user usage-based hint selection module 1912 may select "Play music" in which the reuse frequency is considered, as the usage-based hint of the user.

When the hints generated according to the above-described embodiments are returned to the hint providing module 1907, the hint providing module 1907 may array and/or select the hint to be provided according to internal rules, and may transmit the selected hint to the first electronic device 1901.

In FIG. 19 described above, it has been described that the context information hint is generated according to the mutual operation of the first electronic device 1901 and the second electronic device 1903 and may array and provide the hints to be displayed to the user. However, according to another embodiment, the first electronic device 1901 may generate the context information hint and may array and provide the hints to be displayed to the user.

According to an embodiment, when the generated path rule is a path rule corresponding to the hint considering a use frequency (or a frequency), the electronic device may store the generated path rule in the user usage-based hint table 1703. For example, the user usage-based hint table 1703 may include a hint corresponding to a path rule considering a reuse frequency of the hint.

According to an embodiment, although not shown, the hint or hint list to be provided to the user may be managed by a method in which an operator arbitrarily inputs a manual to an external hint suggestion server (e.g., the third electronic device 1811) for management, or a method in which the external hint suggestion server extracts a popular utterance list and/or hint list which is frequently used in the electronic device (e.g., the first electronic device 1801) to update the external hint suggestion server.

Referring to FIG. 20, when the generated path rule is a path rule corresponding to the hint considering a use frequency (or a frequency), the electronic device (e.g., the electronic device 101) may store the hint corresponding to the generated path rule as the user usage-based hint. For example, the electronic device may provide a hint for recommending a function, which is frequently used through a user utterance or a text input, according to the use frequency based on user personal TPO information. For example, the electronic device may recommend the function frequently used by the user so that, in a case in which the user is currently unable to speak or in a long sentence, a desired function may be performed by performing a single touch input rather than uttering the long sentence.

Referring to FIG. 20, when a first electronic device 2001 (e.g., the electronic device 101) makes a request to provide a hint, a hint providing module 2007 in a suggestion manager 2005 of a second electronic device 2003 may receive the request, and may make a request to generate and/or provide a hint from the user usage-based hint generation module 2009. The user usage-based hint generation module 2009 may generate a user usage-based hint using a user's dialog logged in a user utterance preference recording module 2013 in a personal manager 2011, a path rule ID, a parameter, a use frequency, used time and place information, and the like. When the generated user usage-based hint is transmitted to the hint providing module 2007, the hint providing module 2007 may array the hints to be displayed to the user according to the internal rules, and may provide the selected user usage-based hint to the first electronic device 2001.

According to an embodiment, the second electronic device 2003 may recommend the hint according to a user's usage pattern of the first electronic device 2001. For example, when the second electronic device 2003 periodically receives a request to inform the weather from the first electronic device 2001, context information in which the request is made and a user input (a user command) of the first electronic device 2001 may be simultaneously managed, so that, when the same context information is obtained, a function to be executed by the user may be predicted to provide a hint. For example, in a case in which the executed function is meaningless because it is one-time function or the executed function overlap with other automation functions, the function may not be stored as a hint.

According to an embodiment, although not shown, the hint or hint list to be provided to the user may be managed by a method in which an operator arbitrarily inputs a manual to an external hint suggestion server (e.g., the third electronic device 1811) for management, or a method in which the external hint suggestion server extracts a popular utterance list and/or hint list which is frequently used in the electronic device (e.g., the first electronic device 1801) to update the external hint suggestion server.

Figure 21:
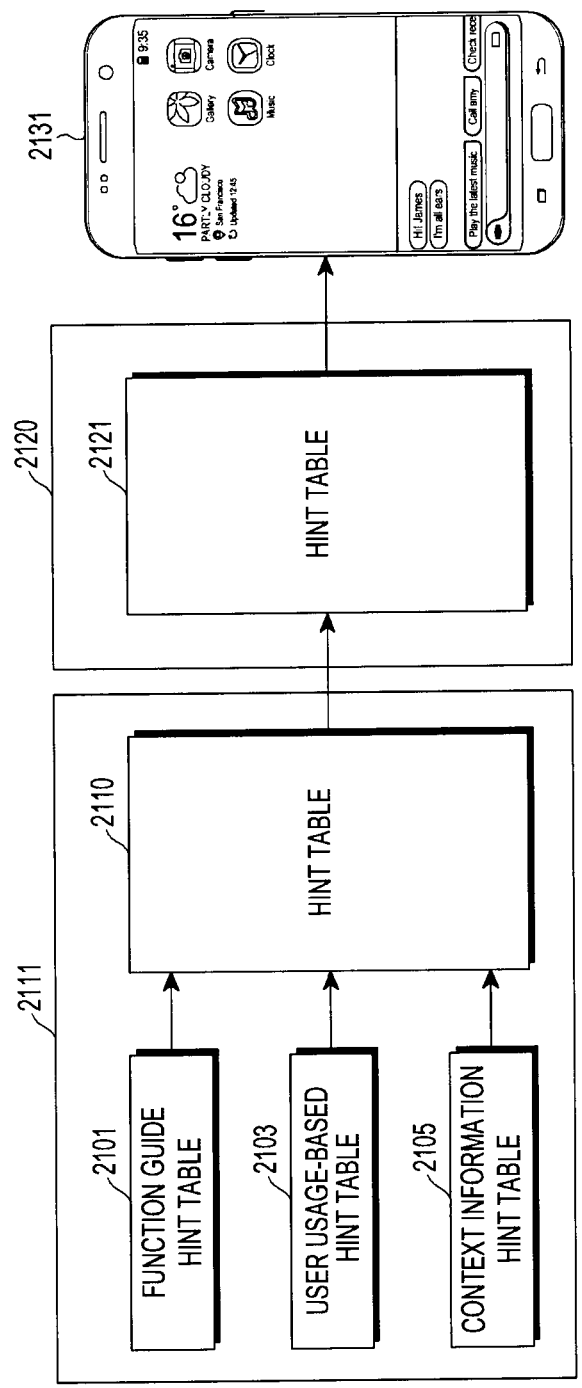
FIG. 21 is a diagram illustrating a system that utilizes a private cloud to provide a personalized hint according to various embodiments.

FIG. 21 is a diagram illustrating a system that utilizes a private cloud to provide a personalized hint according to various embodiments.

Referring to FIG. 21, a hint table 2110 (e.g., the hint table 1710) stored in a server 2111 may be stored in a private cloud 2121 before being provided to an electronic device 2131 and may be synchronized with the electronic device 2131. For example, the server 2111 may generate and/or update the hint table 2110 by executing the hint generation operation described above and may generate and/or update the hint table 2120 corresponding to the hint table 2110, so that the hint table 2120 may be stored in the corresponding private cloud 2121 of the electronic device 2131, which is a storage space of a personalized hint. For example, the hint table 2110 may include all of hints included in a function guide hint table 2101 (e.g., the function guide hint table 1701), a user usage-based hint table 2103 (e.g., the user usage-based hint table 1703), and a context information hint table 2105 (the related hint table 1705). The electronic device 2131 may be provided with a hint or a hint list in conjunction with the context information, personal profile information, and the hint table 2120 of the private cloud 2121.

Figure 22:
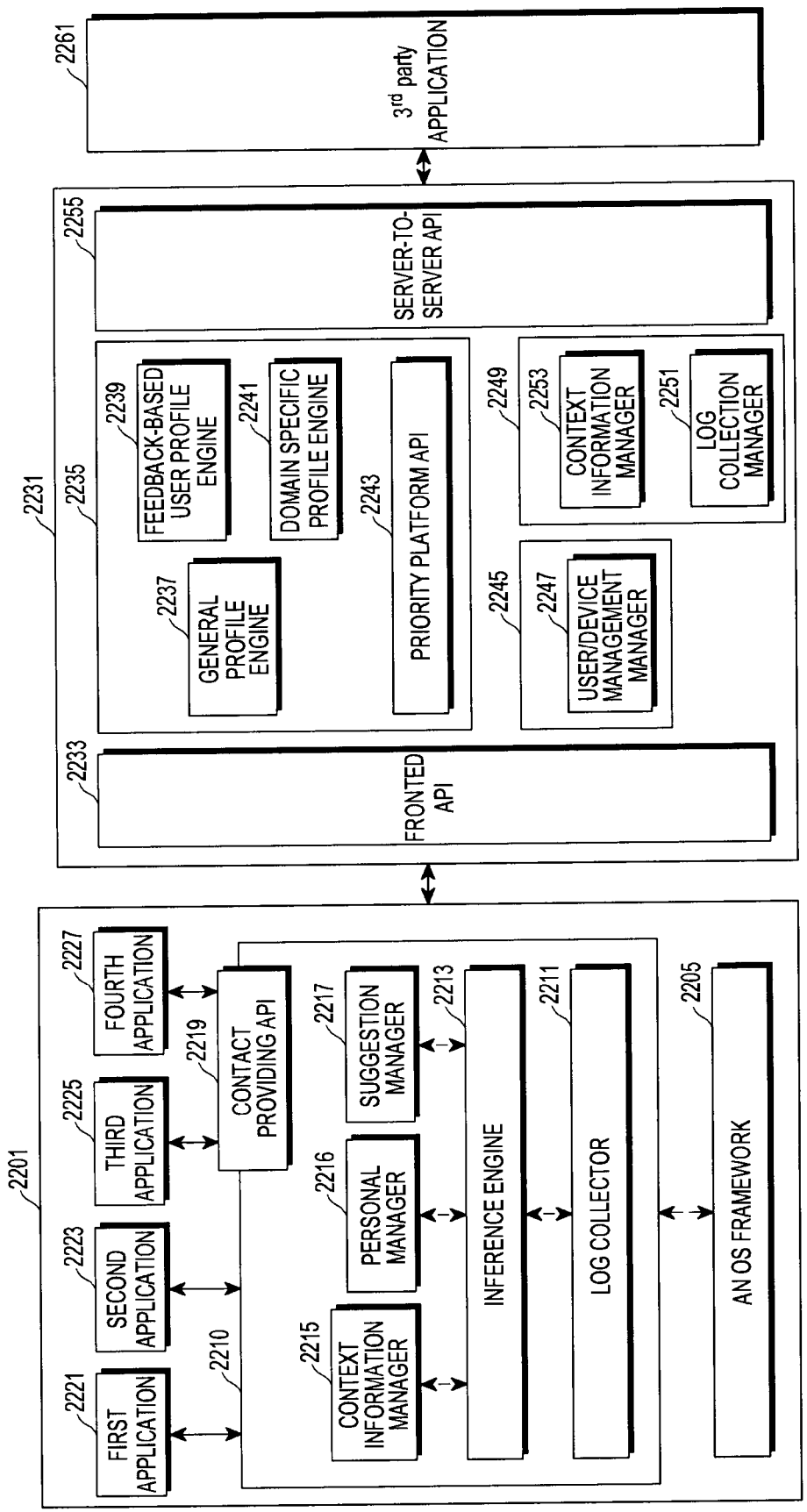
FIG. 22 is a block diagram illustrating a system for providing a hint according to various embodiments.

FIG. 22 is a block diagram illustrating a system for providing a hint according to various embodiments.

Referring to FIG. 22, the system for providing a hint may include an electronic device 2201 and a server 2231.

According to an embodiment, the electronic device 2201 may be developed and operated based on an OS framework 2205.

According to an embodiment, the electronic device 2201 may include a big data collection client 2210, and the big data collection client 2210 may include a log collector 2211, an inference engine 2213, a context information manager 2215, a personal manager 2216, a suggestion manager 2217, a content providing application programming interface (API) 2219.

According to an embodiment, the log collector 2211 may collect logs (also referred to as log data) of the electronic device 2201. For example, the log collector 2211 may collect state logs of the electronic device 2201 according to a user input at the electronic device 2201. For example, the user input may be various, such as a voice input, a touch input, a user manipulation of buttons (or keys), and/or an input using a remote controller.

According to an embodiment, the inference engine 2213 may infer context information of a user and/or the electronic device 2203 from information input by the user and/or information collected using one or more sensors of the electronic device 2201. For example, the inference engine 2213 may infer the context information of the user and/or the electronic device 2201 based on the logs of the electronic device 2201 collected through the log collector 2211. For example, the inference engine 2213 may infer a location of a user's home and/or company or location-related context information (e.g., during commuting, traveling, driving, etc.).

According to an embodiment, a context information manager 2215 may collect context information of the electronic device 2201. For example, the context information manager 2215 may collect the context information of the electronic device 2201 inferred using the inference engine 2213. For example, the context information may include general context information, user context information, and/or device context information.

For example, the general context information may include general context information of the electronic device 2201. The general context information may be confirmed through an internal algorithm by receiving data through a sensor hub of a device platform or the like. For example, the general context information may include information about a current time and space. The information about the current time and space may include, for example, information about a current time and a current location of the electronic device 2201. The current time may be confirmed through time on the electronic device 2201, and the information about the current location may be confirmed through a global positioning system (GPS). By way of another example, the general context information may include information about physical movement. The information about physical movement may include, for example, information about walking, running, driving, and the like. The information about physical movement may be confirmed through a motion sensor. The information about driving may be confirmed through the motion sensor, and boarding and parking may be confirmed by sensing a Bluetooth connection in a vehicle. By way of still another example, the general context information may include user activity information. The user activity information may include, for example, information about commuting, shopping, traveling, and the like. The user activity information may be confirmed using information about a user or a place which is registered in a database by an application.

For example, the user context information may include information about the user. For example, the user context information may include information about emotional states of the user. The information about the emotional states may include, for example, information about user's happiness, sadness, anger, and the like. By way of another example, the user context information may include information about the current state of the user. The information about the current state may include information about, for example, interest, intention, etc. (e.g., shopping).

For example, the device context information may include information about the state of the electronic device 2201. For example, the device context information may include information about path rules executed by the electronic device 2201. By way of another example, the device context information may include information about a battery. The information on the battery may be confirmed through, for example, the state of charge and discharge of the battery. By way of still another example, the device context information may include information about a connected device and network. The information about the connected device may be confirmed, for example, via a communication interface to which the device is connected.

According to an embodiment, the context information manager 2215 may transmit the context information to the suggestion manager 2217.

According to an embodiment, the personal manager 2216 may manage user's personal information using the electronic device 2201. For example, the personal manager 2216 may collect usage information and performance results of the electronic device 2201 to manage the user's personal information. For example, the personal manager 2216 may collect the user's personal information based on the context information of the electronic device 2201 inferred using the inference engine 2213. For example, the personal information of the user using the electronic device 2201 may include information about operation result information of the application executed by the electronic device 2201 and/or information about the current state of the electronic device 2201.

According to an embodiment, the personal manager 2216 may transmit the personal information of the user using the electronic device 2201 to the suggestion manager 2217.

According to an embodiment, the personal manager 2216 may transmit the user's personal information to the server 2231. For example, the personal manager 2216 may periodically transmit the received and accumulated user's personal information to the server 2231.

According to an embodiment, the suggestion manager 2217 may predict a user's intention and may recommend a hint to the user to perform an operation of the electronic device. For example, the suggestion manager 2217 may recommend the hint to the user in consideration of the current state of the user (e.g., time, place, occasion, used application). For example, the suggestion manager 2217 may recommend the hint for executing the operation of the electronic device 2201 using the context information of the electronic device 2201 received via the context information manager 2215, the user's personal information of the electronic device 2201 received via the personal manager 2216, and/or the user context information inferred by the inference engine 2213.

According to an embodiment, the electronic device 2201 may include a first application 2221, a second application 2223, a third application 2225, and/or a fourth application 2227.

According to an embodiment, a content providing application programming interface (API) 2219 may transmit information collected and generated by the big data collection client 2210, to the first, second, third, and/or fourth applications 2221, 2223, 2225, and 2227 of the electronic device 2201.

According to an embodiment, the server 2231 may communicate with the electronic device 2201 via a fronted API 2233 of the server 2231 and may be requested to provide a hint from the electronic device 2201.

According to an embodiment, the server 2231 may include an analysis module 2235 (also referred to as an intelligent module), a service management module 2245, and a log/context information management module 2249.

According to an embodiment, the analysis module 2235 may include a general profile engine 2237, a feedback-based user profile engine 2239, a domain specific profile engine 2241, and a priority platform API 2243.

According to an embodiment, the general profile engine 2237 may generate a general profile based on information received from the electronic device 2201.

According to an embodiment, the feedback-based user profile engine 2239 may generate a feedback-based profile based on information about feedback received from the electronic device 2201. For example, the feedback-based user profile engine 2239 may generate the feedback-based profile using a reinforcement learning approach.

According to an embodiment, the domain specific profile engine 2241 may generate a profile for each domain by classifying the information received from the electronic device 2201 for each domain. The domain may be various, such as health, intention extraction, and the like.

According to an embodiment, the priority platform API 2243 may generate a priority condition for determining a hint to be provided to the electronic device 2201 based on time, location, and/or occasion. For example, the priority platform API 2243 may be referred to as a TPO-based analyzer.

According to an embodiment, the service management module 2245 may include a user/device management manager 2247. For example, the user/device management manager 2247 may manage the device context information of the electronic device 2201. For example, the device context information may include information about the battery of the electronic device 2201, information about a CPU of the electronic device 2201, and/or information about a device and network connected to the electronic device 2201.

According to an embodiment, the log/context information management module 2249 may include a log collection manager 2251 and a context information manager 2253. For example, the log collection manager 2251 may collect and store logs of the electronic device 2201. For example, the context information manager 2253 may store context information at the time of log collection of the electronic device 2201.

According to an embodiment, the server 2231 may further include a server-to-server API 2255, and may communicate with a 3rd party application 2261 via the server-to-server API 2255. For example, the server 2231 may receive information about the electronic device 2201 (e.g., information used by the electronic device 2201 in the 3rd party application 2261) from the 3rd party application 2261. For example, the 3rd party application 2261 may be various, such as "viv," a service server, an Internet of things (IOT) cloud, or the like.

Figure 23:
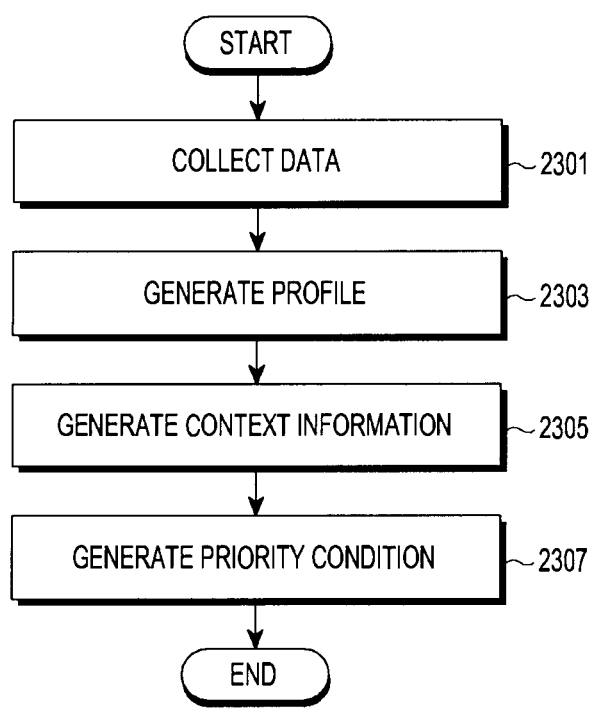
FIG. 23 is a flowchart illustrating an operation for hint generation of a server according to various embodiments.

FIG. 23 is a flowchart illustrating an operation for hint generation of a server according to various embodiments.

In operation 2301, the server may collect data of the electronic device.

According to an embodiment, the data of the electronic device may include device information, application usage information of the electronic device, and/or service usage information. For example, the device information may include information such as the location of the electronic device, the movement of the electronic device, a Bluetooth connection of the electronic device, a screen-on of the electronic device, and/or setting change of the electronic device. For example, the application usage information of the electronic device may include a foreground application, an application setting change, a contact use, a command, an application touch, a URL, a search keyword, music, and the like. For example, the service usage information may include usage logs of services such as the use of an IOT device and Samsung Pay.

In operation 2303, the server may generate a profile of the electronic device.

According to an embodiment, the server may aggregate the log data of the electronic device over a long period of time and may generate the profile of the electronic device based on the aggregated log data.

According to an embodiment, the profile may include a location profile, a behavior profile, and/or a user profile. For example, the location profile may include a home, a workplace, a car, a frequently visited location, and/or a user input location. For example, the behavior profile may include a sleeping time, and/or commuting time. For example, the user profile may include a user's interest category and keywords, demographics, and/or a service specific user profile.

In operation 2305, the server may generate the context information of the electronic device.

According to an embodiment, the server may combine the generated profile with the log data of the electronic device to generate the context information of the electronic device.

According to an embodiment, the context information may include place context information and/or context information. For example, the place context information may include information such as inside . . . , outside . . . , in . . . , nearby . . . , an exceptional path, everyday life, an unusual place, domestic, overseas, and/or travel. For example, the context information may include information such as before sleep, after sleep, before commuting, after commuting, during commuting, before driving, after driving, during driving, and/or weather.

In operation 2307, the server may generate a priority condition for determining a hint to be provided to the electronic device.

According to an embodiment, the server may combine the context information and the log data to generate the priority condition.

According to an embodiment, the priority condition may include a general priority condition, a service specific priority condition, and/or a suggestion priority condition. For example, the general priority condition may include application preference, contact preference, setting preference, location preference, music preference, URL, and/or search keywords. For example, the service specific priority condition may include hint command preference, IOT preference, and/or service preference. For example, the suggestion priority condition may include content based and/or collaborative filtering.

Figure 24:
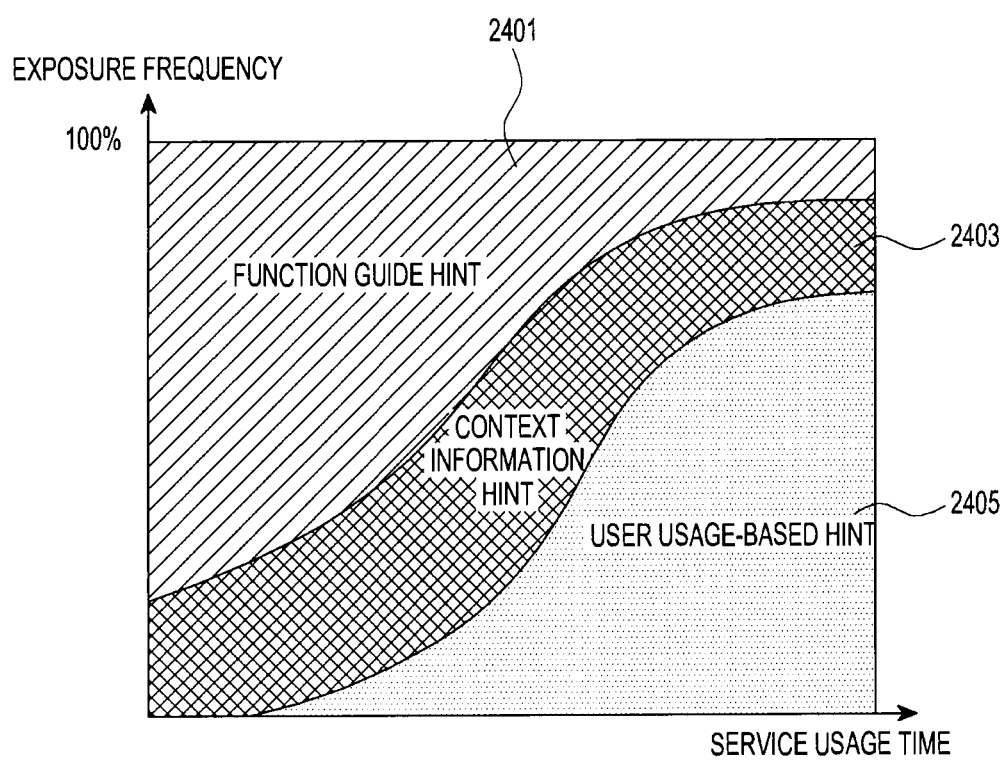
FIG. 24 is a graph illustrating a type of a hint to be provided in consideration of a use time of hint providing of an electronic device according to various embodiments and a hint exposure frequency thereof.

FIG. 24 is a graph illustrating a type of a hint to be provided in consideration of a use time of hint providing of an electronic device according to various embodiments and a hint exposure frequency thereof.

Referring to FIG. 24, in the beginning of the function of providing the hint according to the above-described embodiments, since personal data of a user logged in the electronic device is small, a function guide hint 2401 (e.g., the hint included in the function guide hint table 1701) and a context information hint 2403 (e.g., the hint included in the context information hint table 1705) may be mainly exposed. However, as the user's use of the above-mentioned functions increases, a probability of recommending a user usage-based hint 2405 (e.g., the hint included in the user usage-based hint table 1703) increases, thereby providing a personalized hint. However, even if the ratio of the user usage-based hints increases, it may be desirable to maintain the exposure rate of the function guide hint 2401 at a predetermined level or more. This can be utilized to induce to use the corresponding function by introducing the function which the user has not used among the less exposed hints.

According to an embodiment, assuming that the use of any particular hint by the user is repeated, the user usage-based hint may be displayed most preferentially. The priority of the hint which has been shown to the user several times but has not been selected may be reduced. In addition, once the user has achieved the purpose, the hint may be kept from appearing for a while.

According to an embodiment, in the operation in which the electronic device provides the hint to the user, the electronic device may provide the hints with different priorities to the user according to the type of each of the hints. For example, exposure priorities of the hints may be determined in the order of personalized hints, context information hints, and application hints, and the total number of hints to be exposed may be limited. In the case of the personalized hints, the hints may be generated through rotation according to the priority for each context information. In the case of the context information hints, when there is no the personalized hint, the hints may be displayed according to the priorities.

According to an embodiment, when the user usage-based hint is significantly short, the recommendation may be excluded.

According to an embodiment, the above-described state sequence log may be interlocked with a user's account on the server. For example, the user's account may have multiple electronic device IDs, and the same or different device types may exist.

According to various embodiments, the hints of the electronic device of the user may be shared with other electronic devices of the user. For example, when the electronic device performs an operation in conjunction with another electronic device (e.g., a video of a terminal is executed on a TV) or when the electronic device operates independently (e.g., a video search on a TV), the hint may be provided from another electronic device (e.g., a mobile device).

Figure 25:
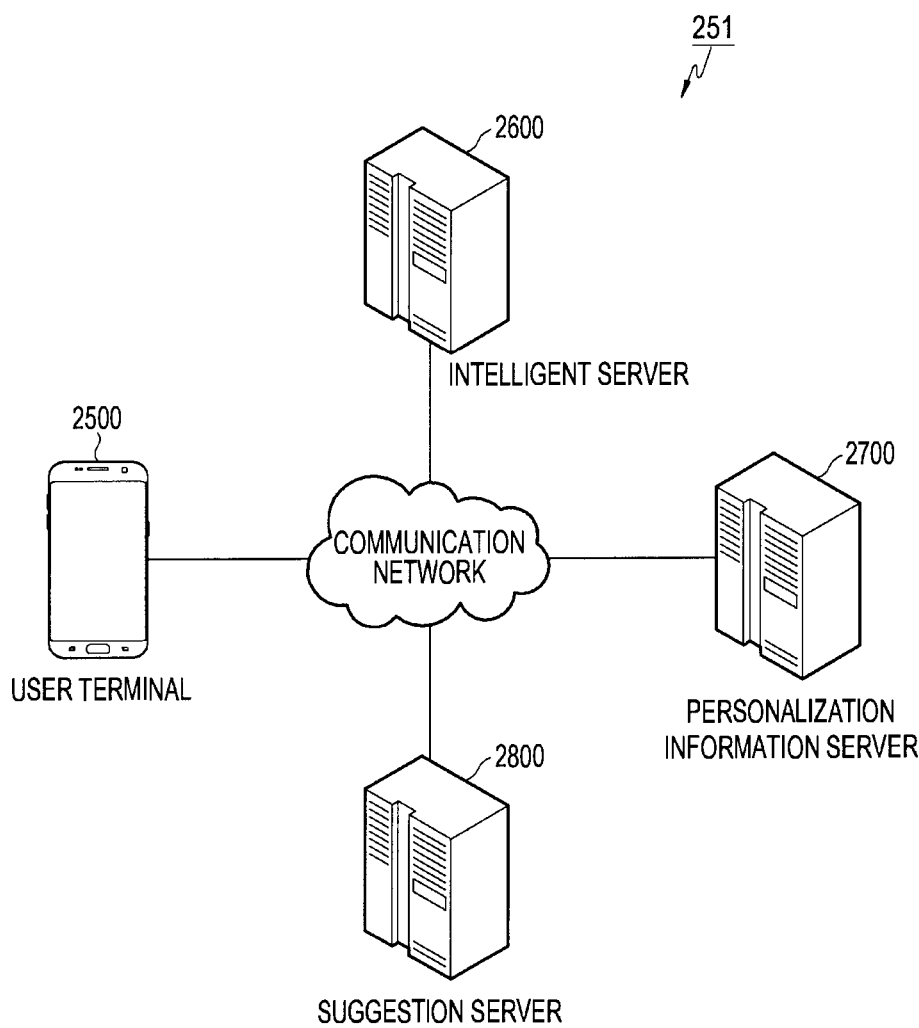
FIG. 25 is a diagram illustrating an integrated intelligent system according to various embodiments of the present disclosure.

FIG. 25 is a diagram illustrating an integrated intelligent system according to various embodiments of the present disclosure.

Referring to FIG. 25, an integrated intelligent system 251 may include a user terminal 2500 (e.g., the electronic device 101), an intelligent server 2600 (e.g., the server 106), a personalization information server 2700 (e.g., the server 106), or a suggestion server 2800 (e.g., the server 106).

The user terminal 2500 may provide services to a user through apps (or application programs or also referred to as applications (e.g., an alarm app, a message app, a photo (gallery) app, etc.) stored in the user terminal 2500. For example, the user terminal 2500 may execute and operate other apps through an intelligent app (or a voice recognition app) stored in the user terminal 2500. A user input for executing the operation of the other application through the intelligent app of the user terminal 2500 may be received. The user input may be received via, for example, a physical button, a touchpad, a voice input, a remote input, or the like. According to an embodiment, the user terminal 2500 may correspond to various terminal devices (or electronic devices) that can be connected to the Internet, such as a mobile phone, a smart phone, a personal digital assistant (PDA), or a notebook computer.

According to an embodiment, the user terminal 2500 may receive a user's utterance as the user input. The user terminal 2500 may receive the user's utterance and may generate a command to operate the app based on the user's utterance. Accordingly, the user terminal 2500 may operate the application using the command.

The intelligent server 2600 may receive a user voice input from the user terminal 2500 via a communication network and may convert the received user voice input into text data. According to another embodiment, the intelligent server 2600 may generate (or select) a path rule based on the text data. The path rule may include information about an action (or an operation) for performing the function of the app or information about a parameter for executing the operation. In addition, the path rule may also include a sequence of the operations of the app. The user terminal 2500 may receive the path rule, may select an app according to the path rule, and may execute the operation included in the path rule in the selected app.

For example, the user terminal 2500 may perform the above-described operation and may display a screen corresponding to the state of the user terminal 2500 that has performed the operation, on a display. By way of another example, the user terminal 2500 may execute the operation and may not display the result of performing the operation on the display. The user terminal 2500 may, for example, execute a plurality of operations and may display some of the results of the operations on the display. The user terminal 2500 may, for example, display the result of performing the last operation on the display. By way of still another example, the user terminal 2500 may receive the user input and may display the result of performing the above-described operation on the display.

The personalization information server 2700 may include a database in which user information is stored. For example, the personalization information server 2700 may receive user information (e.g., context information, application execution, etc.) from the user terminal 2500 and may store the received user information in the database. The intelligent server 2600 may be used when receiving the user information from the personalization information server 2700 through a communication network and generating the path rule for the user input. According to an embodiment, the user terminal 2500 may receive the user information from the personalization information server 2700 through the communication network and may use the received user information as information for managing the database.

The suggestion server 2800 may include a database in which information about an introduction of a function or an application or information about a function to be provided is stored in the terminal. For example, the suggestion server 2800 may include a database for a function of receiving the user information of the user terminal 2500 from the personalization information server 2700 so that the user may use the user information. The user terminal 2500 may receive information about the function to be provided from the suggestion server 2800 through the communication network and may provide the received information to the user.

Figure 26:
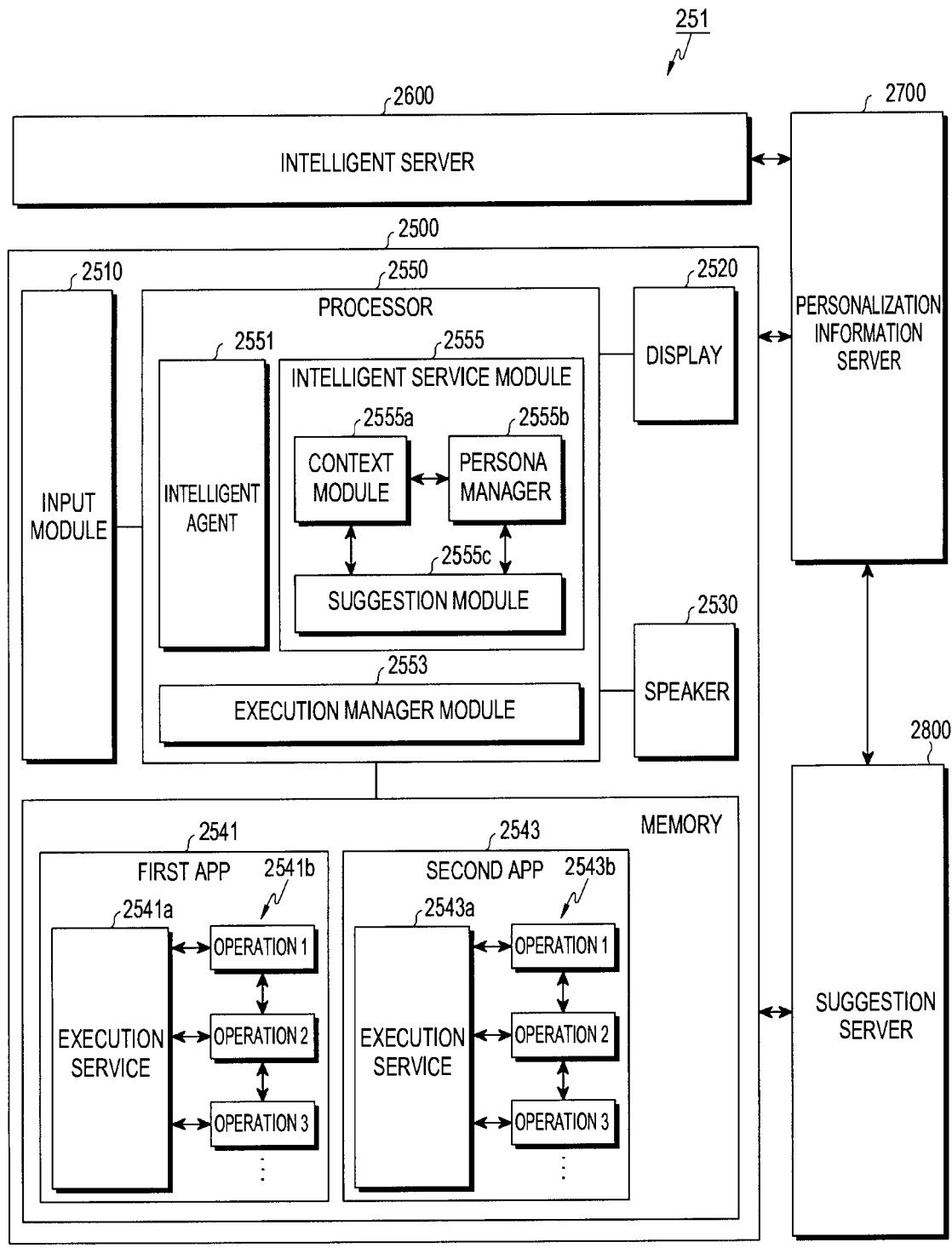
FIG. 26 is a block diagram illustrating a user terminal of an integrated intelligent system according to an embodiment of the present disclosure.

FIG. 26 is a block diagram illustrating a user terminal of an integrated intelligent system 251 according to an embodiment of the present disclosure.

Referring to FIG. 26, the user terminal 2500 may include an input module 2510 (e.g., the input device 250), a display 2520 (e.g., the display 260), a speaker 2530 (e.g., the speaker 282), a memory 2540 (e.g., the memory 230), or a processor 2550 (e.g., the processor 210). The user terminal 2500 may further include a housing, and the configurations of the user terminal 2500 may be placed inside the housing or on the housing.

According to an embodiment, the input module 2510 may receive the user input from the user. For example, the input module 2510 may receive the user input from a connected external device (e.g., a keyboard, a headset). By way of another example, the input module 2510 may include a touch screen (e.g., a touch screen display) coupled with the display 2520. By way of still another example, the input module 2510 may include a hardware key (e.g., 2512 in FIG. 27) (or a physical key) positioned in the user terminal 2500 (or the housing of the user terminal 2500).

According to an embodiment, the input module 2510 may include a microphone (e.g., 2513*a* or 2513*b* in FIG. 27) capable of receiving a user's utterance as a voice signal.

For example, the input module 2510 may include a speech input system and may receive the user's utterance as the voice signal via the speech input system.

According to an embodiment, the display 2520 may display images, videos, and/or execution screens of the applications. For example, the display 2520 may display a graphical user interface (GUI) of the app.

According to an embodiment, the speaker 2530 may output a voice signal. For example, the speaker 2530 may output the voice signal generated inside the user terminal 2500 to the outside.

According to an embodiment, the memory 2540 may store a plurality of apps 2541 and 2543. The plurality of apps 2541 and 2543 stored in the memory 2540 may be selected, executed, and operated according to the user input.

According to an embodiment, the memory 2540 may include a database capable of storing information utilized to recognize the user input. For example, the memory 2540 may include a log database capable of storing log information. By way of another example, the memory 2540 may include a persona database capable of storing the user information.

According to an embodiment, the memory 2540 may store the plurality of apps 2541 and 2543, and the plurality of apps 2541 and 2543 may be loaded and operated. For example, the plurality of apps 2541 and 2543 stored in the memory 2540 may be loaded and operated by an execution manager module 2553 of the processor 2550. The plurality of apps 2541 and 2543 may include execution services 2541*a* and 2543*a* or a plurality of operations (or unit operations) 2541*b* and 2543*b* which perform functions. The execution services 2541*a* and 2543*a* may be generated by the execution manager module 2553 of processor 2550 to execute the plurality of operations 2541*b* and 2543*b*.

According to an embodiment, when the operations 2541*b* and 2543*b* of the apps 2541 and 2543 are executed, an execution state screen according to the execution of the operations 2541*b* and 2543*b* may be displayed on the display 2520. The execution state screen may be, for example, a screen in which the operations 2541*b* and 2543*b* are completed. By way of another example, the execution state screen may be a screen for partial landing (for example, when parameters utilized for the operations 2541*b* and 2543*b* are not inputted) in which the execution of the operations 2541*b* and 2543*b* is stopped.

According to an embodiment, the execution services 2541*a* and 2543*a* may execute the operations 2541*b* and 2543*b* according to the path rule. For example, the execution services 2541*a* and 2543*a* may be activated by the execution manager module 2553, may receive an execution request according to the path rule from the execution manager module 2553, and may execute the operations of the apps 2541, 2543. When the execution of the operations 2541*b* and 2543*b* are completed, the execution services 2541*a* and 2543*a* may transmit completion information to the execution manager module 2553.

According to an embodiment, when the plurality of operations 2541*b* and 2543*b* are executed in the apps 2541 and 2543, the plurality of operations 2541*b* and 2543*b* may be executed sequentially. The execution services 2541*a* and 2543*a* may open the next operation (operation 2) when the execution of one operation (operation 1) is completed, and may transmit completion information to the execution manager module 2553. Here, opening an arbitrary operation can be understood as transitioning the arbitrary operation to an executable state or preparing for the execution of the arbitrary operation. In other words, when the arbitrary operation is not opened, the corresponding operation cannot be executed. The execution manager module 2553 may transmit an execution request for the next operations 2541*b* and 2543*b* to the execution service (e.g., operation 2) when the completion information is received. According to an embodiment, when the plurality of apps 2541 and 2543 are executed, the plurality of apps 2541 and 2543 may be sequentially executed. For example, when the execution of the last operation of the first application 2541 is completed and corresponding completion information is received, the execution manager module 2553 may transmit a request to execute the first operation of the second app 2543 to the execution service 2543*a*.

According to an embodiment, when the plurality of operations 2541*b* and 2543*b* are executed in the apps 2541 and 2543, a result screen according to the execution of each of the plurality of executed operations 2541*b* and 2543*b* may be displayed on the display 2520. According to an embodiment, a portion of a plurality of result screens resulting from the execution of the plurality of executed operations 2541*b* and 2543*b* may be displayed on the display 2520.

According to an embodiment, the memory 2540 may store intelligent apps (e.g., voice recognition apps) interlocked with an intelligent agent 2551. The app interlocked with the intelligent agent 2551 may receive and process a user's utterance as a voice signal. According to an embodiment, the application interlocked with the intelligent agent 2551 may be operated by a specific input (e.g., an input via a hardware key, an input via a touch screen, a specific voice input, or the like) that is input via the input module 2510.

According to an embodiment, the processor 2550 may control the overall operation of the user terminal 2500. For example, the processor 2550 may control the input module 2510 to receive the user input. The processor 2550 may control the display 2520 to display an image. The processor 2550 may control the speaker 2530 to output the voice signal. The processor 2550 may control the memory 2540 to retrieve or store relevant information.

According to an embodiment, the processor 2550 may include the intelligent agent 2551, the execution manager module 2553, or an intelligent service module 2555. In an embodiment, the processor 2550 may execute commands stored in the memory 2540 to drive the intelligent agent 2551, the execution manager module 2553, or the intelligent service module 2555. The various modules referred to in the various embodiments of the present disclosure may be implemented in hardware or software. Operations performed by the intelligent agent 2551, the execution manager module 2553, or the intelligent service module 2555 in various embodiments of the present disclosure may be understood as operations performed by the processor 2550.

According to an embodiment, the intelligent agent 2551 may generate a command to operate the app based on the voice signal received as the user input. According to an embodiment, the execution manager module 2553 may receive the generated command from the intelligent agent 2551, and may select, execute, and operate the apps 2541 and 2543 stored in the memory 2540. According to an embodiment, the intelligent service module 2555 may be used to manage the user information and process the user input.

The intelligent agent 2551 may transmit the user input received via the input module 2510 to the intelligent server 2600 for processing.

According to an embodiment, the intelligent agent 2551 may pre-process the user input before transmitting the user input to the intelligent server 2600. According to an embodiment, the intelligent agent 2551 may include an adaptive echo canceller (AEC) module, a noise suppression (NS) module, an end-point detection (EPD) module, or an automatic gain control (AGC) module in order to pre-process the user input. The AEC module may remove an echo included in the user input. The NS module may suppress background noise included in the user input. The EPD module may detect an end-point of the user voice included in the user input to find a part where the user's voice exists. The AGC module may adjust the volume of the user input to be suitable for recognizing and processing the user input. According to an embodiment, the intelligent agent 2551 may include all of the above-described preprocessing configurations for the purpose of performance. However, according to another embodiment, the intelligent agent 2551 may include some of the preprocessing configurations to operate at low power.

According to an embodiment, the intelligent agent 2551 may include a wake-up recognition module that recognizes a user's call. The wake-up recognition module may recognize a user's wake-up command via a voice recognition module, and may activate the intelligent agent 2551 to receive the user input when the wake-up command is received. According to an embodiment, the wake-up recognition module of the intelligent agent 2551 may be implemented in a low power processor (e.g., a processor included in an audio codec). According to an embodiment, the intelligent agent 2551 may be activated according to the user input via a hardware key. When the intelligent agent 2551 is activated, the intelligent app (e.g., the voice recognition app) interlocked with the intelligent agent 2551 may be executed.

According to an embodiment, the intelligent agent 2551 may include the voice recognition module for performing the user input. The voice recognition module may recognize the user input for causing the app to execute the corresponding operation. For example, the voice recognition module may recognize a limited user (voice) input (e.g., utterance such as "clicking" that allows a shooting operation to be executed when the camera app is executed) through which the apps 2541 and 2543 execute an operation such as the wake-up command. The voice recognition module that assists the intelligent server 2600 and recognizes the user input may recognize and rapidly process the user command that can be processed in the user terminal 2500. According to an embodiment, the voice recognition module for executing the user input of the intelligent agent 2551 may be implemented in the application processor.

According to an embodiment, the voice recognition module of the intelligent agent 2551 (including the voice recognition module of the wake-up module) may recognize the user input using an algorithm for recognizing a voice. The algorithm used to recognize the voice may be at least one of, for example, a hidden Markov model (HMM) algorithm, an artificial neural network (ANN) algorithm, and a dynamic time warping (DTW) algorithm.

According to an embodiment, the intelligent agent 2551 may convert the user's voice input into text data. According to an embodiment, the intelligent agent 2551 may forward the user's voice to the intelligent server 2600 to receive the converted text data. Accordingly, the intelligent agent 2551 may display the text data on the display 2520.

According to an embodiment, the intelligent agent 2551 may receive the path rule transmitted from the intelligent server 2600. According to an embodiment, the intelligent agent 2551 may transmit the path rule to the execution manager module 2553. According to an embodiment, the intelligent agent 2551 may transmit an execution result log according to the path rule received from the intelligent server 2600, to the intelligent service module 2555. Next, the transmitted execution result log may be accumulated and managed in user's preference information of the persona module 2555*b*.

According to an embodiment, the execution manager module 2553 may receive the path rule from the intelligent agent 2551 to execute the apps 2541 and 2543, and may cause the apps 2541 and 2543 to execute the operations 2541*b* and 2543*b* included in the path rule. For example, the execution manager module 2553 may transmit command information for executing the operations 2541*b* and 2543*b* to the apps 2541 and 2543, and may receive completion information of the operations 2541*b* and 2543*b* from the apps 2541 and 2543.

According to an embodiment, the execution manager module 2553 may transmit and receive the command information for executing the operations 2541*b* and 2543*b* of the apps 2541 and 2543 between the intelligent agent 2551 and the apps 2541 and 2543. The execution manager module 2553 may bind the apps 2541 and 2543 to be executed according to the path rule and may transmit the command information of the operations 2541*b* and 2543*b* included in the path rule to the apps 2541 and 2543. For example, the execution manager module 2553 may sequentially transmit the operations 2541*b* and 2543*b* included in the path rule to the apps 2541 and 2543 to thereby sequentially execute the operations 2541*b* and 2543*b* of the apps 2541 and 2543 according to the path rule.

According to an embodiment, the execution manager module 2553 may manage execution states of the operations 2541*b* and 2543*b* of the apps 2541 and 2543. For example, the execution manager module 2553 may receive information about the execution states of the operations 2541*b* and 2543*b* from the apps 2541 and 2543. When the execution state of each of the operations 2541*b* and 2543*b* is, for example, a partial landing state (e.g., when parameters utilized for the operations 2541*b* and 2543*b* are not input), the execution manager module 2553 may transmit information about a suspended state to the intelligent agent 2551. The intelligent agent 2551 may use the received information to make a request for the user to input relevant information (e.g., parameter information). By way of another example, an utterance may be received from the user when the execution state of each of the operations 2541*b* and 2543*b* is an operable state, and the execution manager module 2553 may transmit information about the executed apps 2541 and 2543 and information about the execution state of the apps 2541 and 2543 to the intelligent agent 2551. The intelligent agent 2551 may receive parameter information of the user's utterance through the intelligent server 2600 and may transmit the received parameter information to the execution manager module 2553. The execution manager module 2553 may change the parameters of the operations 2541*b* and 2543*b* into new parameters using the received parameter information.

According to an embodiment, the execution manager module 2553 may transmit the parameter information included in the path rule to the apps 2541 and 2543. When the plurality of apps 2541 and 2543 is sequentially executed according to the path rule, the execution manager module 2553 may transmit the parameter information included in the path rule from one app to another app.

According to an embodiment, the execution manager module 2553 may receive a plurality of path rules. The execution manager module 2553 may select the plurality of path rules based on the user's utterance. For example, when the user's utterance specifies one app 2541 to execute one operation 2541*b* but does not specify the other app 2543 to execute the remaining operation 2543*b*, the execution manager module 2553 may receive a plurality of different path rules in which the same app 2541 (e.g., a gallery app) to execute one operation 2541*b* is executed and the other app 2543 (e.g., a message app or a telegram app) to execute the remaining operation 2543*b* is executed. The execution manager module 2553 may execute the same operations 2541*b* and 2543*b* (e.g., the same successive operations 2541*b* and 2543*b*) of the plurality of path rules. When the same operation has been executed, the execution manager module 2553 may display, on the display 2520, the state screen for selecting the different apps 2541 and 2543 respectively included in the plurality of path rules.

According to an embodiment, the intelligent service module 2555 may include a context module 2555*a*, a persona module 2555*b*, or a suggestion module 2555*c*.

The context module 2555*a* may collect current states of the apps 2541 and 2543 from the apps 2541 and 2543. For example, the context module 2555*a* may receive the context information indicating the current states of the apps 2541 and 2543 and may collect the current states of the apps 2541 and 2543.

The persona module 2555*b* may manage user's personal information using the user terminal 2500. For example, the persona module 2555*b* may collect usage information and performance results of the user terminal 2500 to manage the user's personal information.

The suggestion module 2555*c* may predict a user's intention and may recommend a command to the user. For example, the suggestion module 2555*c* may recommend the command to the user in consideration of the current state of the user (e.g., time, place, occasion, or app).

Figure 27:
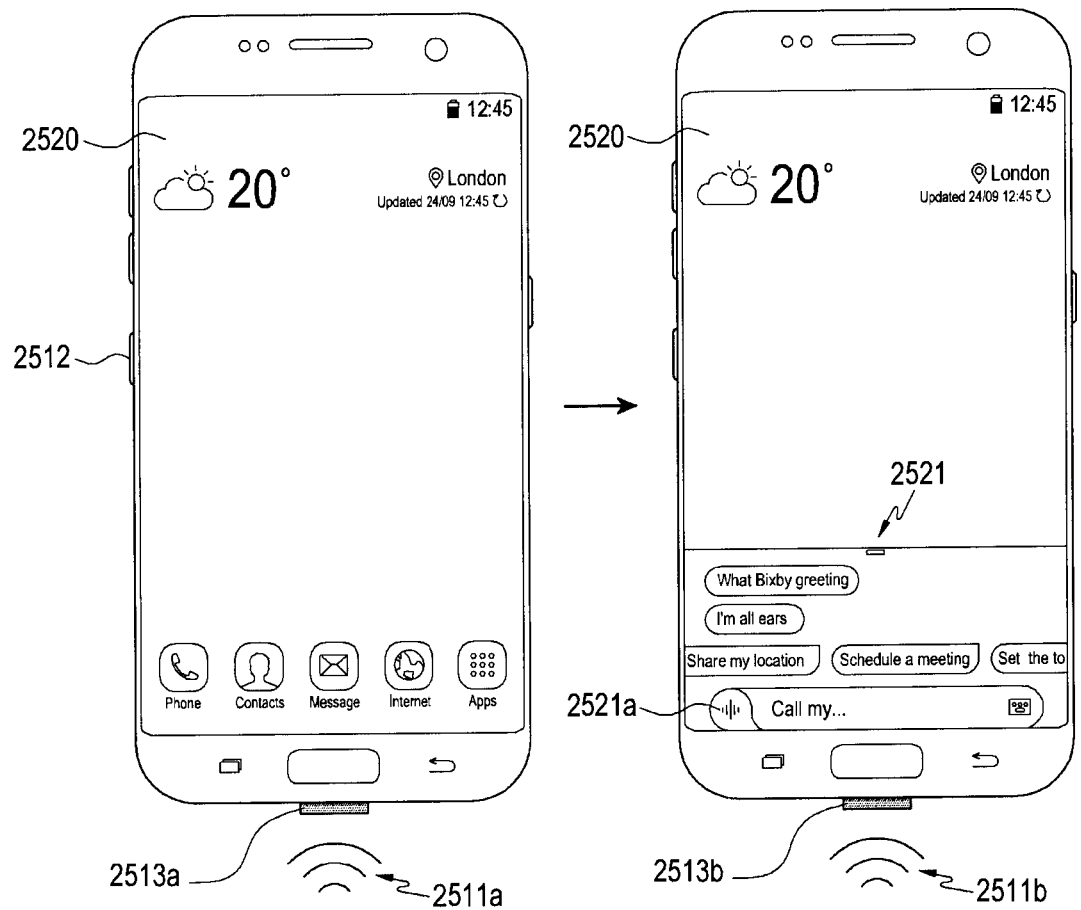
FIG. 27 is a diagram illustrating the execution of an intelligent app of a user terminal according to an embodiment of the present disclosure.

Referring to FIG. 27, the user terminal 2500 may receive the user input to execute an intelligent app (e.g., a voice recognition app) interworking with the intelligent agent 2551.

According to an embodiment, the user terminal 2500 may execute the intelligent app including voice recognition when activation of the hardware key 2512 is detected. For example, in response, the user terminal 2500 may display a user interface (UI) 2521 of the intelligent app on the display 2520 when the user input is received via the hardware key 2512. Similarly, the user may touch a voice recognition button 2521*a* in the UI 2521 of the intelligent app in order to enable voice input 2511*a* and 2511*b* when the UI 2521 of the intelligent app is displayed on the display 2520. By way of another example, the user may continuously press (e.g., long-press) the hardware key 2512 to activate the voice input 2511*b* function.

According to an embodiment, the user terminal 2500 may execute the intelligent app for recognizing the voice in response to inputs detected via microphones 2513*a* and 2513*b*. For example, the user terminal 2500 may display the UI 2521 of the intelligent app on the display 2520 when an input 2511*a* is detected including a designated voice input command (e.g., wake up!), which is detected via the microphones 2513*a* and 2513*b*.

Figure 28:
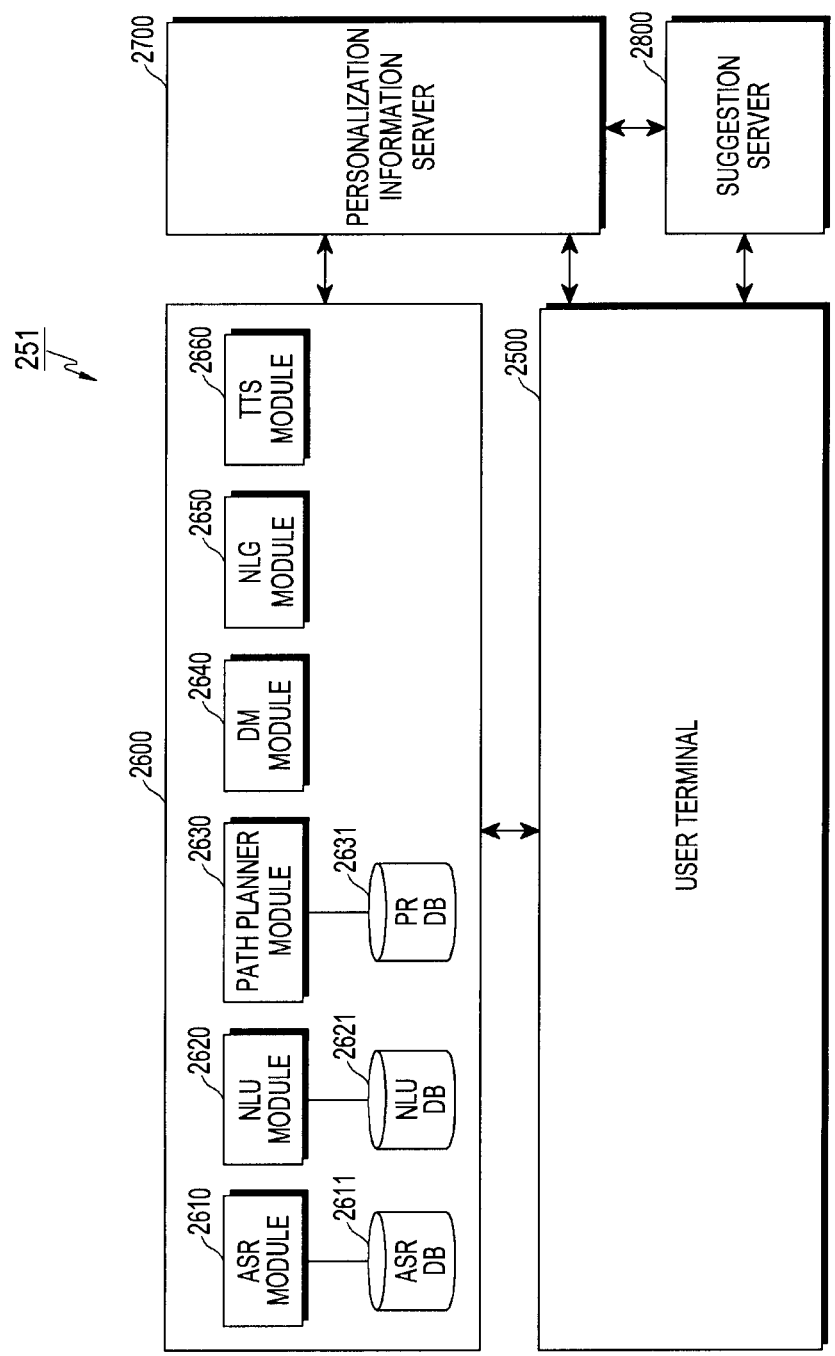
FIG. 28 is a block diagram illustrating an intelligent server of an integrated intelligent system according to an embodiment of the present disclosure.

FIG. 28 is a block diagram illustrating an intelligent server of an integrated intelligent system 251 according to an embodiment of the present disclosure.

Referring to FIG. 28, the intelligent server 2600 may include an automatic speech recognition (ASR) module 2610, a natural language understanding (NLU) module 2620, a path planner module 2630, a dialogue manager (DM) module 2640, a natural language generator (NLG) module 2650, or a text to speech (TTS) module 2660. The NLU module 2620 or the path planner module 2630 of the intelligent server 2600 may generate path rules.

According to an embodiment, the ASR module 2610 may convert the user input received from the user terminal 2500 into text data.

According to an embodiment, the ASR module 2610 may convert the user input received from the user terminal 2500 into text data. For example, the ASR module 2610 may include an utterance recognition module. The utterance recognition module may include an acoustic model and a language model. For example, the acoustic model may include information about utterance, and the language model may include information about unit phoneme information and a combination of the unit phonemic information. The utterance recognition module may convert the user's utterance into text data using the information about utterance and the unit phonemic information. The information about the acoustic model and the language model may be stored in, for example, an automatic speech recognition database (ASR DB) 2611.

According to an embodiment, the NLU module 2620 may perform syntactic analysis or semantic analysis to ascertain a user's intention. The syntactic analysis may divide the user input into syntactic units (e.g., words, phrases, morphemes, etc.) and may determine what syntactic elements the divided units have. The semantic analysis may be performed using semantic matching, rule matching, formula matching, or the like. Accordingly, the NLU module 2620 may obtain a parameter (or slot) for the user to express any one domain or the intention.

According to an embodiment, the NLU module 2620 may determine the user's intention and the parameter using a matching rule divided into the domain, the intention, and the parameter (or slot) for ascertaining the intention. For example, the one domain (e.g., alarm) may include a plurality of intentions (e.g., alarm setting, alarm cancellation, etc.), and one intention may include a plurality of parameters (e.g., time, number of repetitions, alarm tone, etc.). A plurality of rules may include, for example, one or more essential element parameters. The matching rule may be stored in the NLU DB 2621.

According to an embodiment, the NLU module 2620 may recognize the meaning of a word extracted from the user input using linguistic characteristics (e.g., syntactic elements) such as a morpheme, a phrase, etc., and may determine the user's intention by matching the recognized meaning of the word with the domain and the intention. For example, the NLU module 2620 may determine the user's intention by calculating how many words extracted from the user input are included in each domain and intention. According to an embodiment, the NLU module 2620 may determine the parameter of the user input using words used to understand the intention. According to an embodiment, the NLU module 2620 may determine the user's intention using the NLU DB 2621 in which linguistic characteristics for ascertaining the intention of the user input are stored. According to another embodiment, the NLU module 2620 may determine the user's intention using a personal language model (PLM). For example, the NLU module 2620 may determine the user's intention using personalized information (e.g., a contact list or a music list). The PLM may be stored in, for example, the NLU DB 2621. According to an embodiment, not only the NLU module 2620 but also the ASR module 2610 may recognize a user's voice by referring to the PLM stored in the NLU DB 2621.

According to an embodiment, the NLU module 2620 may generate the path rule based on the intention and parameter of the user input. For example, the NLU module 2620 may select an app to be executed based on the intention of the user input, and may determine an operation to be performed in the selected app. The NLU module 2620 may generate the path rule by determining the parameter corresponding to the determined operation. According to an embodiment, the path rule generated by the NLU module 2620 may include information about the app to be executed, the operation to be performed in the app, and the parameter utilized to perform the operation.

According to an embodiment, the NLU module 2620 may generate one path rule or a plurality of path rules based on the intention and parameter of the user input. For example, the NLU module 2620 may receive a path rule set corresponding to the user terminal 2500 from the path planner module 2630, and may map the intention and parameter of the user input onto the received path rule set to determine the path rule.

According to another embodiment, the NLU module 2620 may generate one path rule or a plurality of path rules by determining the app to be executed, the operation to be performed in the app, and the parameter utilized to execute the operation based on the intention and parameter of the user input. For example, the NLU module 2620 may generate the path rule by arranging the app to be executed and the operation to be executed in the app in an ontology or graph model form according to the intention of the user input using the information of the user terminal 2500. The generated path rule may be stored in a path rule database (PR DB) 2631 through, for example, the path planner module 2630. The generated path rule may be added to the path rule set of the PR DB 2631.

According to an embodiment, the NLU module 2620 may select at least one path rule among the generated plurality of path rules. For example, the NLU module 2620 may select an optimal path rule from the plurality of path rules. By way of another example, the NLU module 2620 may select the plurality of path rules when some operations are specified based on user's utterance. The NLU module 2620 may determine one of the plurality of path rules by a user's further input.

According to an embodiment, the NLU module 2620 may transmit the path rule to the user terminal 2500 in response to the user input. For example, the NLU module 2620 may transmit one path rule corresponding to the user input to the user terminal 2500. By way of another example, the NLU module 2620 may transmit the plurality of path rules corresponding to the user input to the user terminal 2500. The plurality of path rules may be generated by the NLU module 2620, for example, when some operations are specified based on the user's utterance.

According to an embodiment, the path planner module 2630 may select at least one path rule among the plurality of path rules.

According to an embodiment, the path planner module 2630 may transmit the path rule set including the plurality of path rules to the NLU module 2620. The plurality of path rules of the path rule set may be stored in the form of a table in the PR DB 2631 connected to the path planner module 2630. For example, the path planner module 2630 may transmit the path rule set corresponding to the information (e.g., OS information, app information, etc.) of the user terminal 2500 received from the intelligent agent 2551, to the NLU module 2620. The table stored in the PR DB 2631 may be stored, for example, for each domain or domain version.

According to an embodiment, the path planner module 2630 may select one path rule or the plurality of path rules from the path rule set, and may transmit the selected path rules to the NLU module 2620. For example, the path planner module 2630 may select one path rule or the plurality of path rules by matching the user's intention and parameter with the path rule set corresponding to the user terminal 101, and may transmit the selected path rule to the NLU module 2620.

According to an embodiment, the path planner module 2630 may generate one path rule or the plurality of path rules using the user's intention and parameter. For example, the path planner module 2630 may generate one path rule or a plurality of path rules by determining the app to be executed and the operation to be executed in the app based on the user's intention and parameter. According to an embodiment, the path planner module 2630 may store the generated path rule in the PR DB 2631.

According to an embodiment, the path planner module 2630 may store the path rule generated by the NLU module 2620 in the PR DB 2631. The generated path rule may be added to the path rule set stored in the PR DB 2631.

According to an embodiment, the table stored in the PR DB 2631 may include the plurality of path rules or the plurality of path rule sets. The plurality of path rules or the plurality of path rule sets may reflect the kind, version, type, or characteristics of the device performing each path rule.

According to an embodiment, the DM module 2640 may determine whether the user's intention ascertained by the NLU module 2620 is clear. For example, the DM module 2640 may determine whether the user's intention is clear based on whether information of the parameter is sufficient. The DM module 2640 may determine whether the parameter ascertained by the NLU module 2620 is sufficient to perform a task. According to an embodiment, the DM module 2640 may perform feedback that requests information from the user when the user's intention is not clear. For example, the DM module 2640 may perform feedback that makes a request for information about the parameter for ascertaining the user's intention.

According to an embodiment, the DM module 2640 may include a content provider module. When an operation can be performed based on the intention and parameter ascertained by the NLU module 2620, the content provider module may generate a result of performing the task corresponding to the user input. According to an embodiment, the DM module 2640 may transmit the result generated by the content provider module to the user terminal 2500 in response to the user input.

According to an embodiment, the NLG module 2650 may change designated information into a text form. The information changed into the text form may be provided in the form of a natural language utterance. The designated information changed into the text form may be, for example, information about additional inputs, information used to guide the completion of the operation corresponding to the user input, or information (e.g., feedback information about the user input) used to guide the additional inputs of the user. The information changed into the text form may be transmitted to the user terminal 2500 to be displayed on the display 2520, or may be transmitted to the TTS module 2660 to be changed into a voice form.

According to an embodiment, the TTS module 2660 may change the information in the text form into the information in the voice form. The TTL module 2660 may receive the information in the text form from the NLG module 2650, may convert the information in the text form into the information in the voice form, and may transmit resultant information to the user terminal 2500. The user terminal 2500 may output the information in the voice form to the speaker 2530.

According to an embodiment, the NLU module 2620, the path planner module 2630, and the DM module 2640 may be implemented as a single module. For example, the NLU module 2620, the path planner module 2630, and the DM module 2640 may be implemented as the single module to determine the user's intention and the parameter, and may generate a response (e.g., the path rule) corresponding to the determined user's intention and the parameter. Accordingly, the generated response may be transmitted to the user terminal 2500.

Figure 29:
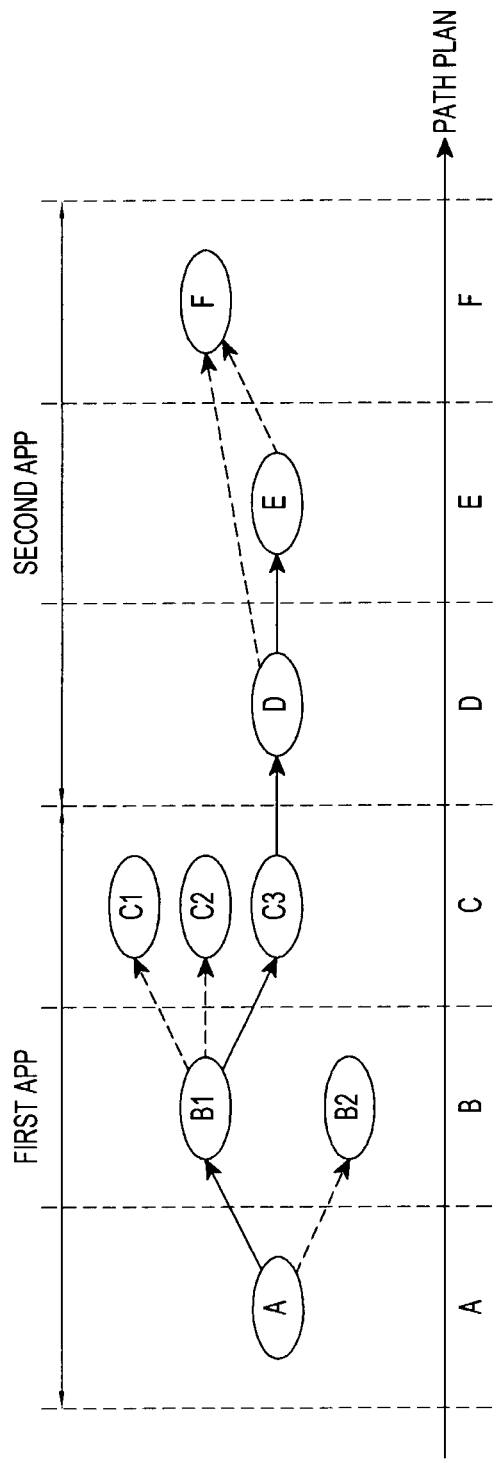
FIG. 29 is a diagram illustrating a method of generating a path rule of a path planner module according to an embodiment of the present disclosure.

FIG. 29 is a diagram illustrating a method of generating a path rule of a path planner module according to an embodiment of the present disclosure.

Referring to FIG. 29, the NLU module 2620 according to an embodiment may divide the function of an app into unit operations (A to F), and may store them in the PR DB 2631. For example, the NLU module 2620 may store a path rule set including a plurality of path rules A-B1-C1, A-B1-C2, A-B1-C3-D-F, and A-B1-C3-D-E-F divided into the unit operations in the PR DB 2631.

According to an embodiment, the PR DB 2631 of the path planner module 2630 may store the path rule set for performing the function of the app. The path rule set may include a plurality of path rules including a plurality of operations. The plurality of path rules may be sequentially arranged according to a parameter inputted to each of the plurality of operations. According to an embodiment, the plurality of path rules may be configured in an ontology or graph model form to be stored in the PR DB 2631.

According to an embodiment, the NLU module 2620 may select the optimal path rules A-B1-C3-D-F among the plurality of path rules A-B1-C1, A-B1-C2, A-B1-C3-D-F, and A-B1-C3-D-E-F corresponding to the intention and parameter of the user input.

According to an embodiment, the NLU module 2620 may transmit a plurality of rules to the user terminal 2500 when there is no path rule completely matched with the user input. For example, the NLU module 2620 may select a path rule (e.g., A-B1) that is partially corresponds to the user input. The NLU module 2620 may select one or more path rules (e.g., A-B1-C1, A-B1-C2, A-B1-C3-D-F, and A-B1-C3-D-E-F) that include the path rule (e.g., A-B1) partially corresponding to the user input, and may transmit the selected path rule to the user terminal 2500.

According to an embodiment, the NLU module 2620 may select one of the plurality of path rules based on the additional input to the user terminal 2500, and may transmit the selected one path rule to the user terminal 2500. For example, the NLU module 2620 may select the one path rule (e.g., A-B1-C3-D-F) among the plurality of path rules (e.g., A-B1-C1, A-B1-C2, A-B1-C3-D-F, and A-B1-C3-D-E-F) according to the user input (e.g., an input to select C3) additionally input to the user terminal 2500, and may transmit the selected path rule to the user terminal 2500.

According to still another embodiment, the NLU module 2620 may determine the user's intention or the parameter corresponding to the user input (e.g., the input to select C3) additionally input to the user terminal 2500 via the NLU module 2620, and may transmit the determined user's intention or parameter to the user terminal 2500. The user terminal 2500 may select one path rule (e.g., A-B1-C3-D-F) among the plurality of path rules (e.g., A-B1-C1, A-B1-C2, A-B1-C3-D-F, and A-B1-C3-D-E-F) based on the transmitted intention or parameter.

Accordingly, the user terminal 2500 may complete the operations of the apps 2541 and 2543 by the selected one path rule.

According to an embodiment, when the intelligent server 2600 receives the user input that lacks information, the NLU module 2620 may generate a path rule partially corresponding to the received user input. For example, the NLU module 2620 may transmit ① the partially corresponding path rule to the intelligent agent 2551. The intelligent agent 2551 may transmit ② the partially corresponding path rule to the execution manager module 2553, and the execution manager module 2553 may execute a first app 2541 according to the path rule. The execution manager module 2553 may transmit ③ information about insufficient parameter to the intelligent agent 2551 while executing the first app 2541. The intelligent agent 2551 may request an additional input from the user using the information about an insufficient parameter. When the additional input is received ④ by the user, the intelligent agent 2551 may transmit and process the received additional input to the intelligent server 2600. The NLU module 2620 may generate the path rule added based on information about the intention and parameter of the additionally input user input, and may transmit ⑤ the generated path rule to the intelligent agent 2551. The intelligent agent 2551 may transmit ⑥ the path rule to the execution manager module 2553 ⑥ to execute a second app 2543.

According to an embodiment, when the user input on which some information is missing is received at the intelligent server 2600, the NLU module 2620 may transmit a user information request to the personalization information server 2700. The personalization information server 2700 may transmit information of a user who inputs the user input stored in the persona database, to the NLU module 2620. The NLU module 2620 may use the user information to select the path rule corresponding to the user input in which some operations are missing. Accordingly, even though the user input on which some information is missing is received at the intelligent server 2600, the NLU module 2620 may request the missing information to receive a further input, or may use the user information to determine the path rule corresponding to the user input.

Figure 30:
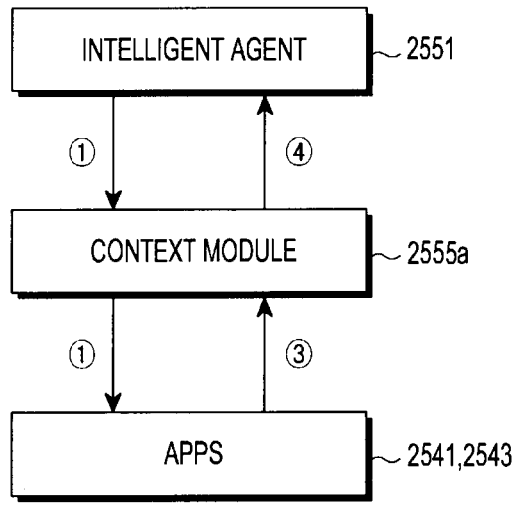
FIG. 30 is a diagram illustrating a case in which a context module of a processor according to an embodiment of the present disclosure collects current states.

FIG. 30 is a diagram illustrating a case in which a context module of a processor according to an embodiment of the present disclosure collects current states.

Referring to FIG. 30, when receiving ① a context request from the intelligent agent 2551, the context module 2555a may request ② context information indicating the current states of the apps 2541 and 2543 from the apps 2541 and 2543. According to an embodiment, the context module 2555a may receive ③ the context information from the apps 2541 and 2543 and may transmit ☐ the received context information to the intelligent agent 2551.

According to an embodiment, the context module 2555a may receive a plurality of pieces of context information through the apps 2541 and 2543. For example, the context information may be information about the most recently executed apps 2541 and 2543. By way of another example, the context information may be information about the current states of the apps 2541, 2543 (e.g., information about a photo when the photo is viewed in the gallery).

According to an embodiment, the context module 2555a may receive context information indicating the current state of the user terminal 2500 from the device platform as well as the apps 2541 and 2543. The context information may include general context information, user context information, or device context information.

The general context information may include general context information of the user terminal 2500. The general context information may be confirmed through an internal algorithm by receiving data through a sensor hub of the device platform. For example, the general context information may include information about a current time and space. The information about the current time and space may include, for example, information about a current time and a current location of the user terminal 2500. The current time may be confirmed through time on the user terminal 2500, and the information about the current location may be confirmed through a GPS. By way of another example, the general context information may include information about physical movement. The information about physical movement may include, for example, information about walking, running, driving, and the like. The information about physical movement may be confirmed through a motion sensor. The information about driving may be confirmed through the motion sensor, and boarding and parking may be confirmed by sensing a Bluetooth connection in a vehicle. By way of still another example, the general context information may include user activity information. The user activity information may include, for example, information about commuting, shopping, traveling, and the like. The user activity information may be confirmed using information about a user or a place which is registered in a database by an app.

The user context information may include information about the user. For example, the user context information may include information about emotional states of the user. The information about the emotional states may include, for example, information about user's happiness, sadness, anger, and the like. By way of another example, the user context information may include information about the current state of the user. The information about the current state may include information about, for example, interest, intention, etc. (e.g., shopping).

The device context information may include information about the state of the user terminal 2500. For example, the device context information may include information about path rules executed by the execution manager module 2553. By way of another example, the device information may include information about a battery. The information on the battery may be confirmed through, for example, the state of charge and discharge of the battery. By way of still another example, the device information may include information about a connected device and network. The information about the connected device may be confirmed, for example, via a communication interface to which the device is connected.

Figure 31:
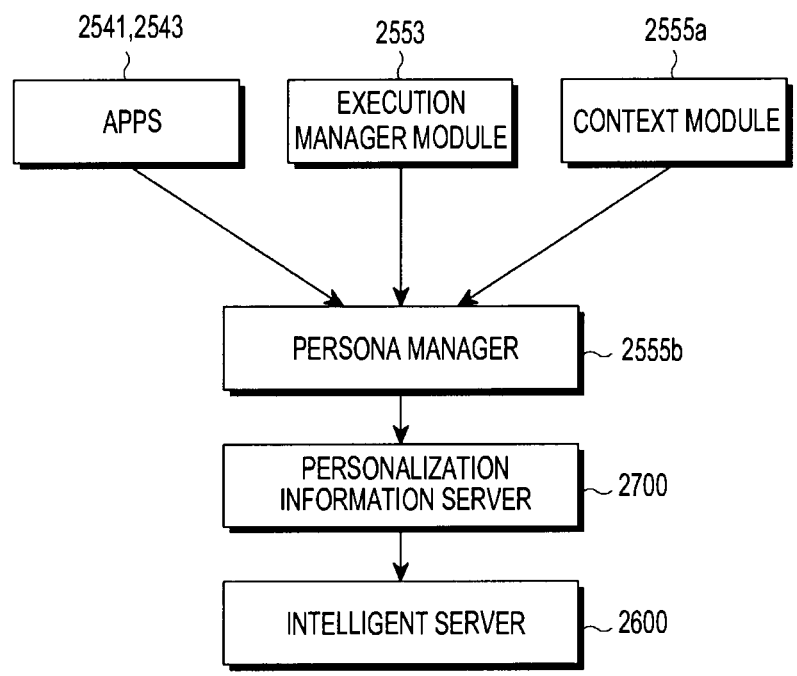
FIG. 31 is a diagram illustrating a case in which a persona module according to an embodiment of the present disclosure manages user information.

FIG. 31 is a diagram illustrating a case in which a persona module according to an embodiment of the present disclosure manages user information.

Referring to FIG. 31, the persona module 2555b may receive information of the user terminal 2500 from the apps 2541 and 2543, the execution manager module 2553, or the context module 2555a. The apps 2541 and 2543 and the execution manager module 2553 may store information about a result obtained by executing operations of the apps 2541b and 2543b, in an operation log database. The context module 2555a may store the information about the current state of the user terminal 2500 in a context database. The persona module 2555b may receive the stored information from the operation log database or the context database. The data stored in the operation log database and the context database may be analyzed by, for example, an analysis engine and may be transmitted to the persona module 2555b.

According to an embodiment, the persona module 2555b may transmit the information received from the apps 2541 and 2543, the execution manager module 2553, or the context module 2555a, to the suggestion module 2555c. For example, the persona module 2555b may transmit the data stored in the operation log database or the context database to the suggestion module 2555c.

According to an embodiment, the persona module 2555b may transmit the information received from the apps 2541 and 2543, the execution manager module 2553, or the context module 2555a, to the personalization information server 2700. For example, the persona module 2555b may periodically transmit the data accumulated and stored in the operation log database or the context database to the personalization information server 2700.

According to an embodiment, the persona module 2555b may transmit the data stored in the operation log database or the context database to the suggestion module 2555c. The user information generated by the persona module 2555b may be stored in a persona database. The persona module 2555b may periodically transmit the user information stored in the persona database to the personalization information server 2700. According to an embodiment, the information transmitted by the persona module 2555b to the personalization information server 2700 may be stored in the persona database. The personalization information server 2700 may infer user information utilized for generating the path rule of the intelligent server 2600 using the information stored in the persona database.

According to an embodiment, the user information inferred using the information transmitted by the persona module 2555b may include profile information or preference information. The profile information or the preference information may be inferred through a user's account and accumulated information.

The profile information may include personal information of a user. For example, the profile information may include demographic information of the user. The demographic information may include, for example, the user's gender, age, and the like. By way of another example, the profile information may include life event information. The life event information may be inferred by comparing log information with a life event model, and may be reinforced by analyzing a behavior pattern. By way of another example, the profile information may include interest information. The interest information may include, for example, a shopping item of interest, an area of interest (e.g., sports, politics, etc.). By way of another example, the profile information may include activity area information. The activity area information may include information about, for example, home, work place, and the like. The active area information may include information about a location where the priority is recorded based on a cumulative residence time and a visit frequency, as well as information about a location of the place. By way of another example, the profile information may include activity time information. The activity time information may include information about, for example, a wake-up time, a commute time, a sleeping time, and the like. The information about the commute time may be inferred using the activity area information (e.g., information about home and work place). The information about the sleeping time may be inferred through an unused time of the user terminal 2500.

The preference information may include user preference information. For example, the preference information may include information about app preference. The app preference may be inferred, for example, through a usage history of the app (e.g., a usage history for each time and place). The app preference may be used to determine an app to be executed according to a user's current state (e.g., time and place). In another example, the preference information may include information about contact preference. The contact preference may be inferred by analyzing a contact frequency of the contact (e.g., a frequency of contact for each time or place). The contact preference may be used to determine the contact to contact according to the current state of the user (e.g., contact for duplicate names). In another example, the preference information may include setting information. The setting information may be inferred by analyzing information about a setting frequency of a specific setting value (e.g., a frequency of setting as a setting value for each time or place). The setting information may be used to set a specific setting value according to the user's current state (e.g., time, place, or occasion). In another example, the preference information may include location preference. The place preference may be inferred, for example, through a visit history (e.g., a visit history for each time) of a specific place. The location preference may be used to determine a visited location according to the user's current state (e.g., time). In another example, the preference information may include command preference. The command preference may be inferred through, for example, a command usage frequency (e.g., a frequency of use for each time and place). The command preference may be used to determine a command pattern to be used according to the user's current state (e.g., time and location). In particular, the command preference may include information about menus most frequently selected by the user in the current state of the app that is executed by analyzing the log information.

Figure 32:
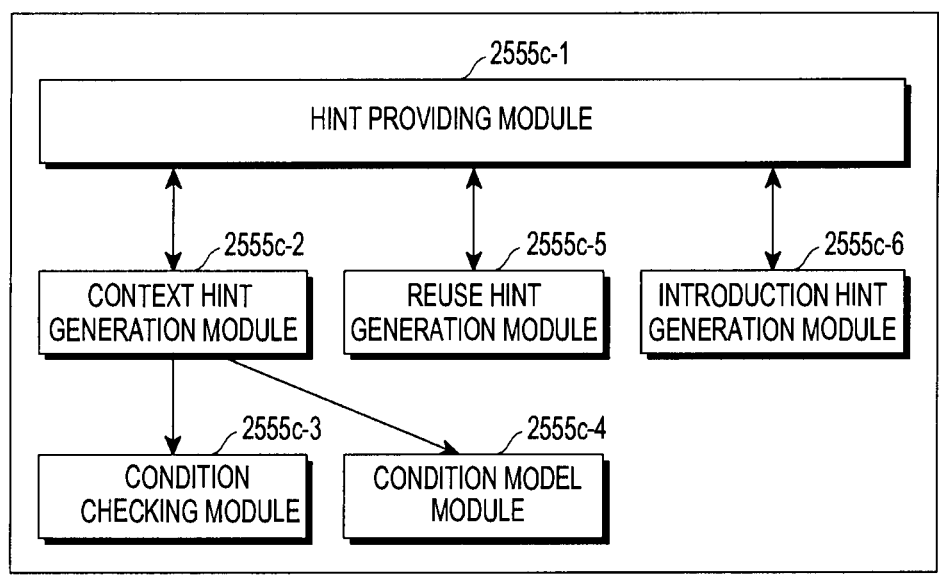
FIG. 32 is a block diagram illustrating a suggestion module according to an embodiment of the present disclosure.

FIG. 32 is a block diagram illustrating a suggestion module according to an embodiment of the present disclosure.

Referring to FIG. 32, the suggesting module 2555c may include a hint providing module 2555c_1, a context hint generating module 2555c_2, a condition checking module 2555c_3, a condition model module 2555c_4, a reuse hint generating module 2555c_5, or an introduction hint generating module 2555c_6.

According to an embodiment, the hint providing module 2555c_1 may provide a hint to the user. For example, the hint providing module 2555c_1 may receive a hint generated from the context hint generating module 2555c_2, the reuse hint generating module 2555c_5, or the introduction hint generating module 2555c_6 to provide the generated hint to the user.

According to an embodiment, the context hint generation module 2555c_2 may generate a hint that can be recommended according to the current state through the condition checking module 2555c_3 or the condition model module 2555c_4. The condition checking module 2555c_3 may receive information corresponding to the current state via the intelligent service module 2555, and the condition model module 2555c_4 may set a condition model using the received information. For example, the condition model module 2555c_4 may determine the time, location, occasion, and application in use at the time of providing the hint to the user, and may provide hints that are highly likely to be used under the corresponding condition to the user in descending order of priority.

According to an embodiment, the reuse hint generation module 2555c_5 may generate a hint that can be recommended in consideration of the frequency of use according to the current state. For example, the reuse hint generation module 2555c_5 may generate a hint in consideration of the usage pattern of the user.

According to an embodiment, the introduction hint generation module 2555c_6 may generate a hint to introduce a new function or a function frequently used by another user to the user. For example, the hint to introduce the new function may include an introduction to the intelligent agent 2551 (e.g., an operation method).

According to another embodiment, the context hint generation module 2555c_2, the condition checking module 2555c_3, the condition model module 2555c_4, the reuse hint generation module 2555c_5, or the introduction hint generation module 2555c_6 of the suggestion module 2555c may be included in the personalization information server 2700. For example, the hint providing module 2555c_1 of the suggesting module 2555c may receive the hint from the context hint generating module 2555c_2, the reuse hint generating module 2555c_5, or the introduction hint generating module 2555c_6 of the user personalization information server 2700, and may provide the received hint to the user.

According to an embodiment, the user terminal 2500 may provide the hint according to the following sequence of processes. For example, when receiving ☐ a hint providing request from the intelligent agent 2551, the hint providing module 2555c_1 may transmit ☐ the hint generating request to the context hint generating module 2555c_2. When receiving the hint generation request, the context hint generation module 2555c_2 may use ☐ the condition checking module 2555c_3 to receive ☐ information corresponding to the current state from the context module 2555a and the persona module 2555b. The condition checking module 2555c_3 may transmit ⑤ the received information to the condition model module 2555c_4, and the condition model module 2555c_4 may assign priorities to the hints in descending order of usability under the condition among the hints provided to the user using the information. The context hint generation module 2555c_2 may confirm ⑥ the condition and may generate the hint corresponding to the current state. The context hint generation module 2555c_2 may transmit ⑦ the generated hint to the hint providing module 2555c_1. The hint providing module 2555c_1 may array the hints according to a designated rule and may transmit ⑧ the hint to the intelligent agent 2551.

According to an embodiment, the hint providing module 2555c_1 may generate a plurality of context hints and may assign priorities to the plurality of context hints according to the designated rule. According to an embodiment, the hint providing module 2555c_1 may first provide, to the user, the context hint with a higher priority among the plurality of context hints.

According to an embodiment, the user terminal 2500 may suggest a hint according to the frequency of use. For example, when receiving ① the hint providing request from the intelligent agent 2551, the hint providing module 2555c_1 may transmit ☐ the hint generation request to the reuse hint generating module 2555c_5. When receiving the hint generation request, the reuse hint creation module 2555c_5 may receive ☐ the user information from the persona module 2555b. For example, the reuse hint generation module 2555c_5 may receive the path rule included in the user's preference information of the persona module 2555b, the parameter included in the path rule, the execution frequency of the app, and time and space information in which the app is used. The reuse hint generation module 2555c_5 may generate the hint corresponding to the received user information. The reuse hint generation module 2555c_5 may transmit ☐ the generated hint to the hint providing module 2555c_1. The hint providing module 2555c_1 may array the hints and may transmit ☐ the hints to the intelligent agent 2551.

According to an embodiment, the user terminal 2500 may suggest a hint for a new function. For example, when receiving ① a hint providing request from the intelligent agent 2551, the hint providing module 2555c_1 may transmit ② the hint providing request to the introduction hint generating module 2555c_6. The introduction hint generation module 2555c_6 may transmit ③ an introduction hint providing request to the suggestion server 2800 to receive ④ information about a function to be introduced from the suggestion server 2800. For example, the suggestion server 2800 may store the information about the function to be introduced, and a hint list for the function to be introduced may be updated by a service operator. The introduction hint generation module 2555c_6 may transmit ⑤ the generated hint to the hint providing module 2555c_1. The hint providing module 2555c_1 may array the hints and may transmit ⑥ the arrayed hints to the intelligent agent 2551.

Accordingly, the suggestion module 2555c may provide, to the user, the hint generated in the context hint generation module 2555c_2, the reuse hint generation module 2555c_5, or the introduction hint generation module 2555c_6. For example, the suggestion module 2555c may display the generated hint in an app that operates the intelligent agent 2551, and may receive an input to select the hint from the user through the app.

Figure 33:
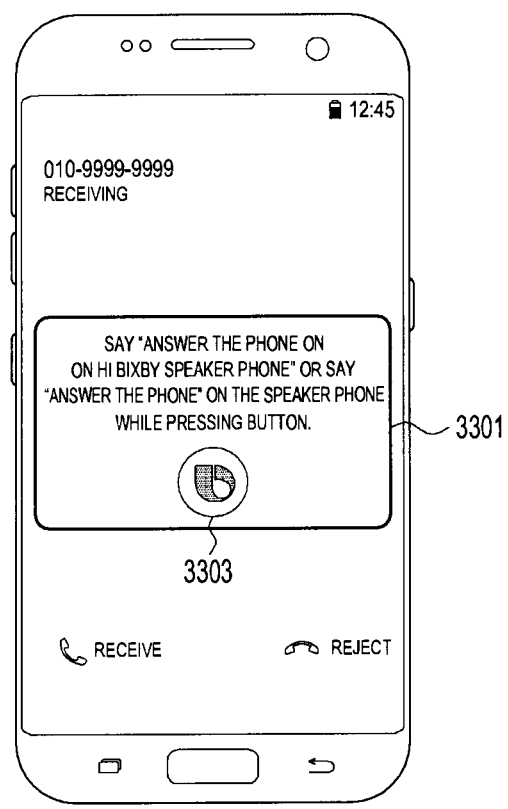
FIG. 33 is a diagram illustrating an example in which an electronic device according to an embodiment of the present disclosure provides a hint.

FIG. 33 is a diagram illustrating an example in which an electronic device according to an embodiment of the present disclosure provides a hint.

Referring to FIG. 33, when receiving an incoming call, the electronic device may provide a hint corresponding to the reception of the incoming call according to the above-described embodiment. For example, the hint may be displayed on a screen of the electronic device as a pop-up window 3301 including information to guide a user input such as saying "Answer the phone on Hi Bixby speaker phone" or saying "Answer the phone" on the speaker phone while pressing button. For example, when the user says "Answer the phone on Hi Bixby speaker phone" or says "Answer the phone" while touching a button 3303, a speakerphone function of the electronic device may be executed.

Figure 34:
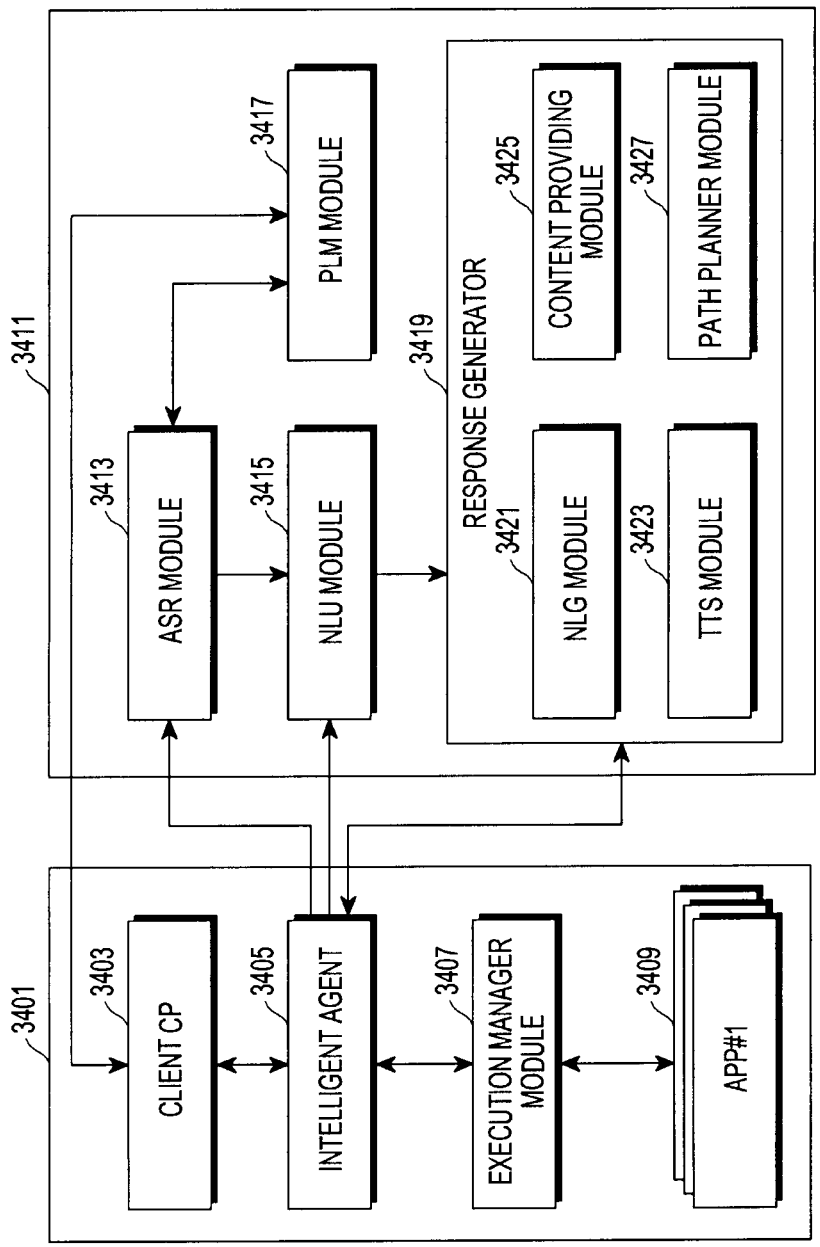
FIG. 34 is a diagram illustrating a system for executing the function of an electronic device according to various embodiments.

FIG. 34 is a diagram illustrating a system for executing the function of an electronic device (e.g., the user terminal 2500) according to various embodiments.

Referring to FIG. 34, when receiving an utterance input or text input of a user, the electronic device 3401 may transmit a corresponding voice or text to a server 3411 (e.g., the intelligent server 2600) via an intelligent agent 3405 (e.g., the intelligent agent 2551).

According to an embodiment, when receiving the voice from the electronic device 3401, an ASR module 3413 (e.g., the ASR module 2610) of the server 3411 may convert the received voice into text data, and an NLU module 3415 (e.g., the NLU module 2620) may determine how to process the converted text data. For example, the NLU module 3415 may ascertain a user's intention by performing syntactic analysis or semantic analysis according to the content of the text data. For example, the NLU module 3415 may determine the user's intention and the parameter using a matching rule divided into the domain, intention, and the parameter (or slot) utilized for ascertaining the intention. A response generator 3419 may generate a response corresponding to the voice received from the electronic device 3401 based on the analysis result of the NLU module 3415, and may transmit the generated response to the intelligent agent 3405 of the electronic device 3401. For example, a content providing module 3425 of the response generator 3419 may generate a result obtained by performing a task corresponding to the user input based on the intention and the parameter ascertained by the NLU module 3415. For example, a path planner module 3427 (e.g., the path planner module 2630) of the response generator 3419 may generate the path rule corresponding to the user input based on the intention and the parameter ascertained by the NLU module 3415.

According to an embodiment, when receiving the text data from the electronic device 3401, the NLU module 3415 of the server 3411 may determine how to process the text data. For example, the NLU module 3415 may determine the user's intent and the parameter using the matching rule divided into the domain, the intention, and the parameter (or slot) utilized for ascertaining the intention. The response generator 3419 may generate a response corresponding to the text data received from the electronic device 3401 based on the analysis result of the NLU module 3415, and may transmit the generated response to the intelligent agent 3405 of the electronic device 3401. For example, the content providing module 3425 of the response generator 3419 may generate the result obtained by performing the task corresponding to the user input based on the intention and the parameter ascertained by the NLU module 3415. For example, the path planner module 3427 of the response generator 3419 may generate the path rule corresponding to the user input based on the intention and the parameter ascertained by the NLU module 3415.

The intelligent agent 3405 may transmit the response received from the response generator 3419 to an execution manager module 3407 (e.g., the execution manager module 2553) to perform a function (also referred to as task) corresponding to an utterance based on the received response. For example, the execution manager module 3407 may sequentially perform operations corresponding to the utterance in an application 3409 (referred to as app, e.g., the first app 2541 or the second app 2543) based on the received response. When the operations are completely performed, the intelligent agent 3405 may transmit and generate an operation completion message to an NLG module 3421 (e.g., the NLG module 2650). The NLG module 3421 may generate feedback suitable for an occasion and may transmit the generated feedback to a TTS module 3423 (e.g., the TTS module 2660). Next, the TTS module 3423 may transmit voice data for the received feedback to the intelligent agent 3405. The electronic device 3401 may provide the voice data for the feedback received from the TTS module 3423, to the user in the form of voice and/or text.

According to an embodiment, the electronic device 3401 may include a client content provider 3403 (hereinafter referred to as a client CP). The client CP 3403 may exist as a separate module in the electronic device 3401, and may be included in the intelligent agent 3405. The client CP 3403 may include a database for storing data associated with the macro generated by the user, and may be synchronized in real time with a personal language model (PLM) module 3417 in the server 3411.

For example, the macro may be a command shortcut that is mapped to a representative dialog for executing any one function of the electronic device to execute the function.

For example, the database included in the client CP 3403 may store at least one command shortcut and at least one representative dialog mapped to the command shortcut. For example, the database may store the at least one command shortcut and the at least one representative dialog mapped to the command shortcut, in the form of a table. For example, the command shortcut may be a command preset by a user, and may be stored as text data. For example, the representative dialog may correspond to the path rule including information of the sequence of the states of the electronic device for performing any one function (referred to as task) of the electronic device. The representative dialog may be a natural language for executing any one function of the electronic device, and may be stored as text data. The representative dialog may correspond to the hint described above, and may be text data indicating a voice to be input by the user so that the operation of the electronic device can be executed through a voice input. In addition, the representative dialog may include terms related to the corresponding function, and the parameters included in the representative dialog may be changed.

For example, the PLM module 3417 (e.g., the ASR DB 2611) may store personalized utterance information of the user and/or the electronic device 3401, and the PLM module 3417 and the command shortcut may be synchronized in real time with the client CP 3403 at the time of registration, modification, and deletion of the macro of the command shortcut by the user. For example, the command shortcut synchronized in real time with the client CP 3403 of the PLM module 3417 may support to improve the performance when the ASR module 3413 is operated.

Figure 35:
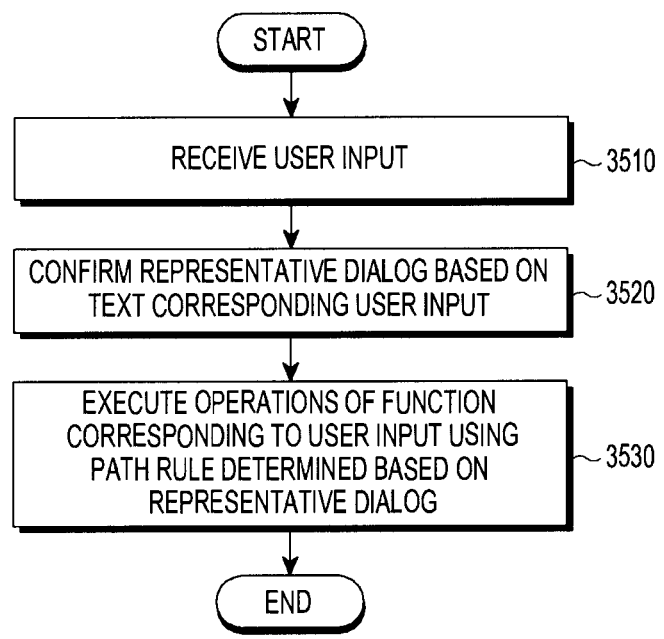
FIG. 35 is a flowchart illustrating the operation of an electronic device for executing the function of the electronic device according to various embodiments.

FIG. 35 is a flowchart illustrating the operation of an electronic device (e.g., the user terminal 2500) for executing the function of the electronic device according to various embodiments. Referring to FIG. 35, the electronic device may control the function execution of the electronic device based on the macro generated by the user.

In operation 3510, the electronic device (e.g., the processor 2550 of FIG. 26) may receive a user input.

According to an embodiment, the user input may be a voice input and/or a text input using a microphone, a touch on a touch screen, a user manipulation on buttons (or keys), and/or a remote controller. For example, the user input may be a command shortcut that is set as a macro so as to execute any one function of the electronic device, or a representative dialog that is set so as to execute any one function of the electronic device. The function may include at least one unit operation.

According to an embodiment, the electronic device may provide a hint through the touch screen and/or the speaker so that the user can precisely select the function to be performed by the electronic device. For example, the hint may be that the representative dialog is provided in the form of text and/or voice to execute a specific function of the electronic device. For example, in order to execute the specific function of the electronic device, the user may perform a user input, such as uttering the hint that is the representative utterance, touching the hint, inputting text corresponding to the hint, etc., based on the hint.

For example, the hint may be prepared to predict the user's intention and perform the user command more smoothly. The hint can be used to recommend a user-customized command in consideration of the current state of the user among all the commands that the user can perform. The current state of the user may include time, place, and/or occasion information (TPO), and may include the type of an application currently executed in the electronic device.

For example, the hint may be an introduce hint with a purpose to introduce a new function, a context information hint considering user's TPO, or a reuse hint for suggesting a function frequently used by the user.

In operation of the electronic device for generating the hint has been described in detail in the above-described embodiments and thus further description thereof will be omitted.

In operation 3520, the electronic device (e.g., the processor 2550 of FIG. 26) may confirm the representative dialog based on the text corresponding to the user input.

According to an embodiment, when the user input is the voice input, the electronic device may transmit the voice input to the server, and the server that has received the voice input may convert the voice input into text data using an automatic speech recognition (ARS) technique and then transmit the converted text data to the electronic device. The electronic device may select the representative dialog that is mapped to the converted text data in the database.

According to an embodiment, when the user input is the text input, the electronic device may select the representative dialog that is mapped to the text data input in the database.

According to an embodiment, the database may be in the electronic device, and the database may store at least one command shortcut and at least one representative dialog which is mapped to the command shortcut. For example, the database may be included in a client CP (e.g., client CP 3403). The database may store the at least one command shortcut and the at least one representative dialog that is mapped to the command shortcut, in the form of a table. The command shortcut may be a command preset by a user, and may be stored as text data. The representative dialog may be a natural language for executing a specific function of the electronic device, and may be stored as text data. In addition, the representative dialog may include terms related to the function.

In operation 3530, the electronic device (e.g., the processor 2550 of FIG. 26) may execute operations of the function corresponding to the user input using the path rule determined based on the representative dialog.

According to an embodiment, the electronic device may transmit the representative dialog to a server (e.g., the intelligent server 2600). The server may determine the path rule for executing the function corresponding to the representative dialog using the representative dialog, and may transmit the determined path rule to the electronic device. For example, the path rule may be that the electronic device divides the function of the application into unit operations. For example, the server may confirm a preset path rule corresponding to the representative dialog. By way of another example, the server may generate the path rule corresponding to the representative dialog, including an NLU module (e.g., the NLU module 2620) and a path planner module (e.g., the path planner module 2630). Since the detailed operation for generating (extracting) the path rule has been described in the above embodiments, detailed description thereof is omitted.

The electronic device may execute the operations corresponding to the path rule based on the path rule.

Figure 36:
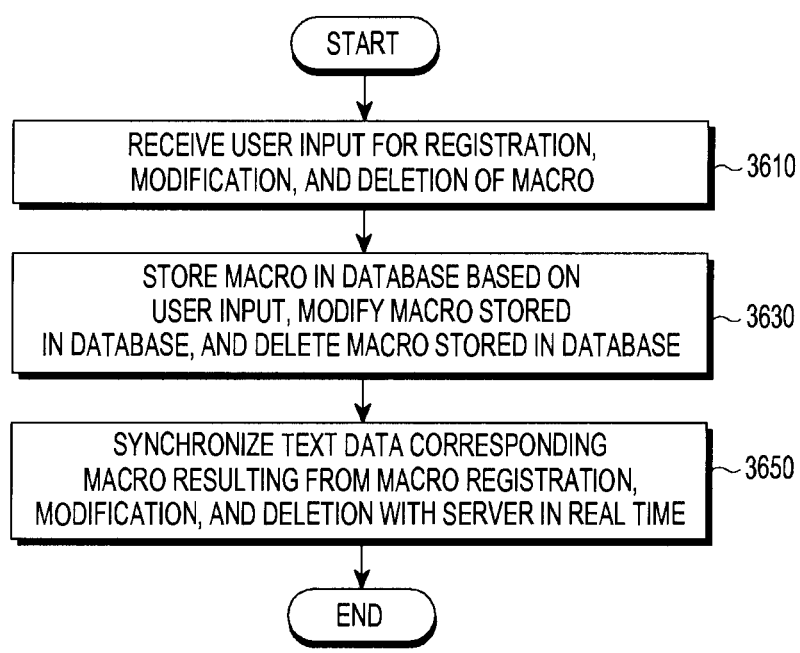
FIG. 36 is a flowchart illustrating a macro setting operation for executing the function of an electronic device according to various embodiments.

FIG. 36 is a flowchart illustrating a macro setting operation for executing the function of an electronic device (e.g., the user terminal 2500) according to various embodiments.

According to an embodiment, a user of the electronic device may utter the entire dialog corresponding to the hint so that the electronic device performs the function corresponding to the hint. However, referring to FIG. 36, by performing an utterance input of some words or sentences designated to correspond to the dialog or performing a touch input, the electronic device may execute the function corresponding to the hint. For example, the electronic device may provide a macro function capable of changing the hint (hereinafter, also referred to as a representative dialog) corresponding to the path rule for executing any one function of the electronic device into a short sentence designated by the user. For example, the electronic device may set some words or sentences as the macro that executes any one function of the electronic device. For example, the electronic device may set some words or sentences to be matched to the representative dialog set to execute any one function of the electronic device.

In operation 3610, the electronic device (e.g., the processor 2550 of FIG. 26) may receive the user input for macro registration, modification, or deletion.

According to an embodiment, the user input may be received in one of a diverse number of formats, such as a voice input using a microphone, a touch input on a touch screen, a user manipulation on buttons (or keys), and/or an input using a remote controller.

In operation 3630, the electronic device (e.g., the processor 2550 of FIG. 26) may store the macro in the database, modify the macro stored in the database, or delete the macro stored in the database, based on the user input.

According to an embodiment, when receiving the user input for the registration of the macro, the electronic device may store a command shortcut desired by the user and a representative dialog set to performing the corresponding function in the database. For example, the electronic device may extract the representative dialog associated with the function performed by the electronic device, and may match the representative dialog to the command shortcut to store the mapped information in the database together with the command shortcut. The command shortcut may be set according to the user input, and may be stored in the form of voice data or text data. The representative dialog may be the content of the hint in the above-described embodiments or the content of the hint mapped with the path rule including information of the sequence of the states of the electronic device.

According to an embodiment, the electronic device may enable the command shortcut to be modified or deleted. For example, the electronic device may receive the user input, and may modify the command shortcut to modify the macro or delete the command shortcut to delete the macro.

According to an embodiment, the electronic device may generate a command shortcut for a function that the user frequently uses, and may store the generated command shortcut in the database.

According to an embodiment, the database may be included in the electronic device.

In operation 3650, the electronic device (e.g., the processor 2550 of FIG. 26) may synchronize text data (i.e., text data corresponding to the macro resulting from registration, modification, or deletion of the macro) with the server (e.g., the intelligent server 2600 or the ASR DB 2611 of the intelligent server) in real time.

According to an embodiment, the electronic device may cause the command shortcut stored in the database of the electronic device to be synchronized in real time with the server that communicates with the electronic device, so that the recognition performance of the server may be improved when the user utters the corresponding command shortcut or performs a touch input.

Figure 37A:
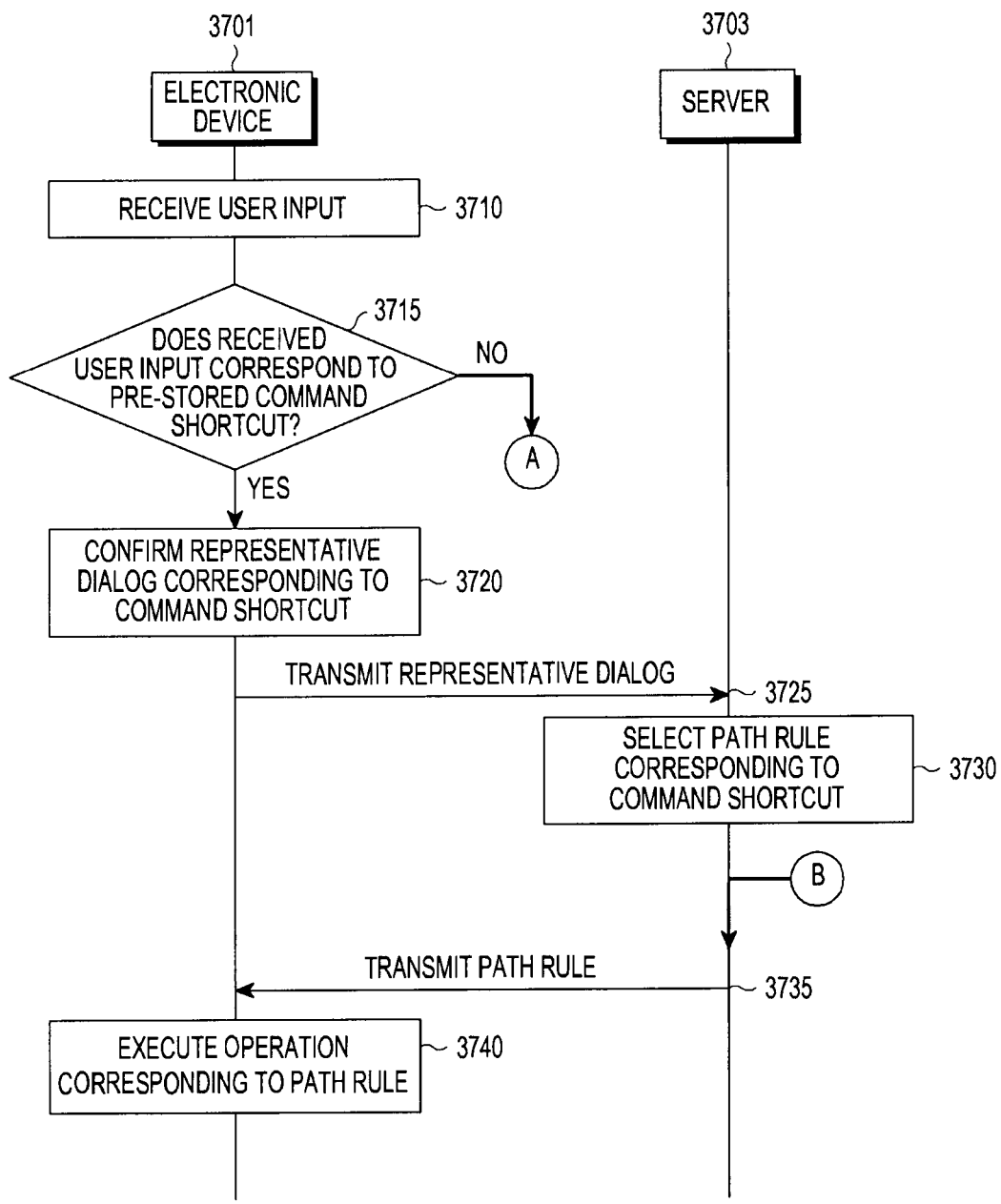
FIG. 37A and FIG. 37B are flowcharts illustrating an operation of executing the function of an electronic device according to various embodiments.
Figure 37B:
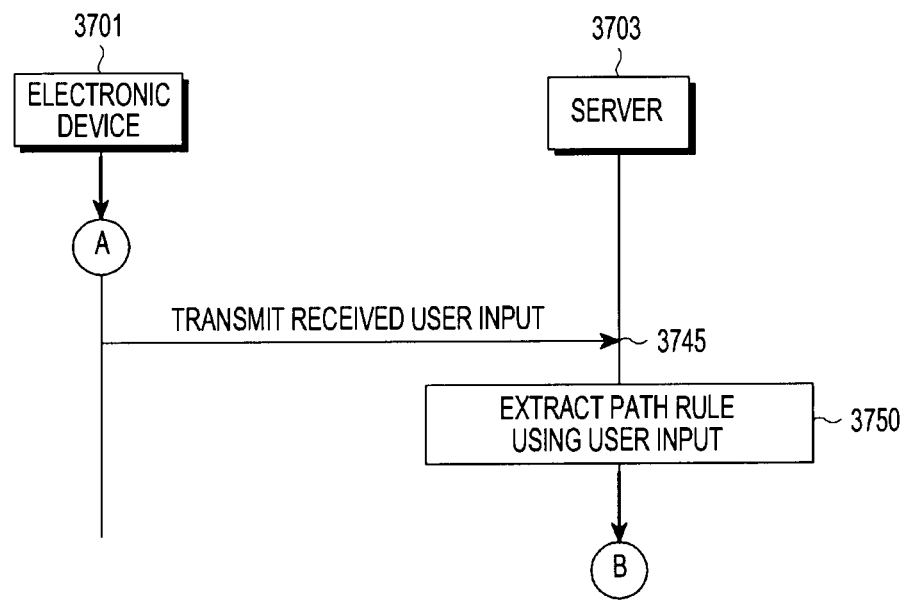

FIGS. 37A and 37B are flowcharts illustrating an operation of executing the function of an electronic device (e.g., the user terminal 2500) according to various embodiments.

Referring to FIGS. 37A and 37B, the electronic device may store a representative dialog set to perform any one function of the electronic device and a command shortcut mapped with the representative dialog. The representative dialog may correspond to a path rule including information of a sequence of states of the electronic device. When receiving the user input, the electronic device may confirm whether the user input is a command shortcut set as a macro, and may perform a function corresponding to the command shortcut through communication with the server.

In operation 3710, the electronic device 3701 (e.g., the processor 2550 of FIG. 26) may receive the user input.

According to an embodiment, the user input may be a voice input and/or a text input using a microphone, a touch on a touch screen, a user manipulation on buttons (or keys), and/or a remote controller.

In operation 3715, the electronic device 3701 (e.g., the processor 2550 of FIG. 26) may determine whether the received user input corresponds to a pre-stored command shortcut. When it is determined that the received user input corresponds to the pre-stored command shortcut in operation 3715, the electronic device 3701 may execute an operation 3720, and otherwise, the electronic device 3701 may execute an operation 3745.

According to an embodiment, the electronic device may confirm whether the user input is the command shortcut in which the user input is set as a macro. The command shortcut may be stored in the database of the electronic device according to the user in advance. For example, the command shortcut may be mapped with the representative dialog requesting to perform any one function (task) of the electronic device, and may be stored in advance in the database together with the representative dialog. For example, the representative dialog may be mapped to the path rule including the information of the sequence of the states of the electronic device for performing a function. For example, when the user input is the voice input, it may be confirmed whether the text data corresponding to the voice input corresponds to the pre-stored command shortcut. For example, when the user input is the text input, it may be confirmed whether the text input corresponds to the pre-stored command shortcut.

In operation 3720, the electronic device 3701 (e.g., the processor 2550 of FIG. 26) may confirm the representative dialog corresponding to the command shortcut.

According to an embodiment, in a case in which "Music cue" is preset and stored as the command shortcut that is mapped with "Play real time popular chart in music player" that is a representative dialog of the electronic device that executes the real time popular chart in the music player, when receiving "Music cue" via the text or voice input of the user, the electronic device may determine that the received user input corresponds to the pre-stored command shortcut, and may confirm "Play real time popular chart in music player" that is the representative dialog corresponding to "Music cue".

In operation 3725, the electronic device 3701 (e.g., the processor 2550 of FIG. 26) may transmit the representative dialog to the server 3703 (e.g., the intelligent server 2600).

According to an embodiment, the electronic device 3701 may transmit the representative dialog to the server 3703 using a wireless communication circuit.

In operation 3730, the server 3703 (e.g., the intelligent server 2600) may extract the path rule corresponding to the representative dialog.

According to an embodiment, the server 3703 may confirm the pre-set path rule corresponding to the representative dialog.

According to another embodiment, the server 3703 may include the NLU module (e.g., the NLU module 2620) and the path planner module (e.g., the path planner module 2630) to generate the path rule corresponding to the representative dialog. Since the detailed operation of generating (extracting) the path rule has been described in the above-described embodiments, a detailed description thereof will be omitted.

In operation 3735, the server 3703 (e.g., the intelligent server 2600) may transmit the extracted path rule to the electronic device 3701.

According to an embodiment, the server 3703 may transmit the path rule to the electronic device 3701 using the wireless communication circuit.

In operation 3740, the electronic device 3701 (e.g., the processor 2550 of FIG. 26) may execute an operation corresponding to the path rule.

According to an embodiment, the electronic device 3701 may include an execution manager module (e.g., the execution manager module 2553) to perform the operation corresponding to the path rule.

In operation 3745, the electronic device 3701 (e.g., the processor 2550 of FIG. 26) may transmit the user input to the server 3703 (e.g., the intelligent server 2600).

According to an embodiment, the electronic device 3701 may transmit the user input to the server 3703 using the wireless communication circuit.

According to an embodiment, in a case in which "Music cue" is preset and stored as the command shortcut that is mapped with "Play real time popular chart in music player" that is the representative dialog of the electronic device that executes the real time popular chart in the music player, when receiving "Play real time popular chart in music player" via the text or voice input of the user, the electronic device may determine that the received user input does not correspond to the pre-stored command shortcut, and may transmit the text or voice input to the server.

In operation 3750, the server 3703 (e.g., the intelligent server 2600) may extract the path rule using the user input.

According to an embodiment, the user input may correspond to the representative dialog, and the server 3703 may confirm the preset path rule corresponding to the representative dialog.

According to another embodiment, the server 3703 may include the NLU module (e.g., the NLU module 2620) and the path planner module (e.g., the path planner module 2630) to generate the path rule corresponding to the user input. Since the detailed operation for generating (extracting) the path rule has been described in the above-described embodiments, a detailed description thereof will be omitted.

After operation 3750, the server 3703 (e.g., the intelligent server 2600) may execute operation 3735 described above.

Figure 38:
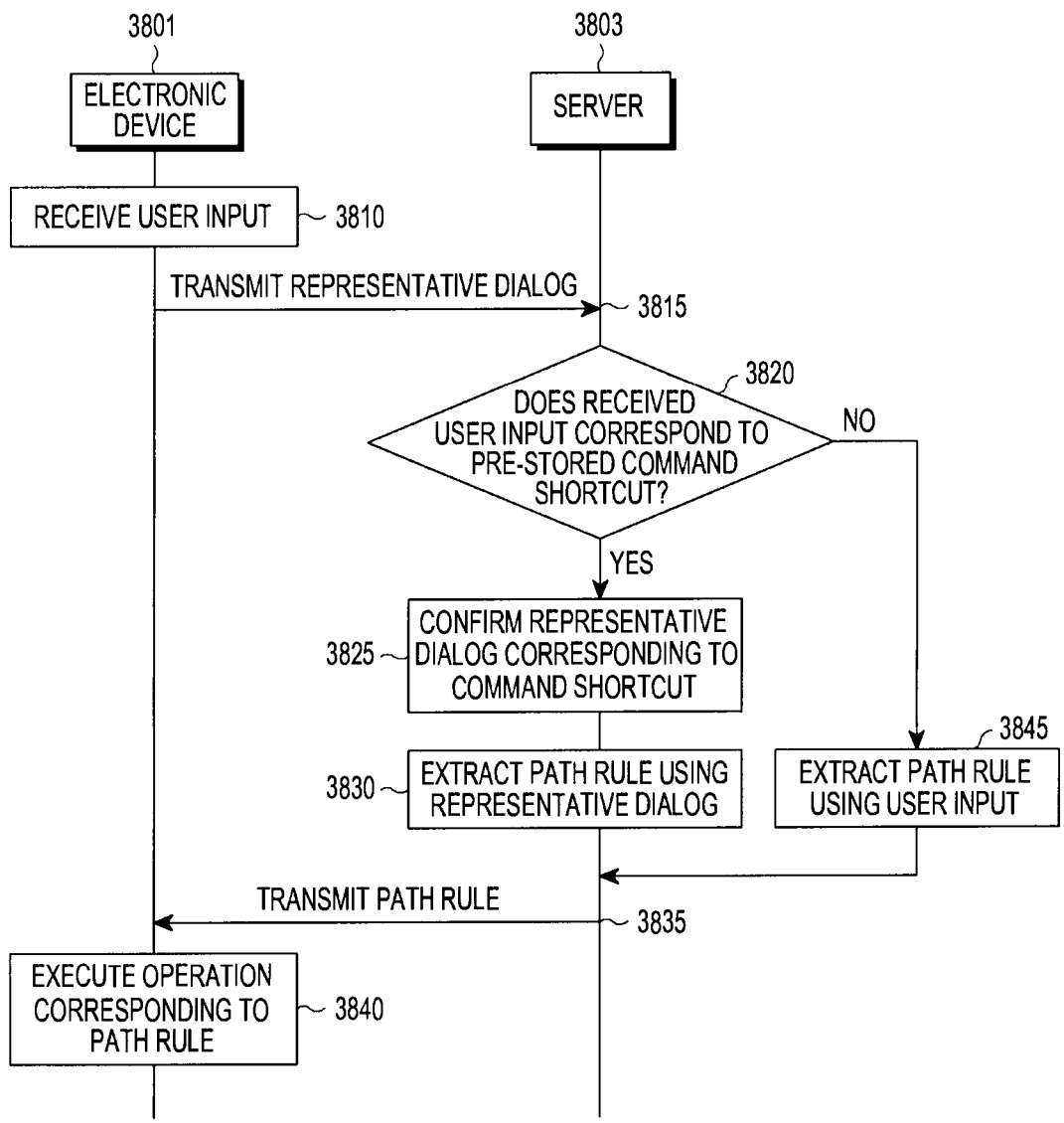
FIG. 38 is a flowchart illustrating an operation of executing the function of an electronic device according to various embodiments.

FIG. 38 is a flowchart illustrating an operation of executing the function of an electronic device (e.g., the user terminal 2500) according to various embodiments.

Referring to FIG. 38, a server may store a representative dialog set to perform any one function of the electronic device and a command shortcut mapped to the representative dialog, and the representative dialog may correspond to a path rule including information of a sequence of states of the electronic device. The server that has received the user input from the electronic device may confirm whether the user input is a command shortcut set as a macro, and may transmit the path rule corresponding to the command shortcut to the electronic device.

In operation 3810, an electronic device 3801 (e.g., the processor 2550 of FIG. 26) may receive the user input.

According to an embodiment, the user input may be a voice input and/or a text input using a microphone, a touch on a touch screen, a user manipulation on buttons (or keys), and/or a remote controller.

In operation 3815, the electronic device 3701 (e.g., the processor 2550 of FIG. 26) may transmit the user input to the server 3803 (e.g., the intelligent server 2600).

According to an embodiment, the electronic device 3801 may transmit the user input to the server 3803 using a wireless communication circuit.

In operation 3820, the server 3803 (e.g., intelligent server 2600) may determine whether the user input corresponds to a pre-stored command shortcut.

According to an embodiment, the server may confirm a database that stores at least one command shortcut having a macro function and at least one representative dialog mapped to the command shortcut to determine whether the user input is the command shortcut stored for performing the macro function.

When it is determined that the user input corresponds to the pre-stored command shortcut, the server 3803 (e.g., intelligent server 2600) may execute operation 3825, and otherwise, the server 3803 may execute operation 3845.

In operation 3825, the server 3803 (e.g., the intelligent server 2600) may confirm the representative dialog corresponding to the command shortcut.

According to an embodiment, in a case in which "Music cue" is a preset stored command shortcut that is mapped with a representative dialog such as "Play real time popular chart in music player," which can be used to execute the real time popular chart in the music player, when the user input is "Music cue", the server 3803 may determine that the user input corresponds to the pre-stored command shortcut, and may confirm "Play real time popular chart in music player" that is the representative dialog corresponding to "Music cue".

In operation 3830, the server 3803 (e.g., the intelligent server 2600) may extract the path rule using the representative dialog.

According to an embodiment, the server 3803 may confirm a pre-set path rule corresponding to the representative dialog.

According to another embodiment, the server 3803 may include an NLU module (e.g., the NLU module 2620) and a path planner module (e.g., the path planner module 2630) to generate the path rule corresponding to the representative dialog. Since the detailed operation of generating (extracting) the path rule has been described in the above-described embodiments, a detailed description thereof will be omitted.

In operation 3835, the server 3803 (e.g., the intelligent server 2600) may transmit the path rule to the electronic device 3801 (e.g., the processor 2550 of FIG. 26).

According to an embodiment, the server 3803 may transmit the path rule to the electronic device 3801 using a wireless communication circuit.

In operation 3840, the electronic device 3801 (e.g., the processor 2550 of FIG. 26) may perform an operation corresponding to the path rule.

According to an embodiment, the electronic device 3801 may include an execution manager module (e.g., execution manager module 2553) to perform the operation corresponding to the path rule.

In operation 3845, the server 3803 (e.g., the intelligent server 2600) may extract the path rule using the user input.

According to an embodiment, the user input may correspond to the representative dialog, and the server 3803 may check the pre-set path rule corresponding to the representative dialog.

According to another embodiment, the server 3803 may include the NLU module (e.g., the NLU module 2620) and the path planner module (e.g., the path planner module 2630) to generate the path rule corresponding to the user input. Since the detailed operation of generating (extracting) the path rule has been described in the above-described embodiments, a detailed description thereof will omitted.

After operation 3845, the server 3803 (e.g., the intelligent server 2600) may execute operation 3835 described above.

Figure 39:
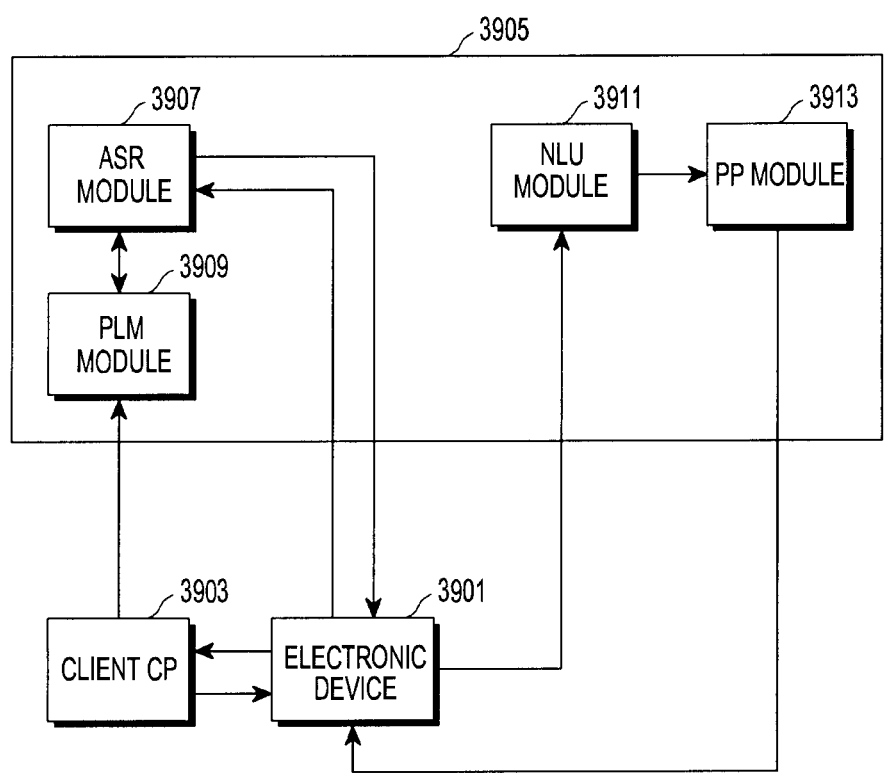
FIG. 39 is a diagram illustrating a system for executing the function of an electronic device according to various embodiments.

FIG. 39 is a diagram illustrating a system for executing the function of an electronic device according to various embodiments.

Referring to FIG. 39, depending on the user input, an electronic device 3901 (e.g., the user terminal 2500) may register, modify, or delete macros to execute any one function of the electronic device in a client CP 3903 using a simple command shortcut. For example, the client CP 3903 may include a database, and the electronic device may register, modify, or delete the macros in the database. The client CP 3903 and a server 3905 (e.g., the intelligent server 2600) may be synchronized in real time, and when the macro is registered, modified, or deleted in the client CP 3903, a command shortcut having a macro function may be synchronized with a PLM module 3909 of the server 3905. For example, when an ASR module 3907 (e.g., the ASR module 2610) of the server 3905 converts received utterance contents into text data, the PLM module 3909 may improve the operation performance of the ASR module 3907 by providing the command shortcut. When the command shortcut designated as the macro by the user is input via voice, the electronic device 3901 may communicate with the ASR module 3907 of the server 3905 in real time to confirm the utterance contents performed by the user as text data. For example, the electronic device 3901 may communicate with the ASR module 3907 of the server 3905 in real time, and the ASR module 3907 may convert the received utterance contents into text data in real time to thereby transmit the text data to the electronic device 3901. The electronic device 3901 may check the database included in the client CP 3903 to confirm the command shortcut corresponding to the text data in the database, and may confirm the representative dialog mapped to the command shortcut. The client CP 3903 may transmit the representative dialog to an NLU module 3911 (e.g., the NLU module 2620) of the server 3905 via the electronic device 3901, and the NLU module 3911 may determine how to process the representative dialog. For example, the NLU module 3911 may perform syntactic analysis or semantic analysis to ascertain a user's intention according to the content of the text data. For example, the NLU module 3911 may determine the user's intention and the parameter using a matching rule divided into domain, intention, and parameter (or slot) utilized for ascertaining the intention. A path planner module 3913 (also referred to as PP module) (e.g., the path planner module 2630) of the server 3905 may generate the path rule corresponding to the user input based on the intention and parameter ascertained by the NLU module 3911.

According to the above-described embodiment of FIG. 39, although the client CP 3903 has been described as a separate configuration from the electronic device 3901, according to another embodiment, the client CP 3903 may be included in the electronic device 3901 and may perform the above-described operation.

According to the above-described embodiment of FIG. 39, it has been described that the server 3905 includes the ASR module 3907 and the PLM module 3909.

However, according to another embodiment, although not shown, the electronic device 3901 includes the ASR module 3907 and the PLM module 3909 so that the operations of the ASR module 3907 and the PLM module 3909 can be executed in the electronic device 3091. According to still another embodiment, although not shown, the electronic device 3901 may include all of the ASR module 3907, the PLM module 3909, the NLU module 3911, and the PP module 3913 so that the operations of the ASR module 3907, the PLM module 3909, the NLU module 3911, and the PP module 3913 can be executed in the electronic device 3091.

Figure 40:
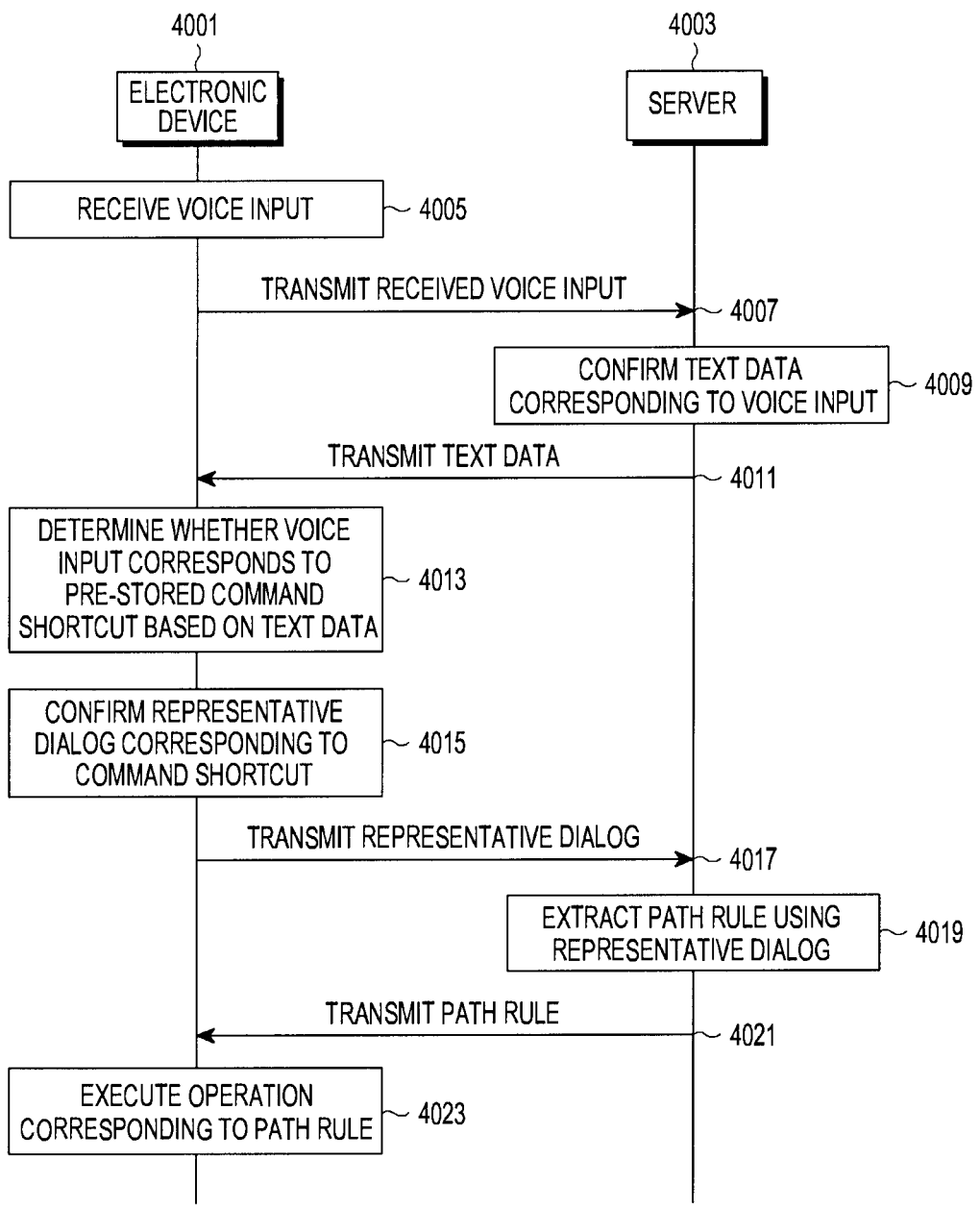
FIG. 40 is a flowchart illustrating an operation of executing the function of an electronic device according to various embodiments.

FIG. 40 is a flowchart illustrating an operation of executing the function of an electronic device (e.g., the user terminal 2500) according to various embodiments.

Referring to FIG. 40, the electronic device may store a representative dialog set to perform any one function of the electronic device and a command shortcut mapped to the representative dialog, and the representative dialog may correspond to a path rule including information of a sequence of states of the electronic device. When receiving a voice input corresponding to the command shortcut from a user, the electronic device may execute a function corresponding to the command shortcut via communication with the server.

In operation 4005, an electronic device 4001 (e.g., the processor 2550 of FIG. 26) may receive the voice input from the user.

According to an embodiment, the electronic device may receive the voice input from the user via a microphone.

In operation 4007, the electronic device 4001 (e.g., processor 2550 of FIG. 26) may transmit the received voice input to a server 4003 (e.g., the intelligent server 2600).

According to an embodiment, the electronic device 4001 may transmit the voice input to the server 4003 via a wireless communication circuit.

In operation 4009, a server 4003 (e.g., intelligent server 2600) may confirm text data corresponding to the voice input.

According to an embodiment, the server 4003 may convert the voice input into the text data using an automatic speech recognition (ASR) technique. For example, the server 4003 may include an ASR module (e.g., the ASR module 2610) to convert the voice input to text data.

In operation 4011, the server 4003 (e.g., the intelligent server 2600) may transmit the text data to the electronic device 4001 (e.g., the processor 2550 of FIG. 26).

According to an embodiment, the server 4003 may transmit the text data to the electronic device 4001 via a wireless communication circuit.

In operation 4013, the electronic device 4001 (e.g., the processor 2550 of FIG. 26) may determine whether the voice input corresponds to a pre-stored command shortcut based on the text data.

According to an embodiment, the electronic device 4001 may confirm whether the text data is the command shortcut set as a macro. The command shortcut may be stored in the database of the electronic device in advance. For example, the command shortcut may be mapped with the representative dialog requesting to perform any one function (task) of the electronic device, and may be stored in advance in the database together with the representative dialog. For example, the representative dialog may be mapped to the path rule including the information of the sequence of the states of the electronic device for performing a function.

According to an embodiment, when the voice input corresponds to the pre-stored command shortcut, the electronic device 4001 (e.g., the processor 2550 of FIG. 26) may confirm the representative dialog corresponding to the command shortcut in operation 4015.

In operation 4017, the electronic device 4001 (e.g., the processor 2550 of FIG. 26) may transmit the confirmed representative dialog to the server 4003 (e.g., the intelligent server 2600).

According to an embodiment, the electronic device 4001 may transmit the confirmed representative dialog to the server 4003 via a wireless communication circuit.

In operation 4019, the server 4003 (e.g., the intelligent server 2600) may extract the path rule using the representative dialog.

According to an embodiment, the server 4003 may confirm a preset path rule corresponding to the representative dialog.

According to another embodiment, the server 4003 may include an NLU module (e.g., the NLU module 2620) and a path planner module (e.g., the path planner module 2630) to generate the path rule corresponding to the representative dialog. Since the detailed operation of generating (extracting) the path rule has been described in the above-described embodiments, a detailed description thereof will be omitted.

In operation 4021, the server 4003 (e.g., the intelligent server 2600) may transmit the path rule to the electronic device 4001 (e.g., the processor 2550 of FIG. 26).

According to an embodiment, the server 4003 may transmit the path rule to the electronic device 4001 via the wireless communication circuit.

In operation 4023, the electronic device 4001 (e.g., the processor 2550 in FIG. 26) may perform an operation corresponding to the path rule.

According to an embodiment, the electronic device 4001 may include an execution manager module (e.g., the execution manager module 2553) to perform the operation corresponding to the path rule.

Figure 41:
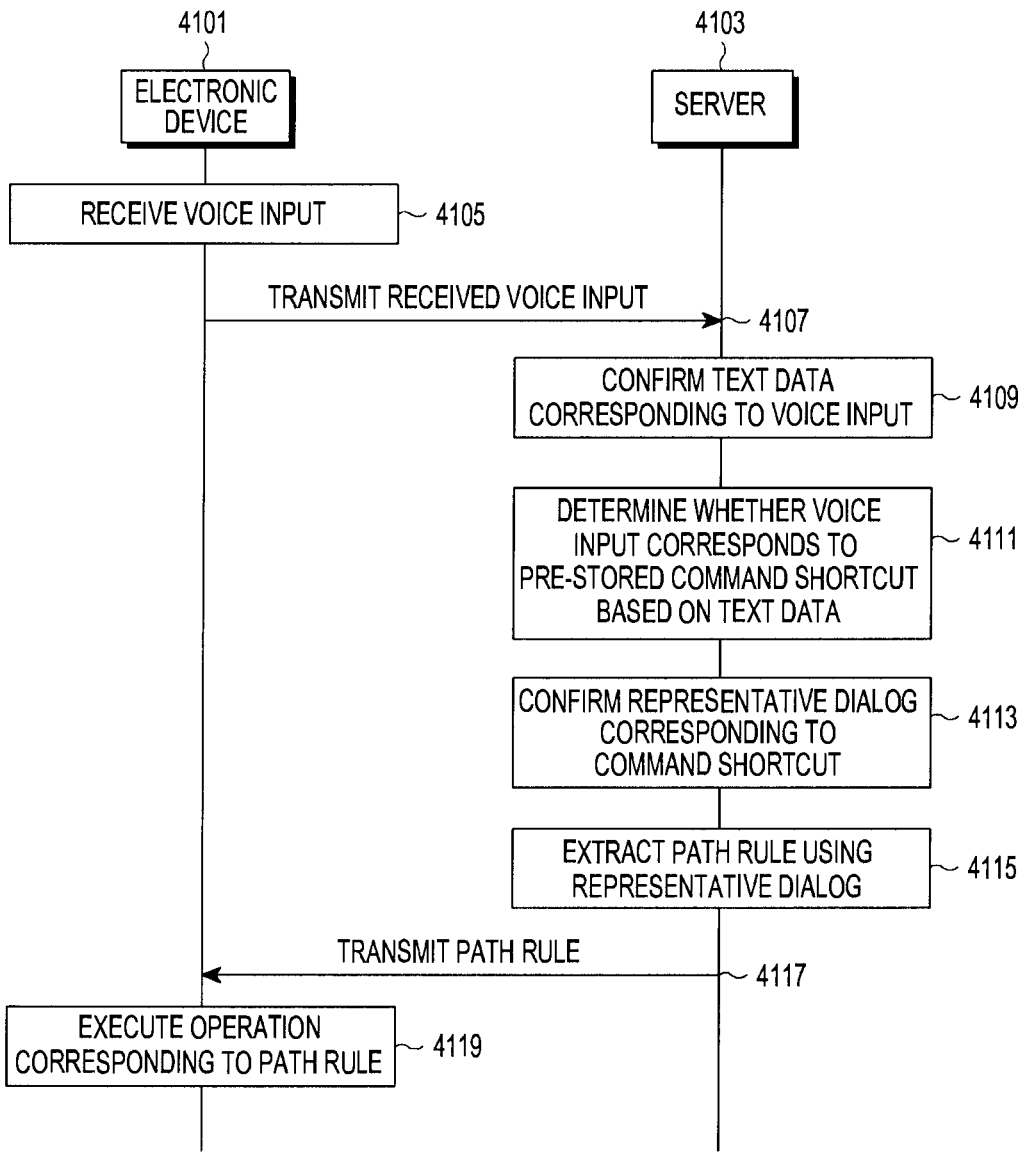
FIG. 41 is a flowchart illustrating an operation of executing the function of an electronic device according to various embodiments.

FIG. 41 is a flowchart illustrating an operation of executing the function of an electronic device (e.g., the user terminal 2500) according to various embodiments. Referring to FIG. 41, a server may store a representative dialog set to perform any one function of the electronic device and a command shortcut mapped to the representative dialog, and the representative dialog may correspond to a path rule including information of a sequence of states of the electronic device. When receiving a voice input corresponding to the command shortcut from the electronic device, the server may extract a path rule corresponding to the command shortcut to transmit the extracted path rule to the electronic device.

In operation 4105, an electronic device 4101 (e.g., the processor 2550 of FIG. 26) may receive the voice input from a user.

According to an embodiment, the electronic device may receive the voice input from the user via a microphone.

In operation 4107, the electronic device 4101 (e.g., the processor 2550 of FIG. 26) may transmit the received voice input to a server 4103 (e.g., the intelligent server 2600).

According to an embodiment, the electronic device 4101 may transmit the voice input to the server 4103 via a wireless communication circuit.

In operation 4109, the server 4103 (e.g., the intelligent server 2600) may confirm text data corresponding to the voice input.

According to an embodiment, the server 4103 may use an ASR technique to convert the voice input into text data. For example, the server 4103 may include an ASR module (e.g., the ASR module 2610) to convert the voice input to the text data.

In operation 4111, the server 4103 (e.g., the intelligent server 2600) may determine whether the voice input corresponds to a pre-stored command shortcut based on the text data.

According to an embodiment, the server 4103 may determine whether the text data is a command shortcut set as a macro. The command shortcut may be stored in the database of the server in advance. For example, the command shortcut may be mapped with the representative dialog requesting to perform any one function (task) of the electronic device, and may be stored in advance in the database together with the representative dialog. For example, the representative dialog may be mapped to the path rule including the information of the sequence of the states of the electronic device for performing a function.

According to an embodiment, when the voice input corresponds to the pre-stored command shortcut, the server 4103 (e.g., the intelligent server 2600) may confirm the representative dialog corresponding to the command shortcut in operation 4113.

In operation 4115, the server 4103 (e.g., the intelligent server 2600) may extract the path rule using the representative dialog.

According to an embodiment, the server 4103 may confirm a preset path rule corresponding to the representative dialog.

According to another embodiment, the server 4103 may include an NLU module (e.g., the NLU module 2620) and a path planner module (e.g., the path planner module 2630) to generate the path rule corresponding to the representative dialog. Since the detailed operation for generating (extracting) the path rule has been described in the above-described embodiments, a detailed description thereof will be omitted.

In operation 4117, the server 4103 (e.g., the intelligent server 2600) may transmit the path rule to the electronic device 4101 (e.g., the processor 2550 of FIG. 26).

According to an embodiment, the server 4103 may transmit the path rule to the electronic device 4101 via a wireless communication circuit.

In operation 4119, the electronic device 4101 (e.g., the processor 2550 of FIG. 26) may perform an operation corresponding to the path rule.

According to an embodiment, the electronic device 4101 may include an execution manager module (e.g., the execution manager module 2553) to execute the operation corresponding to the path rule.

Figure 42:
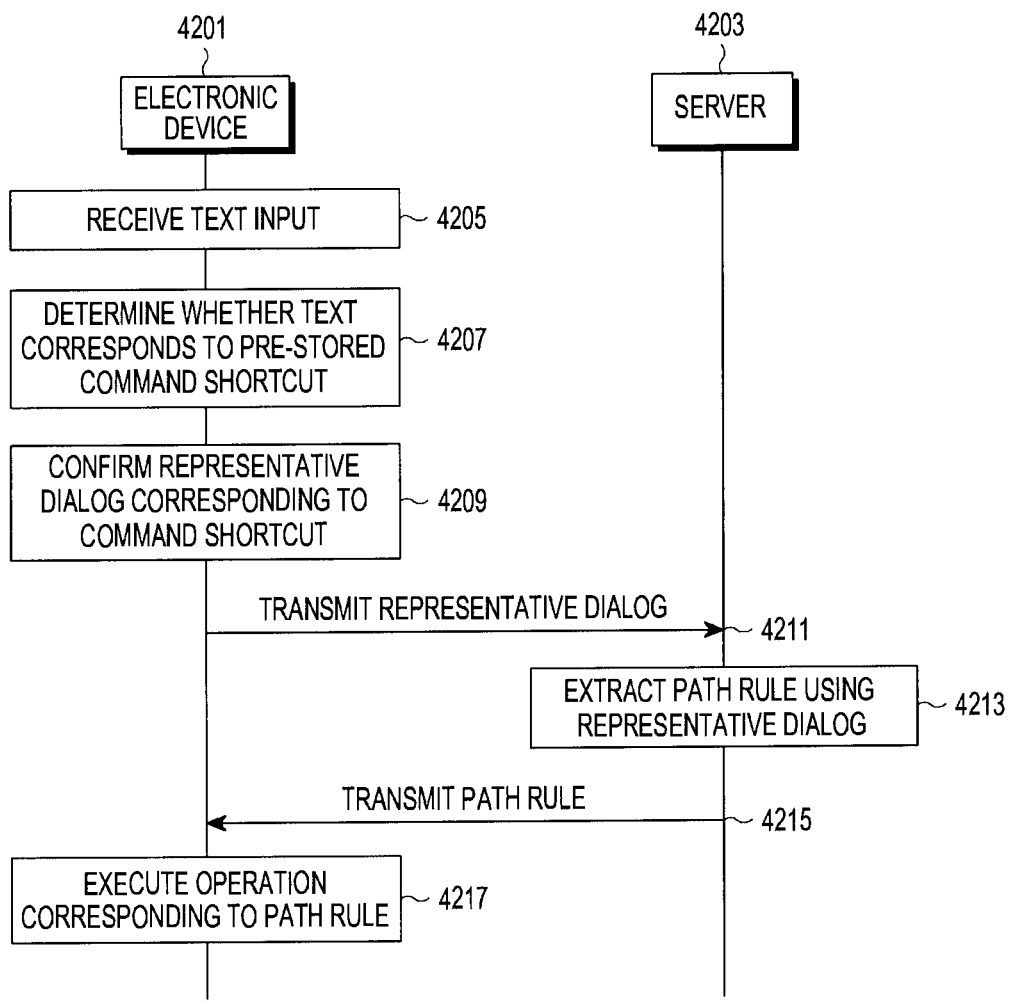
FIG. 42 is a flowchart illustrating an operation of executing the function of an electronic device according to various embodiments.

FIG. 42 is a flowchart illustrating an operation of executing the function of an electronic device (e.g., the user terminal 2500) according to various embodiments.

Referring to FIG. 42, the electronic device may store a representative dialog set to perform any one function of the electronic device and a command shortcut mapped to the representative dialog, and the representative dialog may correspond to a path rule including information of a sequence of states of the electronic device. When receiving a command shortcut as a text input corresponding to the command shortcut from a user, the electronic device may execute a function corresponding to the command shortcut via communication with the server.

In operation 4205, an electronic device 4201 (e.g., the processor 2550 of FIG. 26) may receive the text input from the user.

According to an embodiment, the electronic device may receive the text input from the user via a touch screen display.

In operation 4207, the electronic device 4201 (e.g., processor 2550 of FIG. 26) may determine whether the text input corresponds to a pre-stored command shortcut.

According to an embodiment, the electronic device 4201 may determine whether the text input is a command shortcut set as a macro. The command shortcut may be stored in advance in the database of the electronic device. For example, the command shortcut may be mapped with the representative dialog requesting to perform a function (task) of the electronic device, and may be pre-stored in the database together with the representative dialog. For example, the representative dialog may be mapped with a path rule including information of a sequence of states of the electronic device for performing a function.

According to an embodiment, when the text input corresponds to the pre-stored command shortcut, the electronic device 4201 may confirm the representative dialog corresponding to the short-instruction in operation 4209.

In operation 4211, the electronic device 4201 (e.g., the processor 2550 of FIG. 26) may transmit the confirmed representative dialog to the server 4203 (e.g., the intelligent server 2600).

According to an embodiment, the electronic device 4201 may transmit the representative dialog to the server 4203 via a wireless communication circuit.

In operation 4213, the server 4203 (e.g., the intelligent server 2600) may extract the path rule using the representative dialog.

According to an embodiment, the server 4203 may confirm a preset path rule corresponding to the representative dialog.

According to another embodiment, the server 4203 may include an NLU module (e.g., the NLU module 2620) and a path planner module (e.g., the path planner module 2630) to generate the path rule corresponding to the representative dialog. Since the detailed operation for generating (extracting) the path rule has been described in the above-described embodiments, a detailed description thereof will be omitted.

In operation 4215, the server 4203 (e.g., the intelligent server 2600) may transmit the path rule to an electronic device 4201 (e.g., the processor 2550 of FIG. 26).

According to an embodiment, the server 4203 may transmit the path rule to the electronic device 4201 via a wireless communication circuit.

In operation 4217, the electronic device 4201 (e.g., the processor 2550 of FIG. 26) may perform an operation corresponding to the path rule.

According to an embodiment, the electronic device 4001 may include an execution manager module (e.g., the execution manager module 2553) to perform the operation corresponding to the path rule.

Figure 43:
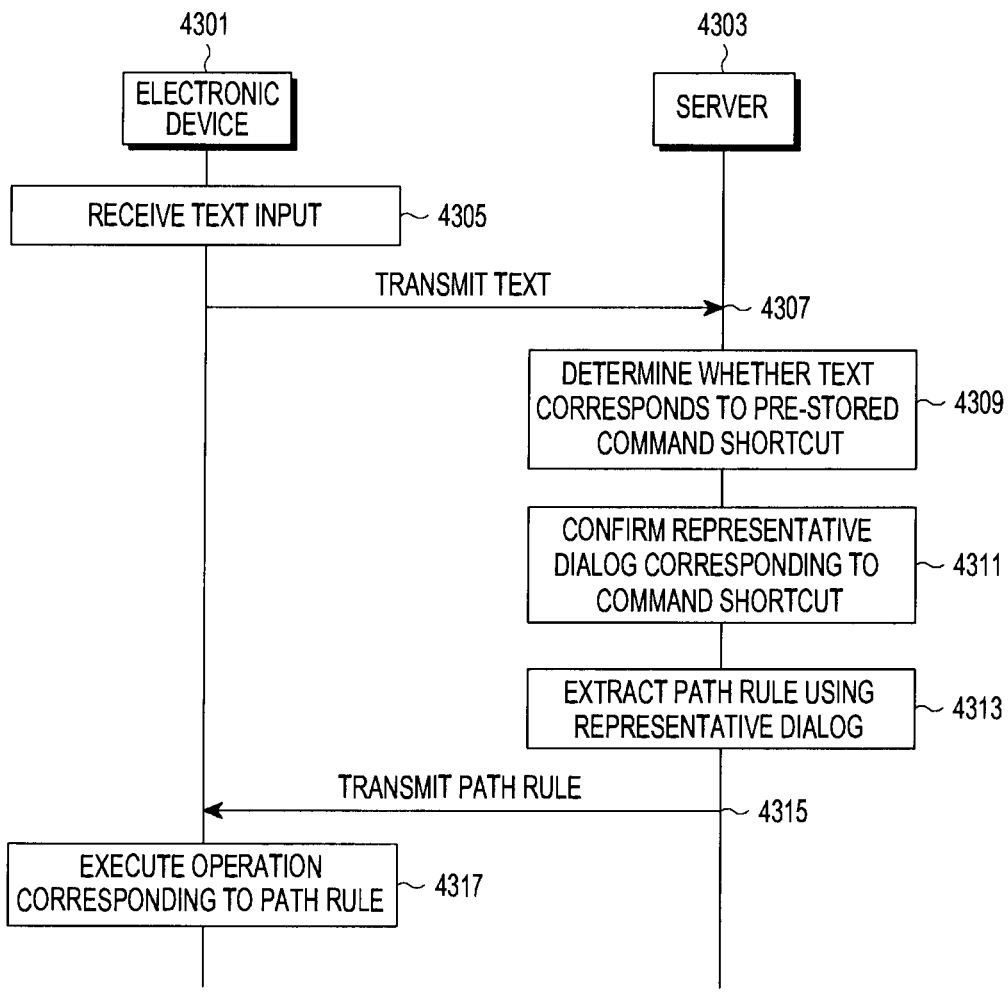
FIG. 43 is a flowchart illustrating an operation of executing the function of an electronic device according to various embodiments.

FIG. 43 is a flowchart illustrating an operation of executing the function of an electronic device (e.g., the user terminal 2500) according to various embodiments.

Referring to FIG. 43, a server may store a representative dialog set to perform any one function of the electronic device and a command shortcut mapped to the representative dialog, and the representative dialog may correspond to a path rule including information of a sequence of states of the electronic device. When receiving a text input corresponding to the command shortcut from the electronic device, the server may extract a path rule corresponding to the command shortcut to transmit the extracted path rule to the electronic device.

In operation 4305, an electronic device 4301 (e.g., the processor 2550 of FIG. 26) may receive the text input from a user.

According to an embodiment, the electronic device may receive the text input from the user via a touch screen display.

In operation 4307, the electronic device 4301 (e.g., the processor 2550 of FIG. 26) may transmit the received text input to a server 4303 (e.g., the intelligent server 2600).

According to an embodiment, the electronic device 4301 may transmit the text input to the server 4303 via a wireless communication circuit.

In operation 4309, the server 4303 (e.g., the intelligent server 2600) may determine whether the text input corresponds to a pre-stored command shortcut.

According to an embodiment, the server 4303 may determine whether the text input is a command shortcut set as a macro. The command shortcut may be stored in advance in the database of the server. For example, the command shortcut may be mapped with the representative dialog requesting to perform a function (task) of the electronic device, and may be pre-stored in the database together with the representative dialog. For example, the representative dialog may be mapped with a path rule including information of a sequence of states of the electronic device for performing a function.

According to an embodiment, when the text input corresponds to the pre-stored command shortcut, the server 4303 may confirm a representative dialog corresponding to the command shortcut in operation 4311.

In operation 4313, the server 4303 (e.g., intelligent server 2600) may extract the path rule using the representative dialog.

According to an embodiment, the server 4303 may confirm a preset path rule corresponding to the representative dialog.

According to another embodiment, the server 4303 may include an NLU module (e.g., the NLU module 2620) and a path planner module (e.g., the path planner module 2630) to generate the path rule corresponding to the representative dialog. Since the detailed operation for generating (extracting) the path rule has been described in the above-described embodiments, a detailed description thereof will be omitted.

In operation 4315, the server 4303 (e.g., the intelligent server 2600) may transmit the path rule to the electronic device 4301 (e.g., the processor 2550 of FIG. 26).

According to an embodiment, the server 4303 may transmit the path rule to the electronic device 4301 via a wireless communication circuit.

In operation 4317, the electronic device 4301 (e.g., the processor 2550 in FIG. 26) may perform an operation corresponding to the path rule.

According to an embodiment, electronic device 4301 may include an execution manager module (e.g., execution manager module 2553) to perform the operation corresponding to the path rule.

FIG. 44 is a diagram illustrating the registration of a command shortcut for executing the function of an electronic device (e.g., the user terminal 2500) according to various embodiments.

Referring to FIG. 44, at the time of a user input for executing any one function of the electronic device, the electronic device may display a screen for registration of a command shortcut having a macro function so as to simply execute the function. The electronic device may register the command shortcut of the function as a macro based on the user input. For example, the electronic device may receive a voice input of a user corresponding to a representative dialog for executing a specific function, and may execute a function corresponding to the voice input. When the execution of the function is completed, the electronic device may cause a user to input a simple command shortcut (also referred to as a macro) in place of the above-described representative dialog so that the above-described function can be performed through the corresponding command shortcut later.

According to an embodiment, as shown in FIG. 44A, the electronic device may receive a voice input of the user. For example, the electronic device may receive the voice input of the user such as "Show me photo taken yesterday in gallery" that is the representative dialog for executing a function of displaying a photo taken and stored yesterday on the screen from the gallery application of the electronic device.

According to an embodiment, depending on the execution of the function corresponding to the voice input, the electronic device may display a user interface (UI) 4403 for guiding the registration of the command shortcut (e.g., a macro) for the function on the screen, as shown in FIG. 44B. For example, the UI 4403 may include the execution result of the function. Referring to FIG. 44B, the UI 4403 may include a command shortcut registration menu 4401 (e.g., a button) for displaying a command shortcut registration screen that allows the received command shortcut of the function to be registered as a macro, and a natural language phrase indicating a result of execution of the function, such as "Okay, I found 2 pictures," as depicted.

According to an embodiment, at the time of a touch input of the user for the command shortcut registration menu 4401 or a voice input of the user such as "Add command shortcut" that is a command corresponding to the command shortcut registration menu 4401, the electronic device may execute the command shortcut registration screen as shown in FIG. 44C. Referring to FIG. 44C, the command shortcut registration screen may display a button 4405 for allowing the registration of the command shortcut to be executed, together with a notice such as "Tell me command shortcut to be used instead of long command" that informs the user of a method of setting the command shortcut to be designated as the macro of the function. For example, the user may touch the button 4405 to utter the command shortcut desired to be designated so that the electronic device may designate the command shortcut as the macro of the function. In addition, the command shortcut registration screen may include "Show me photo taken yesterday in gallery" that is a representative dialog of a function to designating the command shortcut as shown in FIG. 44C.

In the above-described embodiment of FIG. 44, it has been described that the user utters the command shortcut desired to be designated so that the electronic device may designate the command shortcut as the macro of the function. However, according to another embodiment, by performing a text input of the command shortcut desired to be designated by the user, the electronic device may designate the command shortcut as the macro of the function.

FIG. 45 is a diagram illustrating the registration of a command shortcut for executing the function of an electronic device (e.g., the user terminal 2500) according to various embodiments.

Referring to FIG. 45, the electronic device may display a command list received from a user on a screen, and the command list may include a menu for allowing a command shortcut to be added.

Figures 45A, 45B:
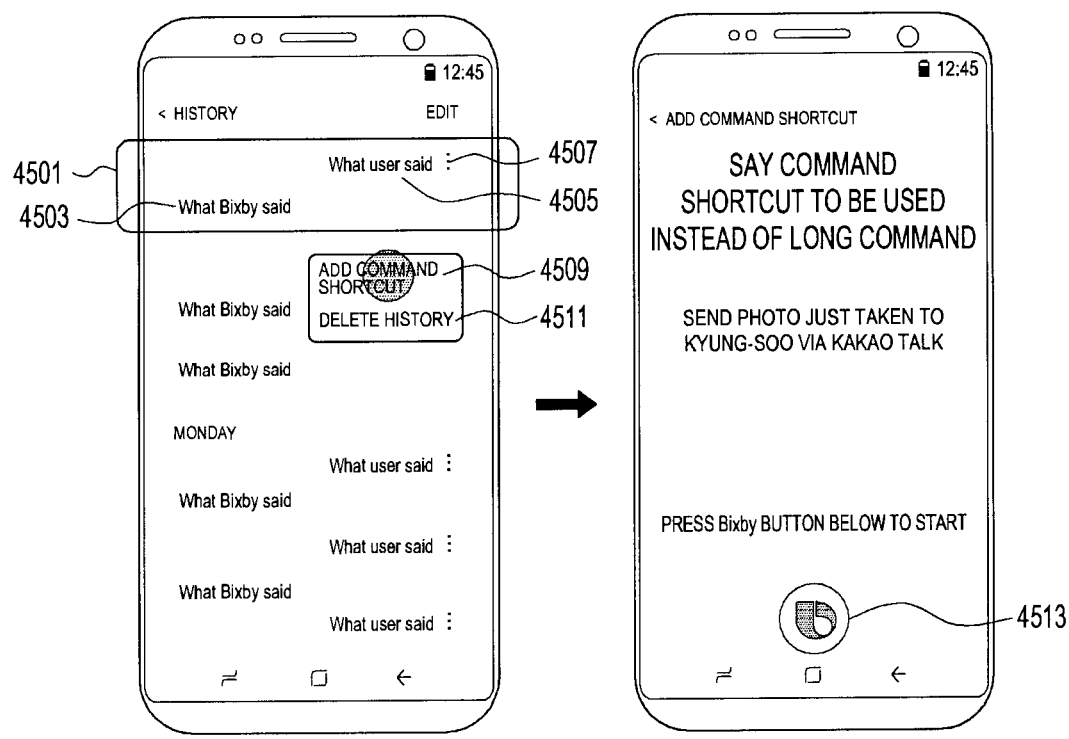
FIG. 45A and FIG. 45B are diagrams illustrating the registration of a command shortcut for executing the function of an electronic device according to various embodiments.

According to an embodiment, the electronic device may display a command 4505 received from the user and a list of an item 4501 including an execution result 4503 of a function corresponding to the command on a history screen as shown in FIG. 45A. A corresponding setting menu 4507 may be displayed in each of the commands 4505 included in the history screen. When the user selects the setting menu 4507, a user UI may be generated, and the generated UI may include a command shortcut addition menu 4509 for allowing the command shortcut (macro) to be added and a history deletion menu 4511 for allowing a user history item to be deleted. When the command shortcut addition menu 4509 is selected according to a user input, the electronic device may execute the command shortcut registration screen as shown FIG. 45B. Referring to FIG. 45B, the command shortcut registration screen may display a button 4513 for allowing the command shortcut registration to be executed, together with a notice such as "Tell me command shortcut to be used instead of long command" that informs the user of a method of setting the command shortcut to be designated as the macro of the function. For example, the user may touch the button 4513 to utter the command shortcut desired to be designated so that the electronic device may designate the command shortcut as the macro of the function. In addition, the command shortcut registration screen may include "Send photo just taken to Kyung-soo via Kakao Talk" that is the representative dialog of the function of designating the command shortcut as shown in FIG. 45B.

In the above-described embodiment of FIG. 45, it has been described that the user utters the command shortcut desired to be designated so that the electronic device may designate the command shortcut as the macro of the corresponding function. However, according to another embodiment, by performing a text input of the command shortcut desired to be designated by the user, the electronic device may designate the command shortcut as the macro of the function.

FIG. 46 is a diagram illustrating the registration of a command shortcut for executing the function of an electronic device (e.g., the user terminal 2500) according to various embodiments.

Referring to FIG. 46, the electronic device may collect and display command shortcuts which have been set as macros to be stored. For example, the electronic device may display a list of the command shortcuts set as the macros, and may perform operations related to additional registration, modification, and deletion of the command shortcuts.

Referring to FIG. 46A, the electronic device may predict functions to be performed by a user in the electronic device, and may display hints 4603 corresponding to utterance commands capable of performing the functions. In addition, when a touch input of the user is performed and then an utterance input of the user is performed, the electronic device may display a button 4605 for allowing a function corresponding to the utterance to be executed. In addition, the electronic device may display a menu (MACRO) 4601 for allowing the command shortcut corresponding to each of the hints 4603 to be set.

When the menu 4601 is selected according to the user input, the electronic device may display a list screen including a list 4607 of the command shortcuts which have been set as macros to be stored as shown in FIG. 46B. In addition, the list screen may include an additional registration button (ADD) 4609 for allowing the command shortcuts to be additionally registered.

When receiving a user input for the additional registration button 4609, the electronic device may display an additional registration screen for allowing the command shortcut corresponding to each of the hints provided by the electronic device to be registered as shown in FIG. 46C. Referring to FIG. 46C, the additional registration screen may include a first item 4611 for allowing the command shortcut to be input, a second item 4612 for allowing the hint to be retrieved, and a third item 4613 for displaying a hint list. The electronic device may combine the command shortcut input to the first item 4611 and the hint selected by the user from the second item 4612 or the third item 4613 to generate a macro. For example, the electronic device may generate the command shortcut input to the first item 4611 as a macro of a function of executing the hint selected by the user from the second item 4612 or the third item 4613.

FIG. 47 is a diagram illustrating the registration of a command shortcut for executing the function of an electronic device (e.g., the user terminal 2500) according to various embodiments.

According to an embodiment, when a hint is used to set a command shortcut as a macro, the command shortcut may be generated by modifying a parameter as shown in FIG. 47. For example, a hint such as "Call to Mom" may be provided in consideration of history, TOP information, or the like, but a function for which a macro is desired to be generated by a user may be call to John, and thereby "Call to John" may be generated as the hint corresponding to the function. Although a user can directly write the entire dialog that is mapped with the desired command shortcut, when the hint is used, a precise representative dialog mapped with the corresponding function may be mapped, so that the operation of the server (e.g., the NLU module, the PP module, etc.) can be more precisely performed. For example, when the parameter is modified, this does not affect the structure of the representative dialog, so that it is possible to modify the parameter, thereby increasing the accuracy of the operations corresponding to the path rules and increasing the variety of operations that the user can perform.

Referring to FIG. 47A, the electronic device may predict functions to be performed in the electronic device by the user, and may display hints 4703 corresponding to utterance commands capable of executing the functions. In addition, the electronic device may display a menu (MACRO) 4701 that allows the user to set a command shortcut corresponding to each of the hints 4703.

When the menu 4701 is selected according to the user input, the electronic device may display a list screen including a list 4707 of command shortcuts which have been set and stored as macros as shown in FIG. 47B, including "OMG" 4709.

When any one command shortcuts 4707 included in the list of command shortcuts 4707 is selected by the user, the electronic device may display a parameter screen for allowing the parameter of the selected command shortcut 4707 to be modified as shown in FIG. 47C. Referring to FIG. 47C, when "OMG" macro 4709 is selected, a parameter modification screen for modifying the "OMG" macro may include a first item 4711 in which the command shortcut 4707 is displayed, and a second item 4713 in which a representative dialog is displayed in order to modify the parameter of the representative dialog corresponding to the command shortcut 4707. A parameter part of the representative dialog shown in the second item 4713 may indicate that the parameter part can be modified, such as changing the color of the text, underlining, or the like. In addition, the parameter modification screen may include a third item 4715 for displaying the hint list.

Figure 48:
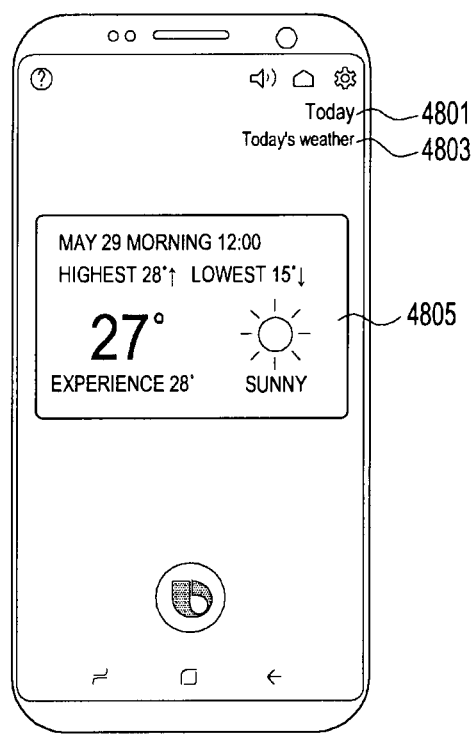
FIG. 48 is a diagram illustrating a command shortcut execution screen of an electronic device according to various embodiments.

FIG. 48 is a diagram illustrating a command shortcut execution screen of an electronic device (e.g., the user terminal 2500) according to various embodiments.

According to an embodiment, in accordance with the above-described embodiments, a command shortcut may be mapped with a representative dialog to be registered as a macro. When a user inputs a command shortcut, the electronic device may display a function execution result according to the command shortcut.

For example, according to the above-described embodiments, the user may cause a command shortcut such as "Today" to be mapped with a representative dialog such as "Today's weather" and registered as a macro. When the user utters "Today", the electronic device may display an execution result screen of the command shortcut as shown in FIG. 48. Referring to FIG. 48, the execution result screen may include "Today's weather" 4805 that is an execution result of a function corresponding to "Today's weather" which is a representative dialog 4801. In addition, the execution result screen may further include "Today" which is a command shortcut 4801 and "Today's weather" which is a representative dialog 4803 corresponding to the "Today" command shortcut 4801.

According to various embodiments, although not shown, in order to activate the use of the macro function described above, the server may provide reward services such as providing points that can be used when using manufacturer's service, depending on the macros which have been registered and stored through the electronic device. For example, it is possible to improve the frequency of use of the macro function and to provide various services to a user (electronic device) having a high frequency of use.

According to various embodiments, an electronic device (e.g., the user terminal 2500) may include a housing; a touch screen display (e.g., the display 2520) that is located inside the housing and is exposed through a first portion of the housing; a microphone (e.g., the microphone 288) that is located inside the housing and is exposed through a second portion of the housing; at least one speaker (e.g., the speaker 2530) that is located inside the housing and is exposed through a third portion of the housing; a wireless communication circuit (e.g., the communication module 220) that is located inside the housing; a processor (e.g., the processor 2550) that is located inside the housing and is electrically connected to the touch screen display, the microphone, the speaker, and the wireless communication circuit; and a memory (e.g., the memory 230) that is located inside the housing and is electrically connected to the processor, such that when the memory is performed, the processor receives a first user input via at least one of the touch screen display and the microphone, the first user input including a request to perform a task using at least one of the electronic device and an external device, transmits first data associated with the first user input to an external server (e.g., the intelligent server 2600) via the wireless communication circuit, receives a first response from the external server via the wireless communication circuit, the first response including information associated with the first user input and/or sequence information of states of the electronic device for performing at least a portion of the task, receives a second user input for assigning an utterance and/or a user operation via the touch screen display as a request to perform the task, and stores instructions causing to transmit second data associated with the second user input to the external server via the communication circuit.

According to various embodiments, the instructions may cause the processor to receive a third user input via the at least one of the touch screen display and the microphone after the second data is transmitted, the third user input including the utterance and/or the user operation, to transmit third data associated with the third user input to the external server via the wireless communication circuit, to receive a second response from the external server via the wireless communication circuit, the second response including the sequence information of the states of the electronic device for performing at least a portion of the task, and to allow the electronic device to have the sequence of the states to perform the at least a portion of the task.

According to various embodiments, the instructions may cause the processor to store a log associated with the first user input received via the touch screen display, and to transmit the log as a part of the first data.

According to various embodiments, the second user input may include an utterance personalized by a user and/or a graphic user interface selected by the user.

According to various embodiments, the memory may store at least one representative dialog that corresponds to the sequence of the states of the electronic device and is a request to perform the task, and a command shortcut that is mapped with the representative dialog, and the instructions may cause the processor to transmit the second data that is the representative dialog corresponding to a voice to the external server, id the second user input is the voice received via the microphone.

According to various embodiments, the instructions may cause the processor to transmit the voice to the external server via the wireless communication circuit, to receive text data corresponding to the voice from the external server via the wireless communication circuit, and to identify the representative dialog matched with the command shortcut if the text data corresponds to the command shortcut.

According to various embodiments, the instructions may cause the processor to receive the sequence information of the states of the electronic device that corresponds to the second data and is used to perform the at least a portion of the task via the wireless communication circuit after the second data is transmitted, and to perform the at least a portion of the task.

According to various embodiments, the memory may store at least one representative dialog that corresponds to the sequence of the states of the electronic device and is a request to perform the task and a command shortcut that is mapped with the representative dialog, and the instructions may cause the processor to transmit the second data that is the representative dialog corresponding to a text input to the external server, when the second user input is the text input received via the touch screen display.

According to various embodiments, the instructions may cause the processor to identify the representative dialog matched with the command shortcut if the text input corresponds to the command shortcut.

According to various embodiments, a method of executing an operation of an electronic device (e.g., the user terminal 2500) may include: receiving a first user input, such that the first user input includes a request to perform a task using at least one of the electronic device or an external device; transmitting first data associated with the first user input to an external server (e.g., the intelligent server 2600); receiving a first response from the external server, such that the first response includes information associated with the first user input and/or sequence information of states of the electronic device for performing at least a portion of the task; receiving a second user input for assigning an utterance and/or a user operation via a touch screen display of the electronic device as a request to perform the task; and transmitting second data associated with the second user input to the external server.

According to various embodiments, the method may further include receiving a third user input after the second data is transmitted, such that the third user input includes the utterance and/or the user operation; transmitting third data associated with the third user input to the external server; receiving a second response from the external server, such that the second response includes the sequence information of the states of the electronic device for performing the at least a portion of the task; and allowing the electronic device to have the sequence of the states to perform the at least a portion of the task.

According to various embodiments, the method may further include storing a log associated with the first user input received via the touch screen display of the electronic device, and transmitting the log as a part of the first data.

According to various embodiments, the second user input may include an utterance personalized by a user and/or a graphic user interface selected by the user.

According to various embodiments, the method may further include storing at least one representative dialog that corresponds to the sequence of the states of the electronic device and is a request to perform the task, and a command shortcut that is mapped with the representative dialog, and transmitting the second data that is the representative dialog corresponding to a voice to the external server, if the second user input is the voice received via the microphone.

According to various embodiments, the method may further include transmitting the voice to the external server via the wireless communication circuit, receiving text data corresponding to the voice from the external server via the wireless communication circuit, and identifying the representative dialog matched with the command shortcut if the text data corresponds to the command shortcut.

According to various embodiments, a machine-readable storage medium recording a program to perform a method of executing an operation of an electronic device, the method comprising: receiving a first user input, such that the first user input includes a request to perform a task using at least one of the electronic device or an external device; transmitting first data associated with the first user input to an external server; receiving a first response from the external server, such that the first response includes information associated with the first user input and/or sequence information of states of the electronic device for performing at least a portion of the task; receiving a second user input for assigning an utterance and/or a user operation via a touch screen display of the electronic device as the request to perform the task; and transmitting second data associated with the second user input to the external server.

According to various embodiments, an electronic device (e.g., the user terminal 2500) may include: a housing; a touch screen display (e.g., the display 2520) that is located inside the housing and is exposed through a first portion of the housing; a microphone (e.g., the microphone 288) that is located inside the housing and is exposed through a second portion of the housing; at least one speaker (e.g., the speaker 2530) that is located inside the housing and is exposed through a third portion of the housing; a wireless communication circuit (e.g., the communication module 220) that is located inside the housing; a processor (e.g., the processor 2550) that is located inside the housing and is electrically connected to the touch screen display, the microphone, the speaker, and the wireless communication circuit; and a memory (e.g., the memory 230) that is located inside the housing and is electrically connected to the processor, such that when the memory is performed, the processor receives a first user input via at least one of the touch screen display and the microphone, the first user input including a request to perform a task using at least one of the electronic device and an external device, transmits first data associated with the first user input to an external server via the wireless communication circuit, acquires a first response based on the first data associated with the first user input, the first response including information associated with the first user input and/or sequence information of states of the electronic device for performing at least a portion of the task, receives a second user input for assigning an utterance and/or a user operation via the touch screen display as a request to perform the task, and acquires a second response based on second data associated with the second user input via the communication circuit, the second response storing instructions including the sequence information of the states of the electronic device for performing the at least a portion of the task.

According to various embodiments, the instructions may cause the processor to receive a third user input via the at least one of the touch screen display and the microphone after the second data is acquired, the third user input including the utterance and/or the user operation, to receive a third response based on third data associated with the third user input via the wireless communication circuit, the third response including the sequence information of the states of the electronic device for performing the at least a portion of the task, and to allow the electronic device to have the sequence of the states to perform the at least a portion of the task.

According to various embodiments, the instructions may cause the processor to store a log associated with the first user input received via the touch screen display, and to transmit the log as a part of the first data.

According to various embodiments, the second user input may include an utterance personalized by a user and/or a graphic user interface selected by the user.

The term "module" as used herein may include a unit including hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

What is claimed is:

1. An electronic device comprising:
a housing;
a touch screen display that is located inside the housing and is exposed through a first portion of the housing;
a microphone that is located inside the housing and is exposed through a second portion of the housing;
at least one speaker that is located inside the housing and is exposed through a third portion of the housing;
a wireless communication circuit that is located inside the housing;
a processor that is located inside the housing and is electrically connected to the touch screen display, the microphone, the speaker, and the wireless communication circuit; and
a memory that is located inside the housing and is electrically connected to the processor,
wherein the memory stores instructions that, when executed, cause the processor to:
receive a first user input via at least one of the touch screen display and the microphone, the first user input including a request to perform a task using at least one of the electronic device and an external device,
transmit first data associated with the first user input to an external server via the wireless communication circuit,
receive a first response from the external server via the wireless communication circuit, the first response including information associated with the first user input and/or sequence information of states of the electronic device for performing at least a portion of the task, wherein the sequence information corresponds to at least one representative dialog stored in the memory, and wherein when an input corresponding to the at least one representative dialog is received from a user by the processor, at least a portion of the task is performed, after receiving the first response, in response to receiving a second user input including an utterance and/or a user operation via the touch screen display, set a command shortcut to be mapped to the at least one representative dialog, the command shortcut including a text which is acquired based on the utterance and/or the user operation, wherein after the command shortcut is set, when an input including the utterance and/or the user operation is received from the user by the processor, at least a portion of the task is performed, and transmit second data associated with the second user input to the external server via the communication circuit.

2. The electronic device of claim 1, wherein the instructions further cause the processor to:

receive a third user input via the at least one of the touch screen display or the microphone after the second data is transmitted, the third user input including the utterance and/or the user operation, transmit third data associated with the third user input to the external server via the wireless communication circuit, receive a second response from the external server via the wireless communication circuit, the second response including the sequence information of the states of the electronic device for performing at least the portion of the task, and perform at least the portion of the task according to the sequence information.

3. The electronic device of claim 1, wherein the instructions further cause the processor to:

store a log associated with the first user input received via the touch screen display, and transmit the log as a part of the first data.

4. The electronic device of claim 1, wherein the utterance includes an utterance personalized by the user, and wherein the user operation includes a text input and/or an input selecting a graphic user interface by the user.

5. The electronic device of claim 1, wherein:

the at least one representative dialog includes a request to perform the task, and the instructions further cause the processor to:

receive a voice via the microphone, and transmit fourth data including another representative dialog corresponding to the voice to the external server.

6. The electronic device of claim 5, wherein the instructions further cause the processor to:

transmit the voice to the external server via the wireless communication circuit, receive text data corresponding to the voice from the external server via the wireless communication circuit, and identify the other representative dialog matched with the command shortcut if the text data corresponds to the command shortcut.

7. The electronic device of claim 5, wherein the instructions further cause the processor to:

receive the sequence information of the states of the electronic device that corresponds to the second data and is used to perform at least the portion of the task via the wireless communication circuit after the second data is transmitted, and perform at least the portion of the task.

8. The electronic device of claim 1, wherein:

the at least one representative dialog includes a request to perform the task, and the instructions further cause the processor to:

receiving a text input via the touch screen display, and transmit fifth data including another representative dialog corresponding to the text input to the external server.

9. The electronic device of claim 8, wherein the instructions further cause the processor to identify the other representative dialog matched with the command shortcut if the text input corresponds to the command shortcut.

10. A method of executing an operation of an electronic device, the method comprising:

receiving a first user input, wherein the first user input includes a request to perform a task using at least one of the electronic device or an external device;

transmitting first data associated with the first user input to an external server;

receiving a first response from the external server, wherein the first response includes information associated with the first user input and/or sequence information of states of the electronic device for performing at least a portion of the task, wherein the sequence information corresponds to at least one representative dialog, and wherein when an input corresponding to the at least one representative dialog is received from a user, at least a portion of the task is performed;

after receiving the first response, in response to receiving a second user input including an utterance and/or a user operation via a touch screen display of the electronic device, setting a command shortcut to be mapped to the at least one representative dialog, the command shortcut including a text which is acquired based on the utterance and/or the user operation, wherein after the command shortcut is set, when an input including the utterance and/or the user operation is received from the user, at least a portion of the task is performed; and transmitting second data associated with the second user input to the external server.

11. The method of claim 10, further comprising:

receiving a third user input after the second data is transmitted, wherein the third user input includes the utterance and/or the user operation;

transmitting third data associated with the third user input to the external server;

receiving a second response from the external server, wherein the second response includes the sequence information of the states of the electronic device for performing at least the portion of the task; and performing at least the portion of the task according to the sequence information.

12. The method of claim 10, further comprising:

storing a log associated with the first user input received via the touch screen display of the electronic device, and transmitting the log as a part of the first data.

13. The method of claim 10, wherein the utterance second user includes an utterance personalized by a user, and wherein the user operation includes a text input and/or an input selecting a graphic user interface by the user.

14. The method of claim 10, further comprising:
  storing the at least one representative dialog including a request to perform the task;
  receiving a voice via a microphone; and
  transmitting fourth data including another representative dialog corresponding to the voice to the external server.

15. The method of claim 14, further comprising:
  transmitting the voice to the external server;
  receiving text data corresponding to the voice from the external server; and
  identifying the other representative dialog matched with the command shortcut if the text data corresponds to the command shortcut.

16. A non-transitory machine-readable storage medium recording a program to perform a method of executing an operation of an electronic device, the method comprising:
  receiving a first user input, wherein the first user input includes a request to perform a task using at least one of the electronic device or an external device;
  transmitting first data associated with the first user input to an external server;
  receiving a first response from the external server, wherein the first response includes information associated with the first user input and/or sequence information of states of the electronic device for performing at least a portion of the task, wherein the sequence information corresponds to at least one representative dialog, and wherein when an input corresponding to the at least one representative dialog is received from a user, at least a portion of the task is performed;
  after receiving the first response, in response to receiving a second user input including an utterance and/or a user operation via a touch screen display of the electronic device, setting a command shortcut to be mapped to the at least one representative dialog, the command shortcut including a text which is acquired based on the utterance and/or the user operation, wherein after the command shortcut is set, when an input including the utterance and/or the user operation is received from the user, at least a portion of the task is performed; and
  transmitting second data associated with the second user input to the external server.

\* \* \* \* \*

UNITED STATES PATENT AND TRADEMARK OFFICE
CERTIFICATE OF CORRECTION

PATENT NO. : 10,547,729 B2
APPLICATION NO. : 15/911329
DATED : January 28, 2020
INVENTOR(S) : Choi et al.

Page 1 of 1

It is certified that error appears in the above-identified patent and that said Letters Patent is hereby corrected as shown below:

In the Claims

Column 98, Claim 13, Lines 64-65 should read as follows:
--...the utterance includes...--

Signed and Sealed this
Third Day of March, 2020

Andrei Iancu
*Director of the United States Patent and Trademark Office*